US008571901B2

(12) United States Patent
Shoen et al.

(10) Patent No.: US 8,571,901 B2
(45) Date of Patent: Oct. 29, 2013

(54) AUTOMATED SELF-STORAGE RESERVATION AND MANAGEMENT SYSTEM

(75) Inventors: Edward J. Shoen, Phoenix, AZ (US); Bruce Royer, Cave Creek, AZ (US); Chris Bierman, Avondale, AZ (US); Dennis O'Connor, Mesa, AZ (US)

(73) Assignee: U-Haul International, Inc., Phoenix, AZ (US)

( * ) Notice: Subject to any disclaimer, the term of this patent is extended or adjusted under 35 U.S.C. 154(b) by 2187 days.

(21) Appl. No.: 10/087,193

(22) Filed: Feb. 28, 2002

(65) Prior Publication Data

US 2006/0206342 A1 Sep. 14, 2006

(51) Int. Cl.
*G06Q 10/00* (2012.01)

(52) U.S. Cl.
USPC .............................................................. 705/5

(58) Field of Classification Search
USPC ...................................................... 705/1.1, 5
See application file for complete search history.

(56) References Cited

U.S. PATENT DOCUMENTS

| | | | | |
|---|---|---|---|---|
| 2,910,238 | A | 10/1959 | Miles et al. | 235/167 |
| 4,204,635 | A | 5/1980 | Hofmann et al. | 235/382 |
| 4,247,759 | A | 1/1981 | Yuris et al. | 235/381 |
| 4,359,631 | A | 11/1982 | Lockwood et al. | 235/381 |
| 4,449,186 | A | 5/1984 | Kelly et al. | 364/407 |
| 4,803,348 | A | 2/1989 | Lohrey et al. | 235/381 |
| 4,857,714 | A | 8/1989 | Sunyich | 235/382 |
| 5,223,829 | A | 6/1993 | Watabe | 340/825 |
| 5,231,272 | A | 7/1993 | Mardon | 340/382 |
| 5,239,480 | A | 8/1993 | Huegel | 364/479 |
| 5,253,165 | A | 10/1993 | Leiseca et al. | 364/407 |
| 5,253,166 | A | 10/1993 | Dettelbach et al. | |
| 5,289,369 | A | 2/1994 | Hirshberg | 364/401 |
| 5,333,257 | A | 7/1994 | Merrill et al. | 395/161 |
| 5,344,172 | A | 9/1994 | Jaun | |
| 5,404,291 | A | 4/1995 | Kerr et al. | |
| 5,408,417 | A | 4/1995 | Wilder | 364/479 |
| 5,537,315 | A | 7/1996 | Mitcham | 364/408 |
| 5,581,461 | A | 12/1996 | Coll et al. | |
| 5,614,703 | A | 3/1997 | Martin et al. | 235/382 |
| 5,734,823 | A | 3/1998 | Saigh et al. | 687/292 |
| 5,774,058 | A | 6/1998 | Henry et al. | 340/825.31 |
| 5,781,892 | A | 7/1998 | Hunt et al. | 705/5 |
| 5,832,452 | A | 11/1998 | Schneider et al. | 705/5 |
| 5,845,256 | A | 12/1998 | Pescitelli et al. | 705/4 |
| 5,870,711 | A | 2/1999 | Huffman | 705/8 |

(Continued)

OTHER PUBLICATIONS

Vasquez, Daniel and Rodney Foo. Hosuing Crucnh Adds to Fire Victims' Woes S.J. Residents Face Dilemma: Pay Higher Rents or Leave Area, Jul. 22, 2000, San Jose Mercury News.*

(Continued)

*Primary Examiner* — Shannon Campbell
(74) *Attorney, Agent, or Firm* — Tiffany & Bosco, P.A.

(57) ABSTRACT

An automated self-storage reservation and management system is disclosed. The system enables customers to make a reservation for a self-storage unit, view a map for a storage facility, enter or update customer information, make a payment, view payment history and print receipts. Facility personnel can utilize the system to manage inventory and client accounts, generate reports, track sales, vacancies and delinquencies. The automated system preferably includes a communications feature that enables facility personnel to communicate with each other or with customers regarding customer accounts. Upon the occurrence of a predetermined event, the system automatically generates notices to customers or facility personnel.

23 Claims, 53 Drawing Sheets

(56) References Cited

U.S. PATENT DOCUMENTS

| | | | | |
|---|---|---|---|---|
| 5,892,905 | A | 4/1999 | Brandt et al. | |
| 5,903,873 | A | 5/1999 | Peterson et al. | 705/4 |
| 5,909,668 | A | 6/1999 | Fukuma | 705/6 |
| 5,946,660 | A * | 8/1999 | McCarty et al. | 705/5 |
| 5,949,411 | A | 9/1999 | Doerr et al. | 345/327 |
| 5,950,173 | A | 9/1999 | Perkowski | 705/26 |
| 6,010,064 | A | 1/2000 | Umeda | 235/375 |
| 6,023,687 | A | 2/2000 | Weatherly et al. | 705/38 |
| 6,049,781 | A | 4/2000 | Forrest et al. | |
| 6,056,194 | A | 5/2000 | Kolls | 235/381 |
| 6,064,981 | A | 5/2000 | Barni et al. | 705/26 |
| 6,085,976 | A | 7/2000 | Sehr | |
| 6,195,648 | B1 | 2/2001 | Simon et al. | 705/40 |
| 6,266,809 | B1 | 7/2001 | Craig et al. | |
| 6,289,319 | B1 | 9/2001 | Lockwood | 705/35 |
| 6,571,197 | B1 | 5/2003 | Frank et al. | |
| 6,721,716 | B1 * | 4/2004 | Gross | 705/40 |
| 6,868,397 | B1 | 3/2005 | McCaslin | |
| 6,999,825 | B2 * | 2/2006 | Inomata | 700/90 |
| 7,069,228 | B1 | 6/2006 | Rose et al. | |
| 2001/0025250 | A1 * | 9/2001 | Gale et al. | 705/10 |
| 2001/0027481 | A1 | 10/2001 | Whyel | |
| 2001/0051885 | A1 | 12/2001 | Nardulli et al. | |
| 2002/0087334 | A1 | 7/2002 | Yamaguchi et al. | |
| 2002/0099613 | A1 | 7/2002 | Swart et al. | |
| 2003/0023453 | A1 * | 1/2003 | Hafen et al. | 705/1 |
| 2003/0149600 | A1 | 8/2003 | Williams | |
| 2004/0088318 | A1 * | 5/2004 | Brady | 707/102 |
| 2005/0021378 | A1 | 1/2005 | Weinstock et al. | |

OTHER PUBLICATIONS

Internet Publication, "Welcome to Ryder TRS". www.yellowtruck.com. Available online at www.archive.org. Feb. 29, 2000.

* cited by examiner

Web Self Storage - WSS3                                                                          Page 1 of 1

Web Self-Storage

*Storage Made Easier*

Home | Customer Sign In | Dealer/Affiliate Sign In | Contact Us | Free Demo!

Business Sign On

From Coast to Coast.
Satisfied Web Self-Storage users

Login ID: _____ 14

Password: _____ 16

[ Log In ]

Are you ready to put the power of Web Self-Storage to use for your company?

BUY NOW!

Want to try it before you buy it?

For a free demo, Click Here

As a business owner what do I need to run Web Self-Storage?

All you need to run Web Self-Storage is an internet connection into your business and Internet Explorer 5.5 or greater.

Internet Explorer 6.0 now available. Click to download

— 12

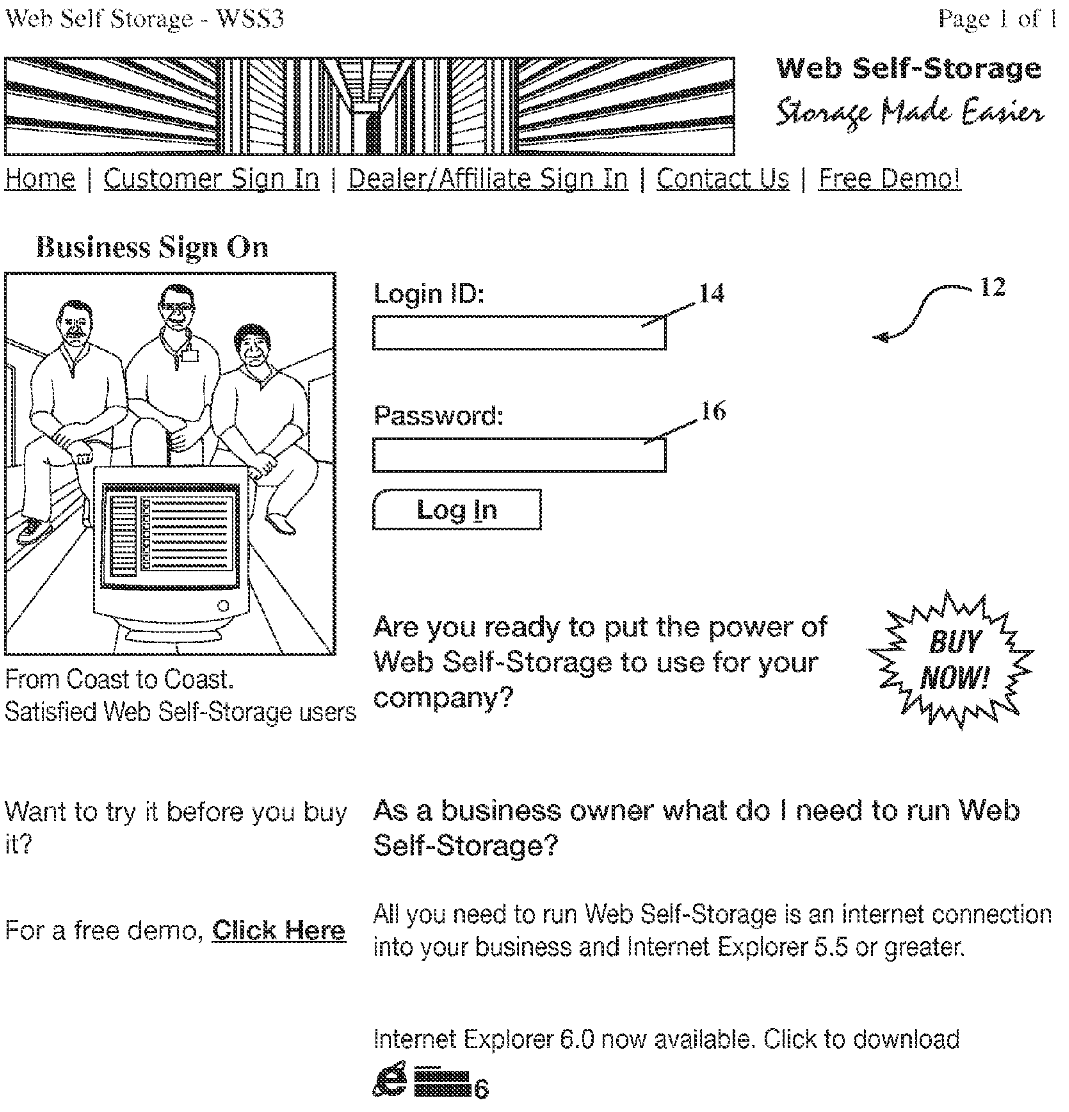

Fig. 1

Storage Main Menu - 990019                                                                 Page 1 of 1

User...     WebSelfStorage - MOJIBI, KATHY
Change Password   Support Phone Number 1-877-626-4455
Room/Truck Chart
Storage Messenger
Storage Note Pad
Training Management...
Inventory Menu
Site Menu
Management Menu Other Links...
U-Haul Dealer
U-Haul GM Miscellaneous...
Program Feedback
Meet The Team ▢▢▢ ▢▢▢ ▢▢▢ ✎
New Customer
20 — ▢▢▢  ▢ Move In
30 — ▢▢▢▢▢▢▢▢ Reservation
Existing Customer
40 — ▢▢▢ × ▢▢▢▢▢▢ Take a Payment
50 — ▢▢▢ ▢▢▢ Move Out
60 — ▢▢▢ ▲▢▢▢▢▢▢ View Contract
70 — ▢▢▢▢▢▢▢ Transfer
Lookups
80 — ▢▢▢ ▲▢▢▢▢▢▢ Open Contracts
90 — ×▢▢▢▢▢▢▢▢ Authorized Access
       × ▢▢▢▢
100 — ▢▢▢▢▢ ▢▢▢▢ Report List

[ Log Out ]

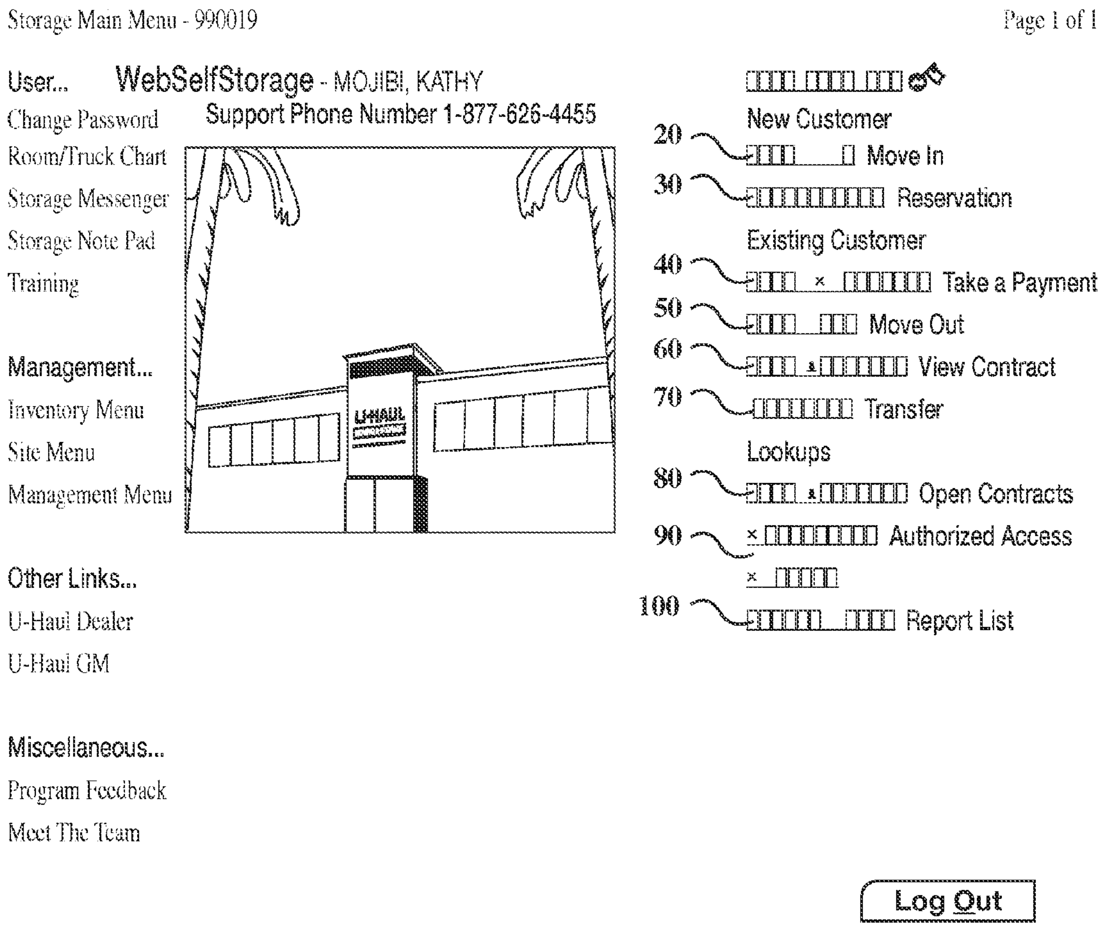

Fig. 2

Customer Type                                                                Page 1 of 1

Customer   Contact   Access Users   Room   Gate Access   Payment Plan   Invoicing   Payment
▲
          201 — Choose A Customer Type
          202 — ○ Business
          203 — ○ Corporate
                  ◉ Individual
          204 —
          205 — ○ System Use

[ Cancel contract ]    [ neXt ]
             (Access Key: B)    (Access Key: X)

Customer Search Engine                                                                 Page 1 of 1

Customer   Contact   Access Users   Room   Gate Access   Payment Plan   Invoicing   Payment ↑   210↘
              Search Customer Information

212↘                          214↘
First Name: [              ]   Last Name: [              ]

[Enter At Least One Field Before Beginning Search]

[ Cancel Contract ]   [    Back    ]   [    Find    ]
      (Access Key: C)       (Access Key: F)   (Access Key: K)

[ Advanced search ]
                       (Access Key: A)

[     Main       ]
                       (Access Key: M)

Individual Customer Results          Page 1 of 1

Customer  Contact  Access Users  Room  Gate Access  Payment Plan  Invoicing  Payment

Individual Customer Results

| | NAME | PHONE | ADDRESS | CITY | STATE | ZIP |
|---|---|---|---|---|---|---|
| ▶ | JOE SMITH | (310)555-1212 | 123 PENNY LANE | LOS ANGELES | CA | 90066 |
| ▶ | JOEL SMITH | (702)558-5119 | 803 ZINNIA CIR | HENDERSON | NV | 89015 |
| ▶ | JOEY SMITH | (480)227-6676 | 249 E SCOTT AVE | GILBERT | AZ | 85234 |

▶ = Selects The Customer

Back   Add
(Access Key: B)   (Access Key: A)

Main
(Access Key: M)

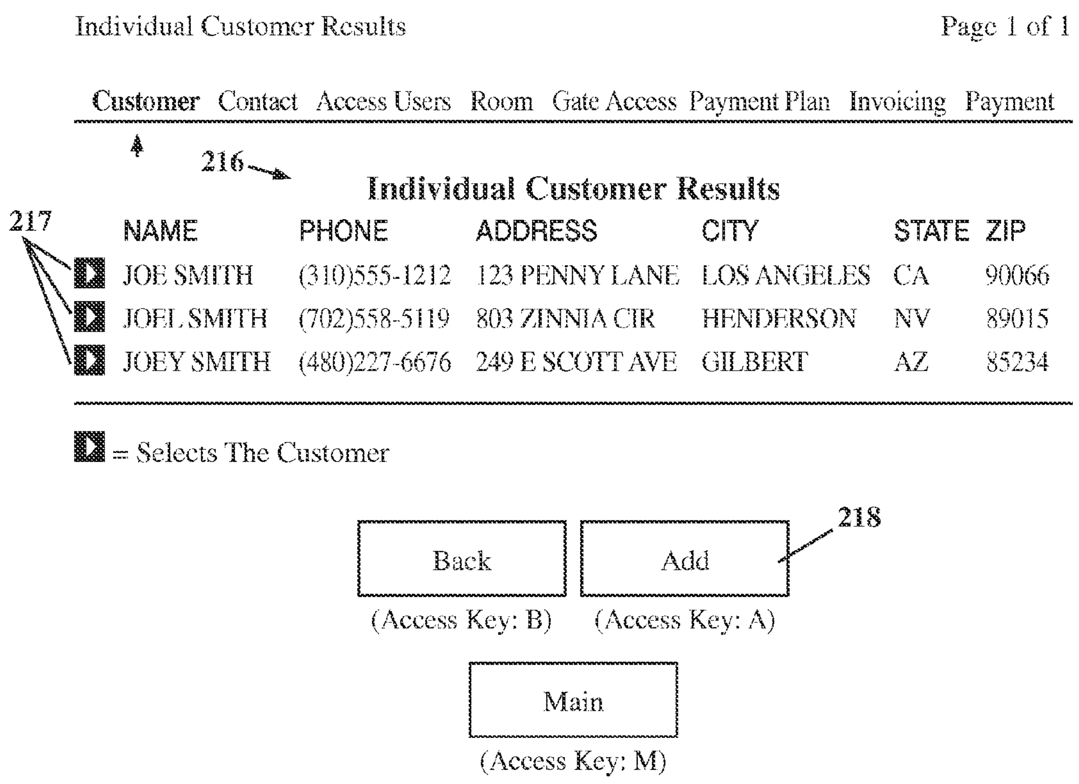

Fig. 5

Customer Information          Page 1 of 1

Customer  Contact  Access Users  Room  Gate Access  Payment Plan  Invoicing  Payment ◉ IMPORTANT, Please Verify Customer's Information! ◉

220 — Individual Customer Information

221 — First Name: [JOE]    Last Name: [SMITH]

222 — Address: [123 PENNY LANE] Apt No: [ ]
Address2: [ ]
City: [LOS ANGELES] State: [CA] Zip: [90066] - [ ]

223 — Home Phone: ([310]) [555] - [1212] Ext: [ ]
Work Phone: ([ ]) [ ] - [ ] Ext: [ ]

224 — SS# or Secondary ID: [ ] CC Expiration Month/Year: [ ] / [ ]

225 — Driver Lic. Or State ID: [ ] State: [ ] Exp Date: [ ] / [ ]

226 — Employer Name: [ ] Phone: ([ ]) [ ] - [ ]

227 — E-Mail Address: [JSMITH@AOL.COM]

228 — Tax Exempt ☐ Number: [ ]

Required Fields

| Cancel contract | Back | neXt |
|---|---|---|
| (Access Key: C) | (Access Key: B) | (Access Key: X) |

| Main |
|---|
| (Access Key: M) |

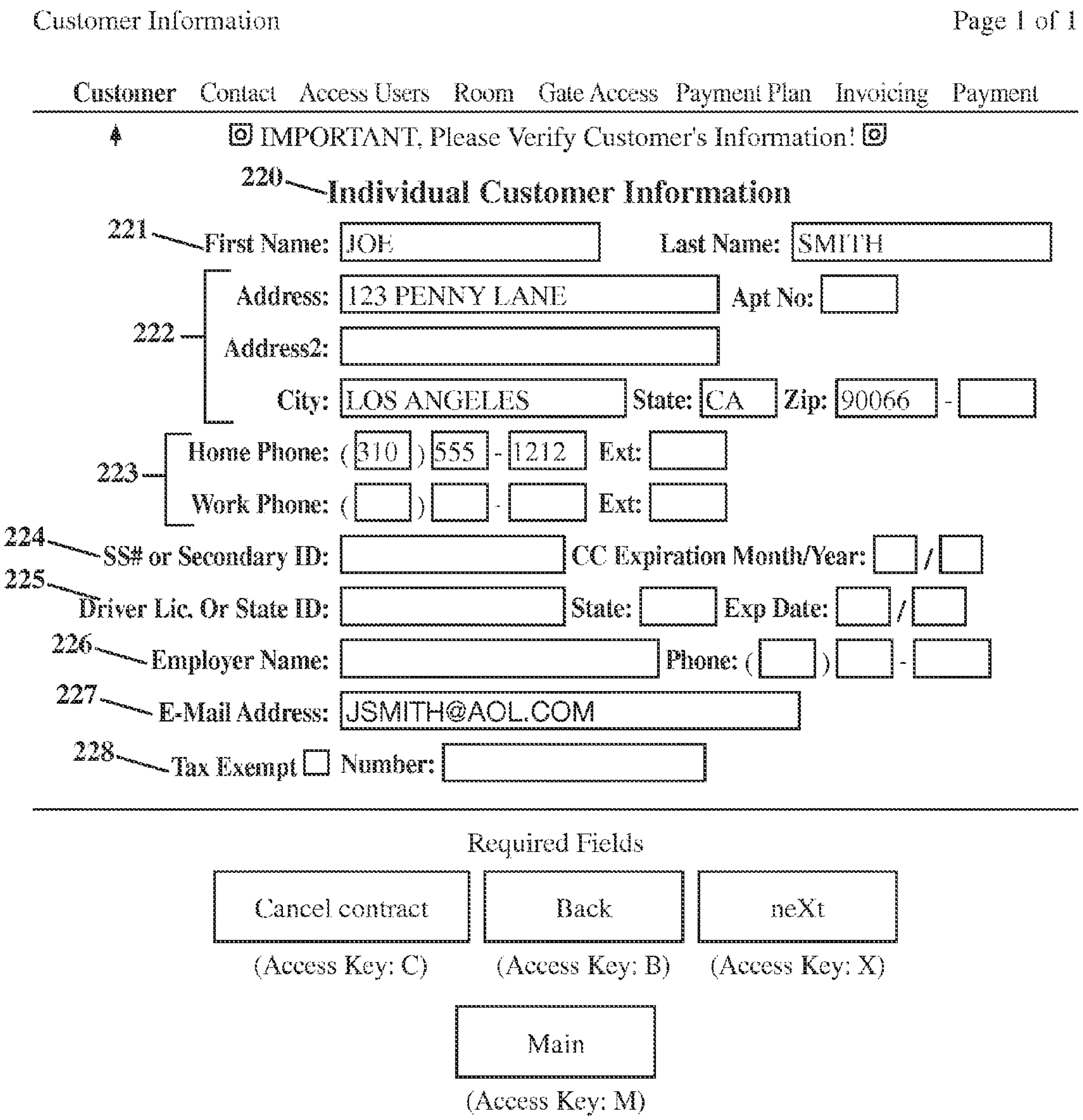

Fig. 6

Alternate Contact List          230 ⟶                                    Page 1 of 1

Customer  Contact  Access Users  Room  Gate Access  Payment Plan  Invoicing  Payment
          ▲

To Assure Notification In Case Of Fire, Flood, Burglary or Break-In

Click The ADD Button To Create A New Contact

232 ⟶ [ Add ]

(Access Key: A)

[ Cancel contract ]   [ Back ]

(Access Key: C)   (Access Key: B)

[ Main ]

(Access Key: M)

Individual Alternate Contact                                    Page 1 of 1

Customer  Contact  Access Users  Room  Gate Access  Payment Plan  Invoicing  Payment
          ▲

To Assure Notification In Case Of Fire, Flood, Burglary or Break-In

233 — ⎡ First Name: [          ]
      ⎣ Last Name: [          ]

234 —— Phone No: ( [  ] ) [  ] - [  ]   Ext: [  ]

235 — ⎡ Address: [          ]
236   ⎣ City: [          ]  State: [  ]  Zip: [  ] - [  ]
   ↘ E-Mail Address: [          ]

Required Fields

[ Back ]      [ Save ]
(Access Key: B)  (Access Key: S)

Authorized Access Individuals                                              Page 1 of 1

Customer   Contact   Access Users   Room   Gate Access   Payment Plan   Invoicing   Payment
---

240 — Authorized Access Individual

241 — First Name: [        ]
      Last Name:  [        ]

242 — Phone No: ( [  ] ) [  ] - [  ]   Ext: [  ]

243 — Address: [                ]
      City: [            ] State: [  ] Zip: [    ] - [  ]

Required Fields

[ Back ]   [ Save ]
(Access Key: B)   (Access Key: S)

Authorized Access Individuals                                              Page 1 of 1

Customer  Contact  Access Users  Room  Gate Access  Payment Plan  Invoicing  Payment
_____

244
247  245        Authorized Access Individuals
/  / NAME      PHONE    ADDRESS       CITY     STATE      ZIP
◻  🔎  JOE SMITH
◻  🔎  JANE SMITH
_____

◻ = Edits The Individual's Record   🔎 = Delete The Individual's Record

|                      |           |                  |
|----------------------|-----------|------------------|
|                      |           | Add              |
|                      |       246 | (Access Key: A)  |
| Cancel contract      | Back      | neXt             |
| (Access Key: C)      | (Access Key: B) | (Access Key: X) |
|                      | Main      |                  |
|                      | (Access Key: M) |            |

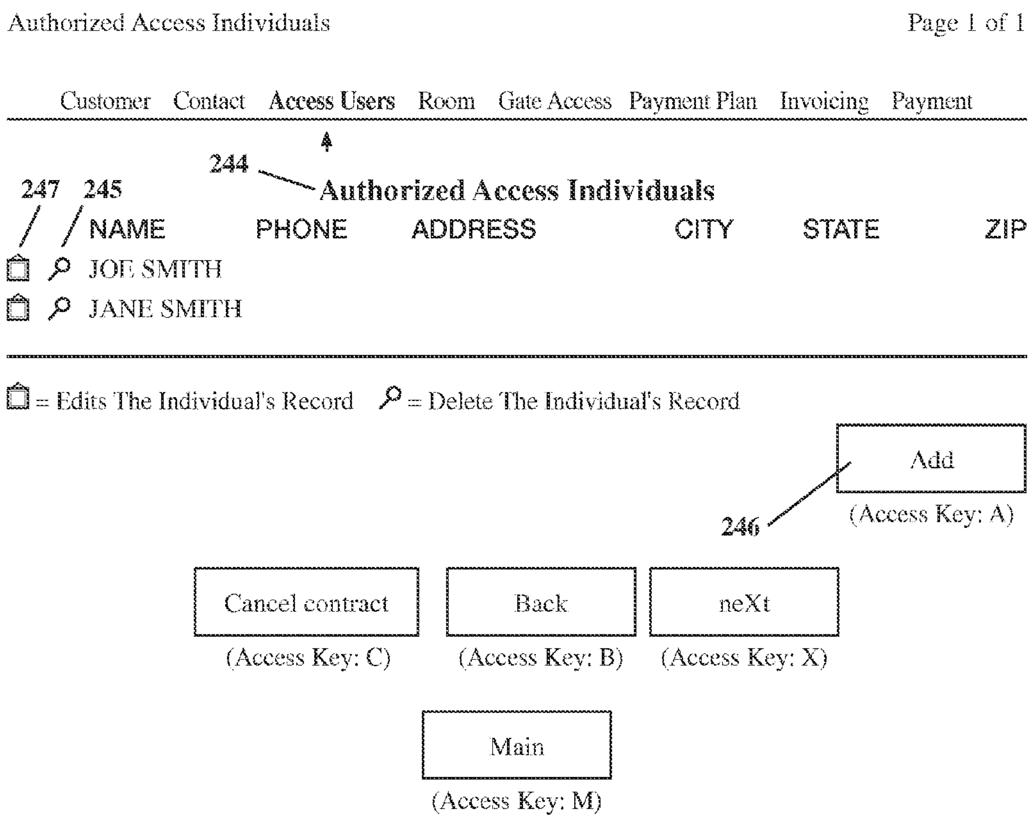

Fig. 10

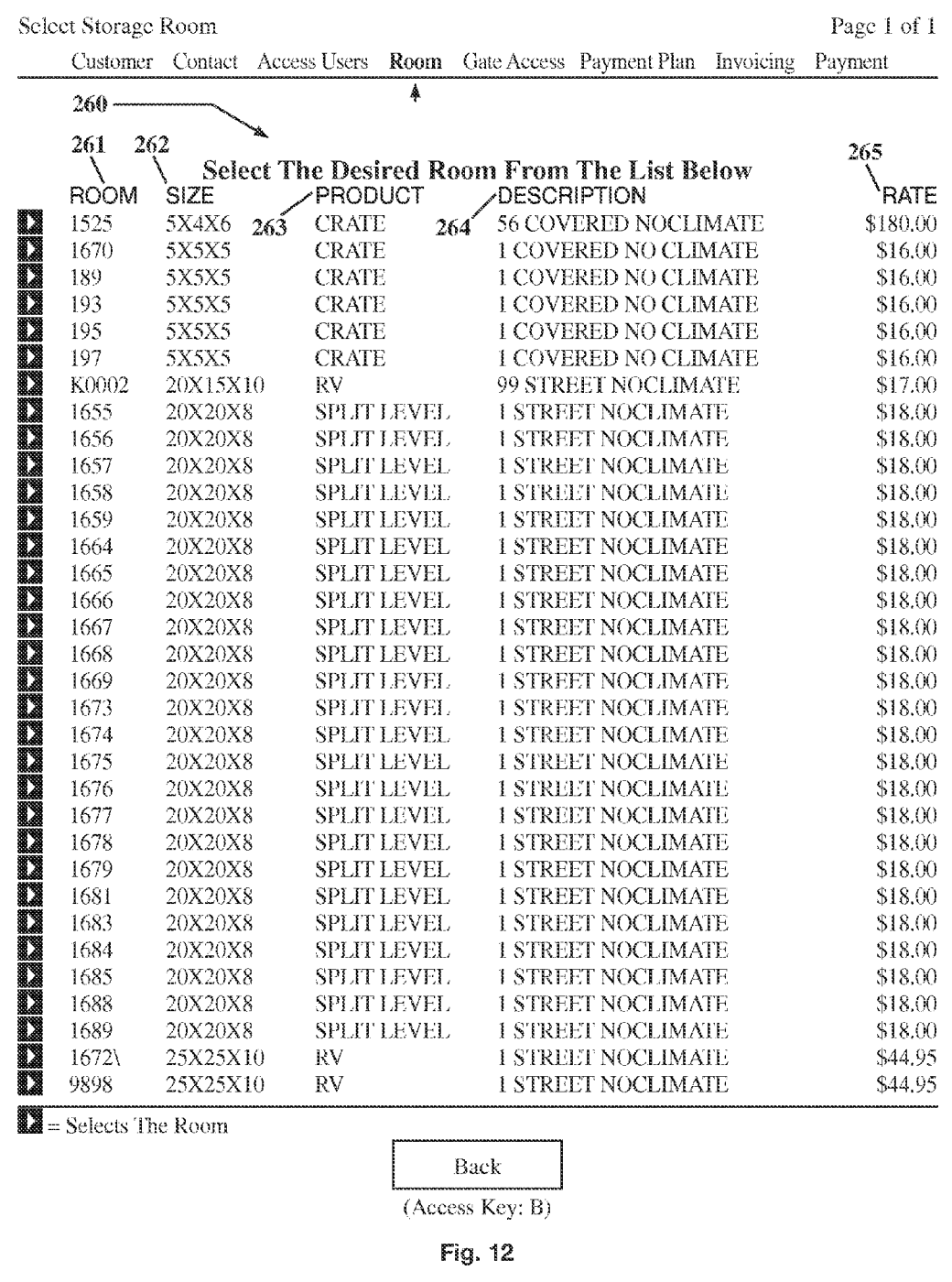

Select Storage Room Page 1 of 1

Customer Contact Access Users Room Gate Access Payment Plan Invoicing Payment

260

261 262 263 264 265

Select The Desired Room From The List Below

| | ROOM | SIZE | PRODUCT | DESCRIPTION | RATE |
|---|---|---|---|---|---|
| ▶ | 1525 | 5X4X6 | CRATE | 56 COVERED NOCLIMATE | $180.00 |
| ▶ | 1670 | 5X5X5 | CRATE | 1 COVERED NO CLIMATE | $16.00 |
| ▶ | 189 | 5X5X5 | CRATE | 1 COVERED NO CLIMATE | $16.00 |
| ▶ | 193 | 5X5X5 | CRATE | 1 COVERED NO CLIMATE | $16.00 |
| ▶ | 195 | 5X5X5 | CRATE | 1 COVERED NO CLIMATE | $16.00 |
| ▶ | 197 | 5X5X5 | CRATE | 1 COVERED NO CLIMATE | $16.00 |
| ▶ | K0002 | 20X15X10 | RV | 99 STREET NOCLIMATE | $17.00 |
| ▶ | 1655 | 20X20X8 | SPLIT LEVEL | 1 STREET NOCLIMATE | $18.00 |
| ▶ | 1656 | 20X20X8 | SPLIT LEVEL | 1 STREET NOCLIMATE | $18.00 |
| ▶ | 1657 | 20X20X8 | SPLIT LEVEL | 1 STREET NOCLIMATE | $18.00 |
| ▶ | 1658 | 20X20X8 | SPLIT LEVEL | 1 STREET NOCLIMATE | $18.00 |
| ▶ | 1659 | 20X20X8 | SPLIT LEVEL | 1 STREET NOCLIMATE | $18.00 |
| ▶ | 1664 | 20X20X8 | SPLIT LEVEL | 1 STREET NOCLIMATE | $18.00 |
| ▶ | 1665 | 20X20X8 | SPLIT LEVEL | 1 STREET NOCLIMATE | $18.00 |
| ▶ | 1666 | 20X20X8 | SPLIT LEVEL | 1 STREET NOCLIMATE | $18.00 |
| ▶ | 1667 | 20X20X8 | SPLIT LEVEL | 1 STREET NOCLIMATE | $18.00 |
| ▶ | 1668 | 20X20X8 | SPLIT LEVEL | 1 STREET NOCLIMATE | $18.00 |
| ▶ | 1669 | 20X20X8 | SPLIT LEVEL | 1 STREET NOCLIMATE | $18.00 |
| ▶ | 1673 | 20X20X8 | SPLIT LEVEL | 1 STREET NOCLIMATE | $18.00 |
| ▶ | 1674 | 20X20X8 | SPLIT LEVEL | 1 STREET NOCLIMATE | $18.00 |
| ▶ | 1675 | 20X20X8 | SPLIT LEVEL | 1 STREET NOCLIMATE | $18.00 |
| ▶ | 1676 | 20X20X8 | SPLIT LEVEL | 1 STREET NOCLIMATE | $18.00 |
| ▶ | 1677 | 20X20X8 | SPLIT LEVEL | 1 STREET NOCLIMATE | $18.00 |
| ▶ | 1678 | 20X20X8 | SPLIT LEVEL | 1 STREET NOCLIMATE | $18.00 |
| ▶ | 1679 | 20X20X8 | SPLIT LEVEL | 1 STREET NOCLIMATE | $18.00 |
| ▶ | 1681 | 20X20X8 | SPLIT LEVEL | 1 STREET NOCLIMATE | $18.00 |
| ▶ | 1683 | 20X20X8 | SPLIT LEVEL | 1 STREET NOCLIMATE | $18.00 |
| ▶ | 1684 | 20X20X8 | SPLIT LEVEL | 1 STREET NOCLIMATE | $18.00 |
| ▶ | 1685 | 20X20X8 | SPLIT LEVEL | 1 STREET NOCLIMATE | $18.00 |
| ▶ | 1688 | 20X20X8 | SPLIT LEVEL | 1 STREET NOCLIMATE | $18.00 |
| ▶ | 1689 | 20X20X8 | SPLIT LEVEL | 1 STREET NOCLIMATE | $18.00 |
| ▶ | 1672\ | 25X25X10 | RV | 1 STREET NOCLIMATE | $44.95 |
| ▶ | 9898 | 25X25X10 | RV | 1 STREET NOCLIMATE | $44.95 |

▶ = Selects The Room

Back (Access Key: B)

Fig. 12

Bill Date - Vacate Date - Room(s) Selected                    Page 1 of 1

Customer   Contact   Access Users   Room   Gate Access   Payment Plan   Invoicing   Payment
───────────────────────────────────────────────────────────────────────────

Input The Next Bill And Expected Vacate Date

Next Bill Date: [3] / [19] / [2002] ──── 266

Edit Date If Customer Request A Different Bill Date

Vacate Date: [ ] / [ ] / [ ] ────267

Leave Blank If Vacate Date Is Not Known

Select Services To Be Attached To This Room

| ROOM | SIZE | PRODUCT | DESCRIPTION | SQ. FT. | BILL | RENT |
|------|------|---------|-------------|---------|------|------|
| 1525 | 5X4X6 | CRATE | 56 COVERED NOCLIMATE | 20 | 3/19/2002 | $180.00 |

270

| | DESCRIPTION | AMOUNT | |
|---|---|---|---|
| IMPORTANT CUSTOMER ALERT: | ☐ SAFESTOR $10,000 | $18.00 | |
| If customer has not elected the SafeStor Protection | ☐ SAFESTOR $15,000 | $24.00 | 271 |
| they must READ and SIGN the Self-Storage | ☐ SAFESTOR $4,000 | $6.00 | |
| Insurance Addendum. A copy of the signed addendum must be retained in their file. | ☐ ACCESS CARD REPLACEMENT | $10.00 | 272 |
| ☐ Check that Addendum has been completed. | ☐ $10 DOLLAR DISCOUNT | ($10.00) | |
| Need Addendum form? Click to print. | ☐ 1 MONTH FREE | (100.00)% | 273 |
| | ☐ 20% SYSTEM MEMBER | (20.00)% | |
| | ☐ COLLEGE PROMOTION | ($10.00) | |
| 275 | ☐ DUMPSTER 1/4TH | $16.75 | |
| | ☐ DUMPSTER 1/4TH | $17.50 | 274 |
| | ☐ DUMPSTER 1/4TH | $19.00 | |

Required Field

[ Back ]   [ Save ]
(Access Key: B)   (Access Key: S)

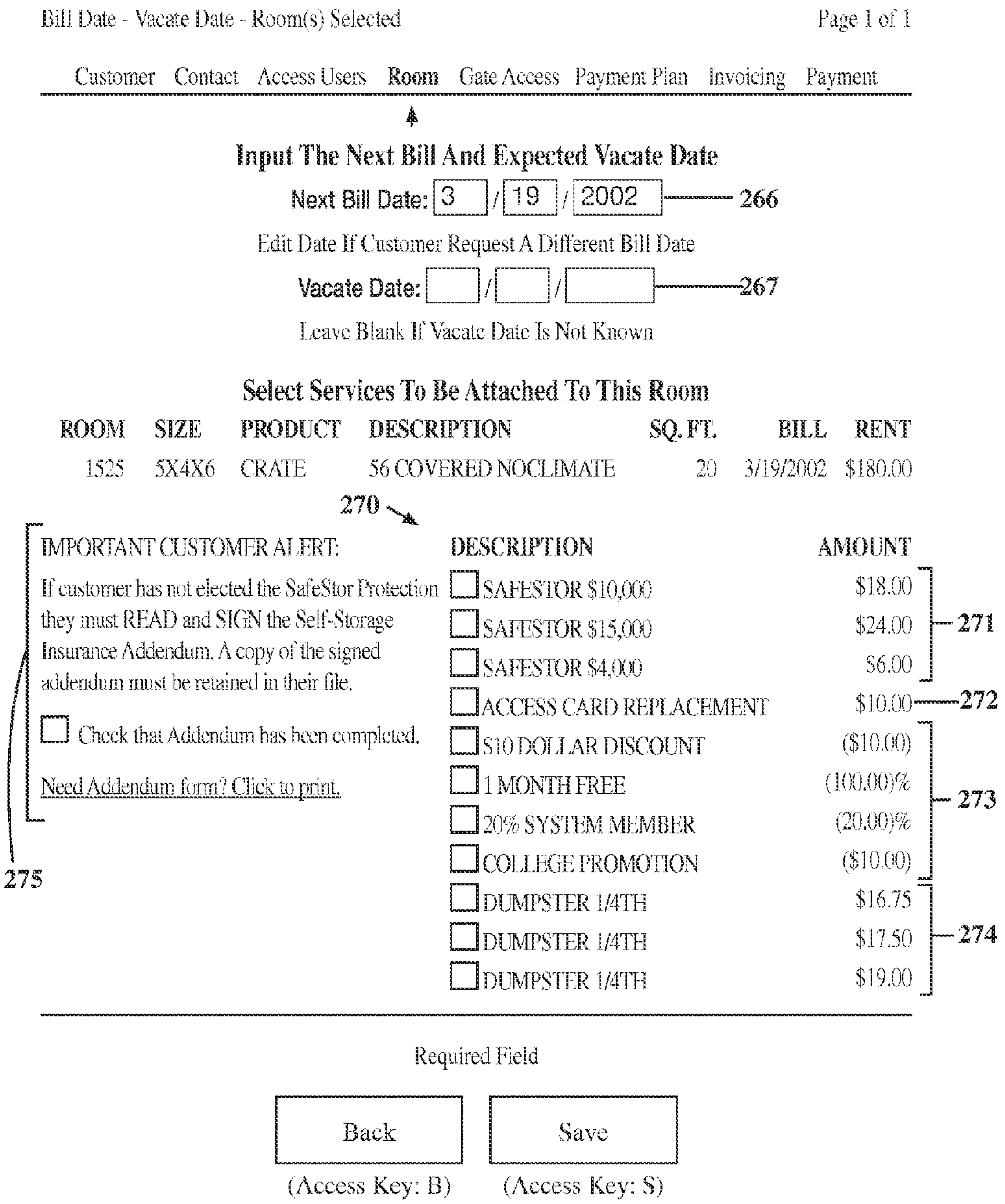

Fig. 13

Selected Rooms                                                    Page 1 of 1

Customer  Contact  Access Users  Room  Gate Access  Payment Plan  Invoicing  Payment
                                     ↑
                           Available Rooms

┌─────────────┐
                                         │     Add     │
    Input The Desired Room #  [       ]│             │
                                         └─────────────┘
                                         (Access Key: A)

- or -
Select A Product Type              Select A Room Size
┌──────────────┐                       ┌──────────────┐
│ All          │ ┌─────────────┐       │ All          │ ┌─────────────┐
│ CRATE        │ │ Display list│       │ 5X5X5        │ │  View list  │
│ RV           │ │             │ - or - │ 20X15X10    │ │             │
│ SPLIT LEVEL  │ └─────────────┘       │ 20X20X8      │ └─────────────┘
└──────────────┘ (Access Key: D)       └──────────────┘ (Access Key: V)

280 ⬉
              Selected Room And Services Information
  ⬚     ROOM  SIZE      PRODUCT      DESCRIPTION              SQ. FT.  BILL      RENT
  ⬚  🔎 1525  1525      CRATE        56 COVERED NOCLIMATE      20   2/19/2002  $180.00
283    282                        ⬚  RECURRING SERVICES                         AMOUNT ⬚     ROOM  SIZE      PRODUCT      DESCRIPTION              SQ. FT.  BILL      RENT
  ⬚  🔎 1670  5X5X5     CRATE        1 COVERED NOCLIMATE       25   2/19/2002   $16.00
                                  ⬚  RECURRING SERVICES                         AMOUNT ⬚     ROOM  SIZE      PRODUCT      DESCRIPTION              SQ. FT.  BILL      RENT
  ⬚  🔎 1685  20X20X8   SPLIT LEVEL  1 STREET NOCLIMATE        400  2/19/2002   $18.00
                                  ⬚  RECURRING SERVICES                         AMOUNT ⬚     ROOM  SIZE      PRODUCT      DESCRIPTION              SQ. FT.  BILL      RENT
  ⬚  🔎 9898  25X25X10  RV           1 STREET NOCLIMATE        625  2/19/2002   $44.95
                                  ⬚  RECURRING SERVICES                         AMOUNT ┌──────────────────────────────────────────────────┐
              │ Type Room Number, Select Product Type, Or Select Room Size │
              └──────────────────────────────────────────────────┘

⬚ = Add Services To Room    🔎 = Delete A Room And/Or Services

┌──────────────┐  ┌──────────────┐  ┌──────────────┐
              │Cancel contract│  │     Back     │  │     neXt     │
              └──────────────┘  └──────────────┘  └──────────────┘
              (Access Key: C)   (Access Key: B)   (Access Key: X)

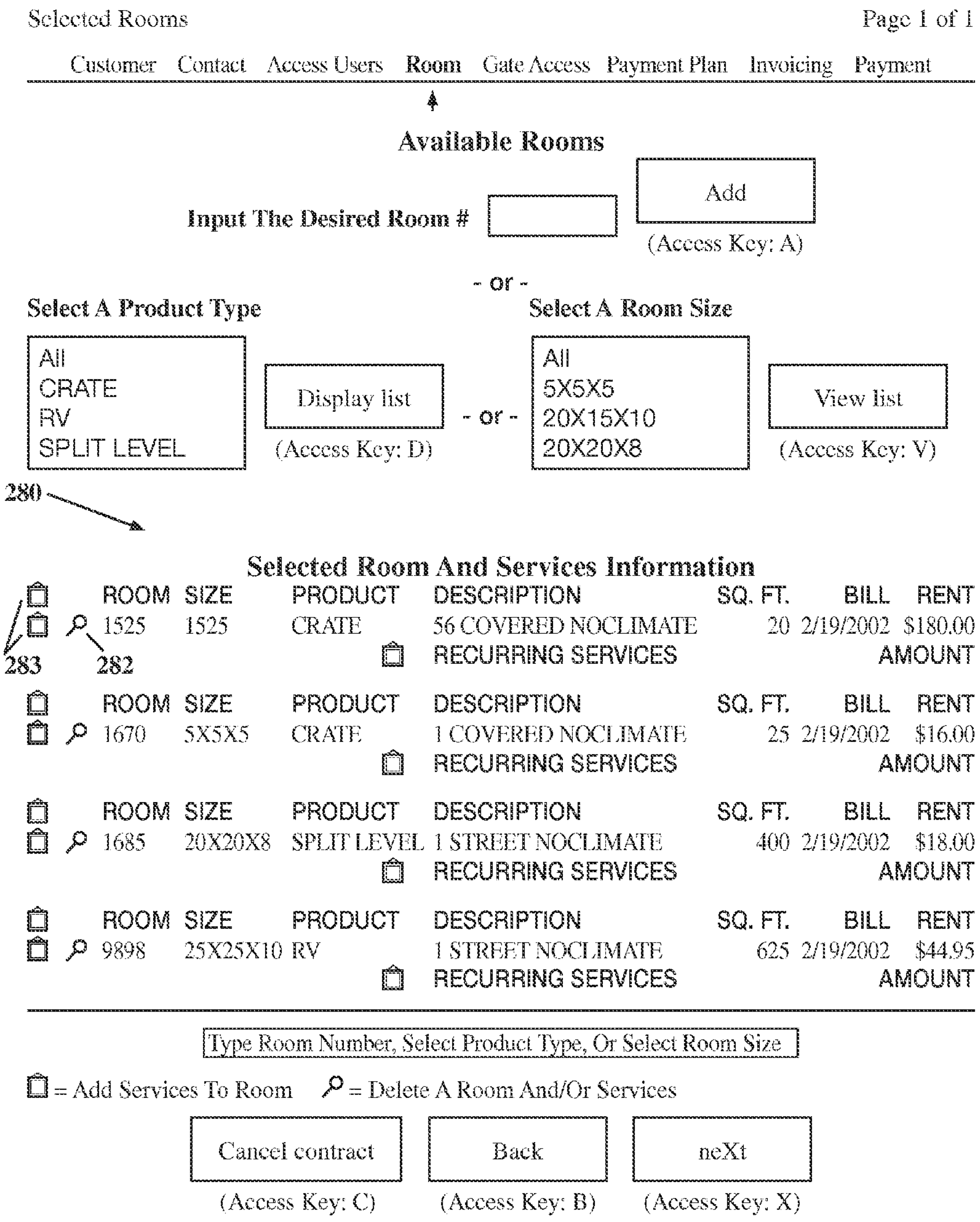

Fig. 14

Gate Access Security Codes                                      Page 1 of 1

Customer   Contact   Access Users   Room   Gate Access   Payment Plan   Invoicing   Payment
                                             ▲
                         Gate Access Security Codes —285

286  PASSWORD        ZONE   ROOM   SIZE       PRODUCT       DESCRIPTION
     [          ]    [ 1 ]  1525   5X4X6      CRATE         56 COVERED NOCLIMATE
     [          ]    [ 1 ]  1670   5X5X5      CRATE         1 COVERED NOCLIMATE
     [          ]    [ 1 ]  1685   20X20X8    SPLIT LEVEL   1 STREET NOCLIMATE
     [          ]    [ 1 ]  9898   25X25X10   RV            1 STREET NOCLIMATE

Required Fields

| Cancel contract |     |   Back   |      |  neXt   |
        (Access Key: C)       (Access Key: B)   (Access Key: X)

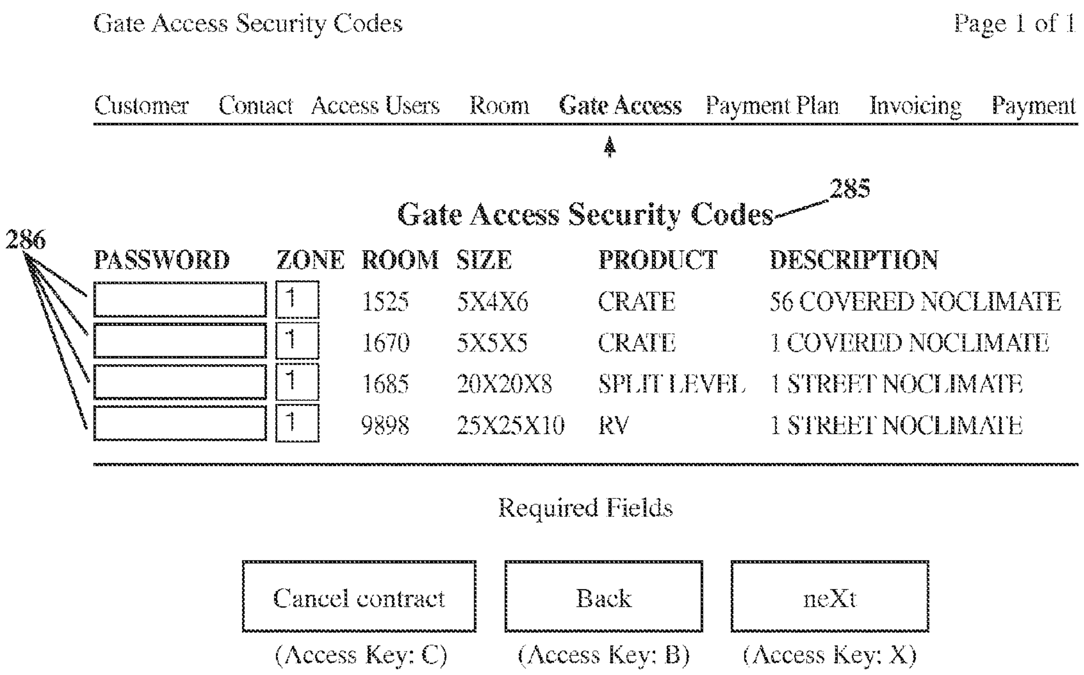

Fig. 15

Credit Card Auto Payment Plan											Page 1 of 1

Customer   Contact   Access Users   Room   Gate Access   Payment Plan   Invoicing   Payment

Credit Card Auto Payment Plan List ← 400

| USE THIS CREDIT CARD | ROOM | SIZE | PRODUCT | DESCRIPTION |
|---|---|---|---|---|
| VISA, 4321321321321 ,05/02 ▼ | 1525 | 5X4X6 | CRATE | 56 COVERED NOCLIMATE |
| None... ▼ | 1670 | 5X5X5 | CRATE | 1 COVERED NOCLIMATE |
| VISA, 4321321321321 ,05/02 ▼ | 1685 | 20X20X8 | SPLIT LEVEL | 1 STREET NOCLIMATE |
| None... ▼ | 9898 | 25X25X10 | RV | 1 STREET NICLIMATE |

414—

Required Field

Add a credit card
(Access Key: A)

| Cancel contract | Back | neXt |
|---|---|---|
| (Access Key: C) | (Access Key: B) | (Access Key: X) |

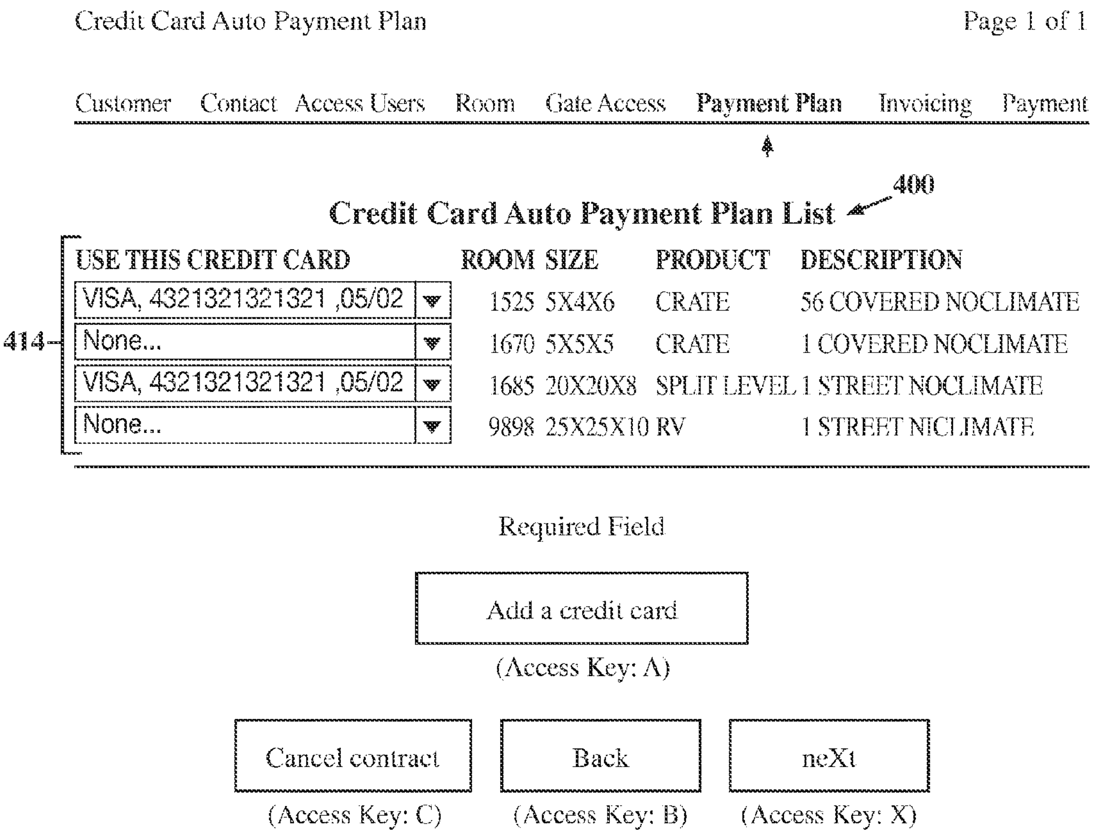

Fig. 16

Point of Sales Storage -- Credit Card Auto Payment Plan          Page 1 of 1

Customer   Contact   Access Users   Room   Gate Access   Payment Plan   Invoicing   Payment

Auto Payment Credit Card Information / 401

| CARD TYPE | ACCOUNT NUMBER | EXP DATE | NAME ON CARD |
|---|---|---|---|
| VISA ▼ | 4321321321321 | 05 / 02 | Joe Smith |
| ↖402 | ↖403 | ↖404 | ↖405 |

Required Fields

| Back | Save |
|---|---|
| (Access Key: B) | (Access Key: S) |

Auto Payment Credit Cards                                    Page 1 of 1

Customer   Contact   Access Users   Room   Gate Access   Payment Plan   Invoicing   Payment

Auto Payment Credit Cards — 410

| | CARD TYPE | ACCOUNT NUMBER | EXP DATE | NAME |
|---|---|---|---|---|
| 🗐 🔎 | VISA | 4321321321321 | 05/02 | JOE SMITH |

🗐 = Edits Credit Card Information   🔎 = Deletes Credit Card Information

412 ——— | Add |

(Access Key: A)

| Back |

(Access Key: B)

Invoice Billing                                                                 Page 1 of 1

Customer   Contact   Access Users   Room   Gate Access   Payment Plan   Invoicing   Payment 415 ↘    Choose Invoice Billing Cycle
          BILLING CYCLE    ROOM    SIZE      PRODUCT      DESCRIPTION              WAIVE FEE
216  Auto Pay Room         1525    5X4X6     CRATE        56 COVERED NOCLIMATE     ☐
     [MONTHLY ▼]           1670    5X5X5     CRATE        1 COVERED NOCLIMATE      ☐
217  Auto Pay Room         1685    20X20X8   SPLIT LEVEL  1 STREET NOCLIMATE       ☐
     [QUARTERLY ▼]         9898    25X25X10  RV           1 STREET NOCLIMATE       ☐

Required Field ( *Monthly=$2.00   Quarterly=$10.00   Semiannual=$15.00   Annual=$20.00* )

[   Back   ]        [   neXt   ]
                         (Access Key: B)      (Access Key: X)

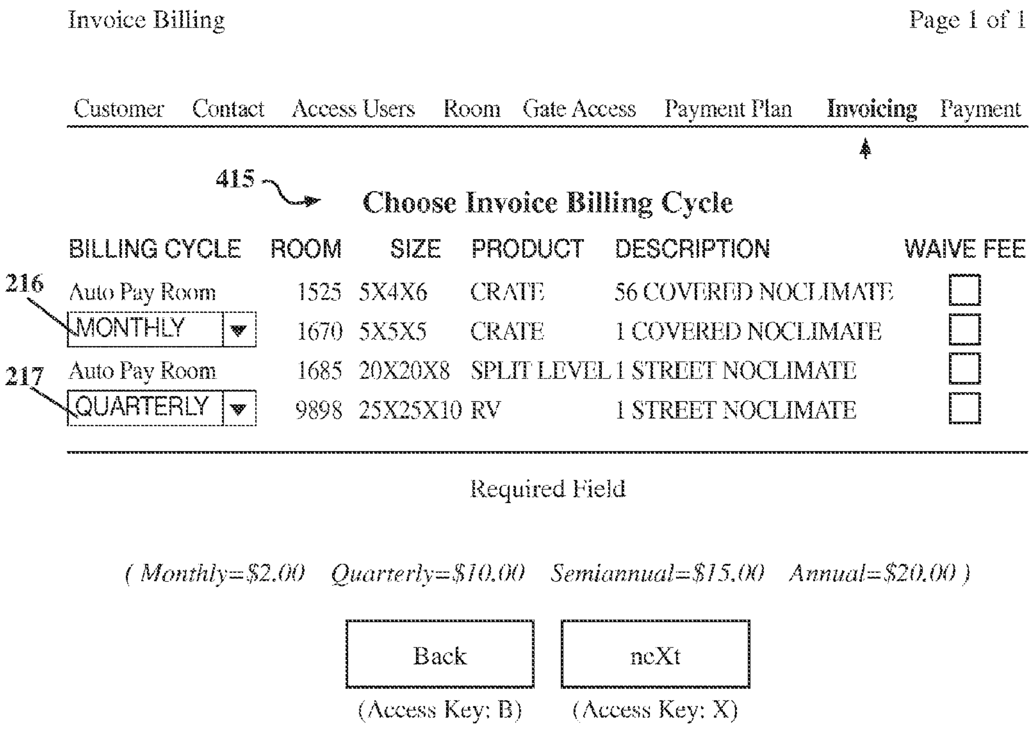

Fig. 19

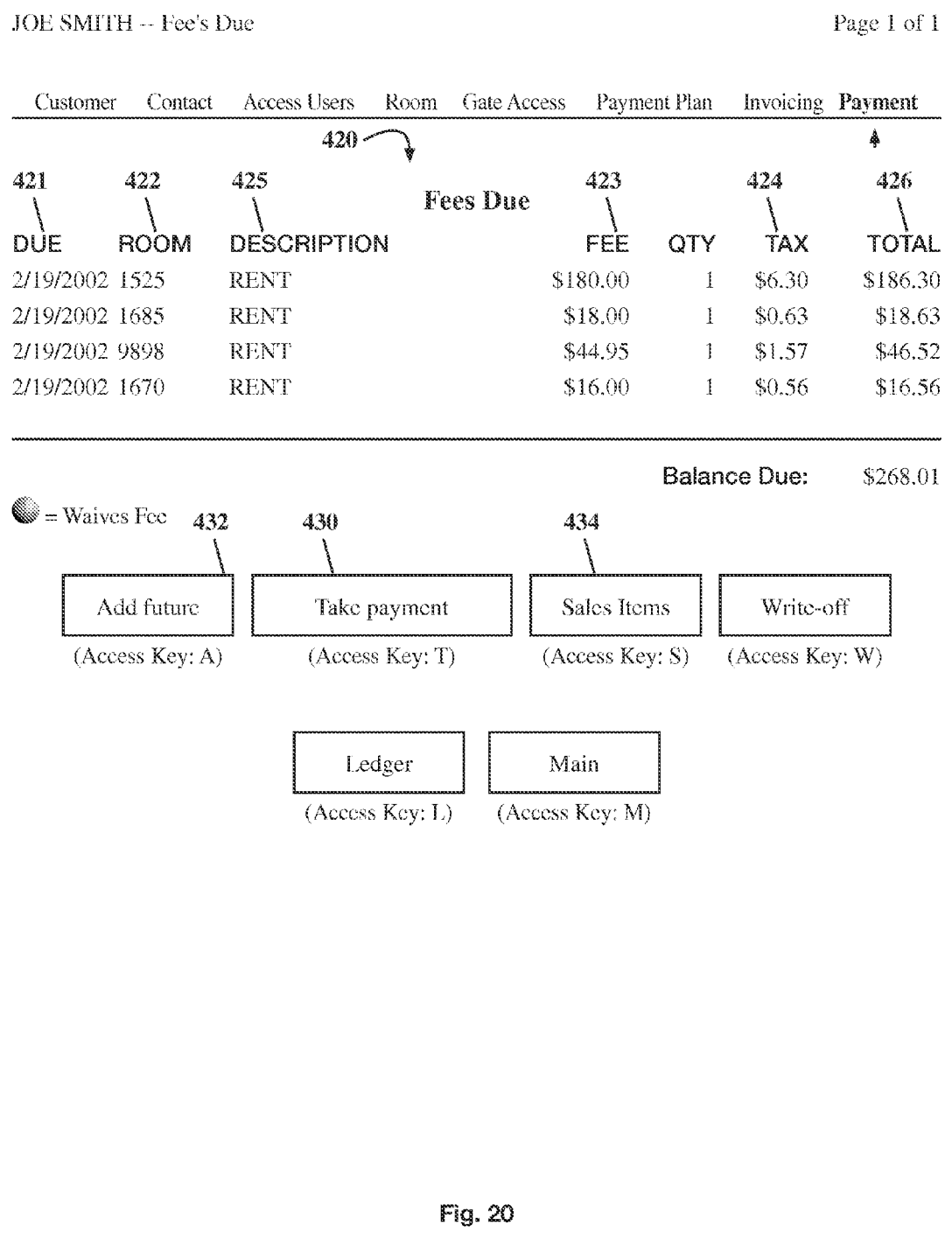

JOE SMITH -- Fee's Due

Customer | Contact | Access Users | Room | Gate Access | Payment Plan | Invoicing | Payment

420

Fees Due

| DUE (421) | ROOM (422) | DESCRIPTION (425) | FEE (423) | QTY | TAX (424) | TOTAL (426) |
|---|---|---|---|---|---|---|
| 2/19/2002 | 1525 | RENT | $180.00 | 1 | $6.30 | $186.30 |
| 2/19/2002 | 1685 | RENT | $18.00 | 1 | $0.63 | $18.63 |
| 2/19/2002 | 9898 | RENT | $44.95 | 1 | $1.57 | $46.52 |
| 2/19/2002 | 1670 | RENT | $16.00 | 1 | $0.56 | $16.56 |

Balance Due: $268.01

● = Waives Fee

[Add future] 432 (Access Key: A)

[Take payment] 430 (Access Key: T)

[Sales Items] 434 (Access Key: S)

[Write-off] (Access Key: W)

[Ledger] (Access Key: L)

[Main] (Access Key: M)

Fig. 20

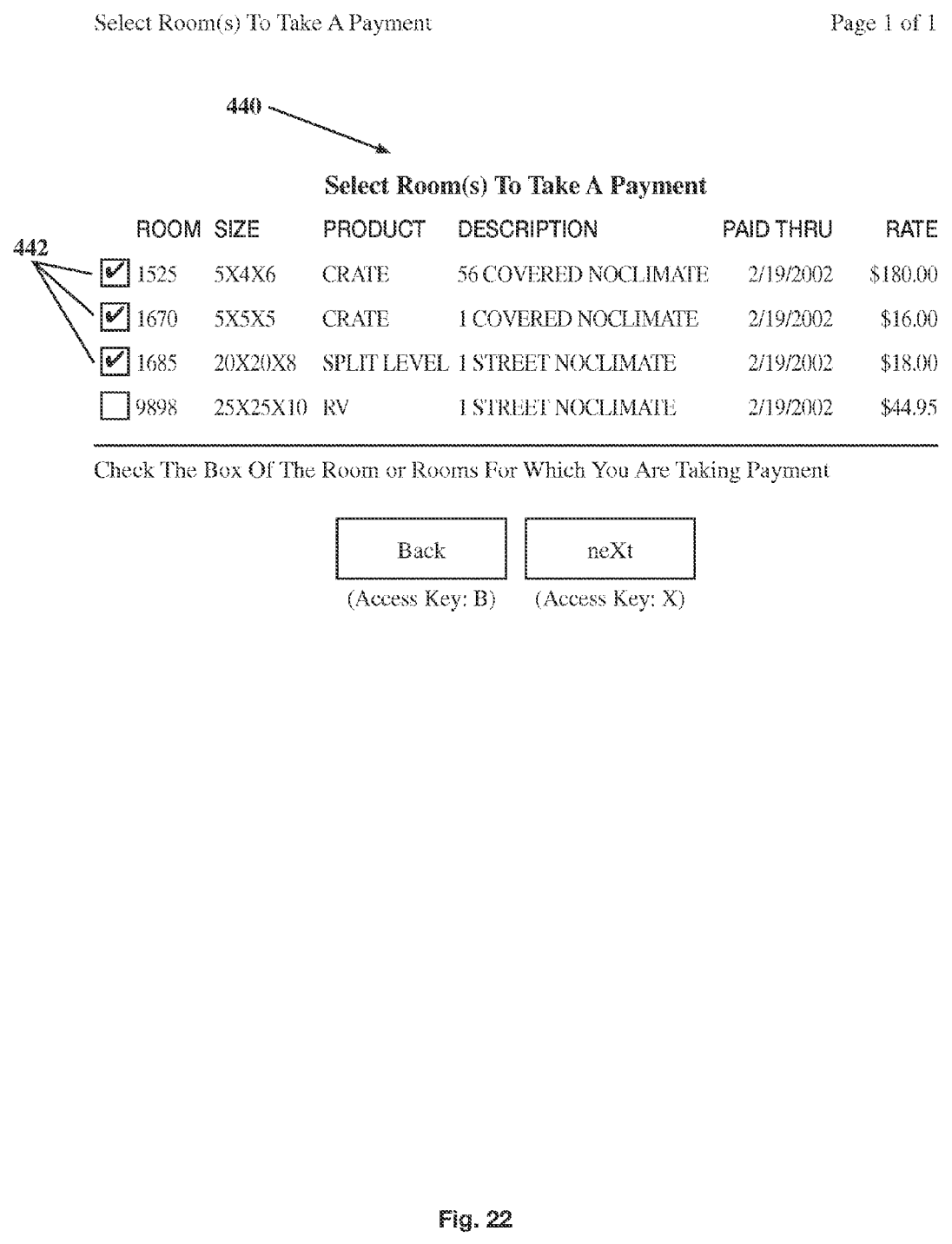

Select Room(s) To Take A Payment Page 1 of 1

440

Select Room(s) To Take A Payment

442

| | ROOM | SIZE | PRODUCT | DESCRIPTION | PAID THRU | RATE |
|---|---|---|---|---|---|---|
| ☑ | 1525 | 5X4X6 | CRATE | 56 COVERED NOCLIMATE | 2/19/2002 | $180.00 |
| ☑ | 1670 | 5X5X5 | CRATE | 1 COVERED NOCLIMATE | 2/19/2002 | $16.00 |
| ☑ | 1685 | 20X20X8 | SPLIT LEVEL | 1 STREET NOCLIMATE | 2/19/2002 | $18.00 |
| ☐ | 9898 | 25X25X10 | RV | 1 STREET NOCLIMATE | 2/19/2002 | $44.95 |

Check The Box Of The Room or Rooms For Which You Are Taking Payment

Back (Access Key: B) neXt (Access Key: X)

Fig. 22

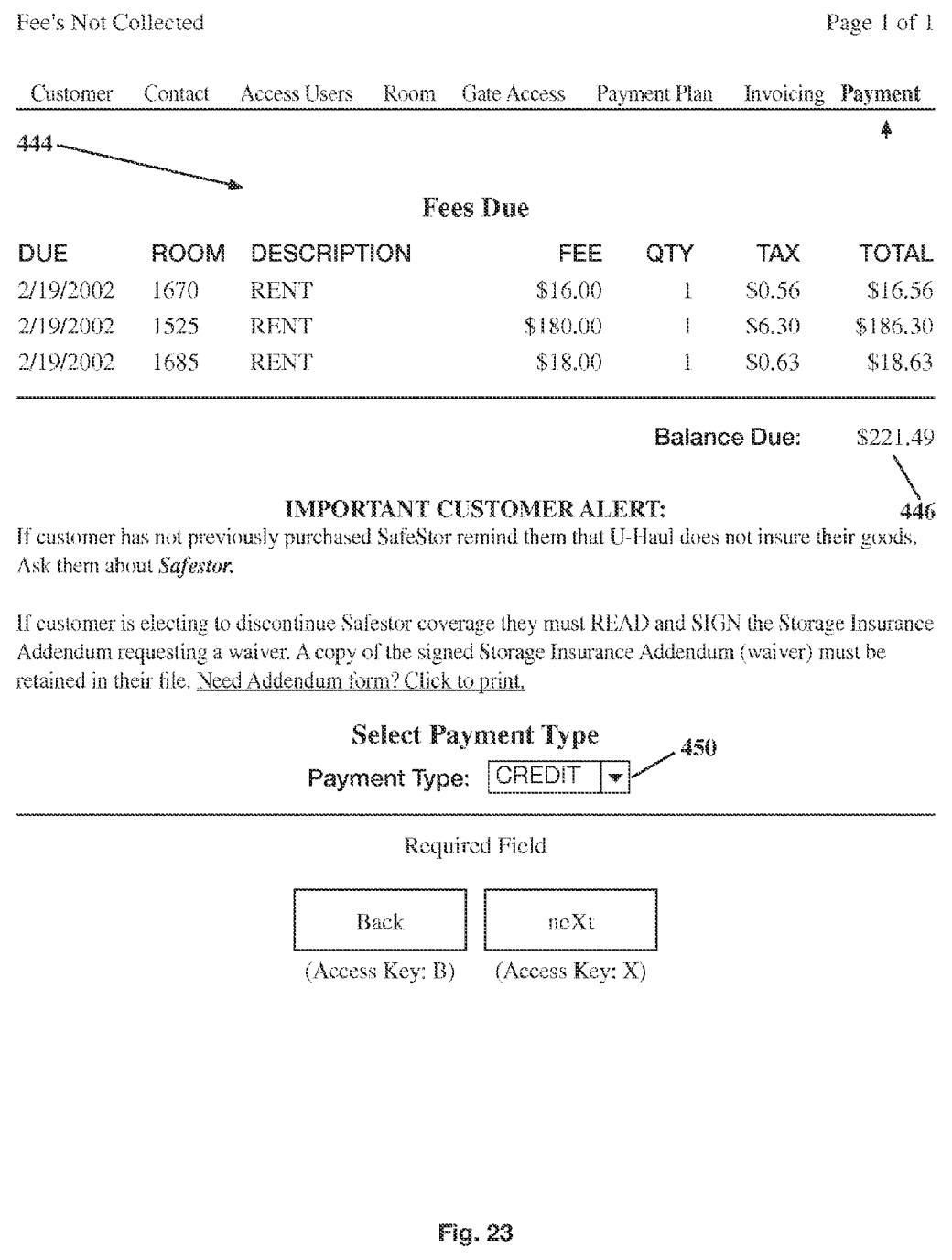

Fee's Not Collected Page 1 of 1

Customer Contact Access Users Room Gate Access Payment Plan Invoicing Payment

444

Fees Due

| DUE | ROOM | DESCRIPTION | FEE | QTY | TAX | TOTAL |
|---|---|---|---|---|---|---|
| 2/19/2002 | 1670 | RENT | $16.00 | 1 | $0.56 | $16.56 |
| 2/19/2002 | 1525 | RENT | $180.00 | 1 | $6.30 | $186.30 |
| 2/19/2002 | 1685 | RENT | $18.00 | 1 | $0.63 | $18.63 |

Balance Due: $221.49

446

IMPORTANT CUSTOMER ALERT:

If customer has not previously purchased SafeStor remind them that U-Haul does not insure their goods. Ask them about *Safestor.*

If customer is electing to discontinue Safestor coverage they must READ and SIGN the Storage Insurance Addendum requesting a waiver. A copy of the signed Storage Insurance Addendum (waiver) must be retained in their file. Need Addendum form? Click to print.

Select Payment Type

Payment Type: CREDIT ▾ 450

Required Field

Back (Access Key: B) neXt (Access Key: X)

Fig. 23

Cash Payment                                                      Page 1 of 1

Customer   Contact   Access Users   Room   Gate Access   Payment Plan   Invoicing   Payment

452 ⟶

Cash Payment

| Cash Amount | |
|---|---|
| Amount Collected: | |
| Total Due: | $221.49 |
| Change: | 0.00 |
| ☐ Apply Change As Credit To Account | |

— 454
— 456
458 —

Required Fields

| Back | Cancel | Save |
|---|---|---|
| (Access Key: B) | (Access Key: C) | (Access Key: S) |

Check Payment            Page 1 of 1

Customer   Contact   Access Users   Room   Gate Access   Payment Plan   Invoicing   Payment

460 ⟶

Check Information

| Customer's Check | |
|---|---|
| 461 — Check Type: [Choose... ▼] | Total Due: $221.49 |
| 462 — Check Number: [ ] | Amount: [ ] — 465 |
| 463 — Bank Number: [ ] | Account Number: [ ] — 464 |

Required Fields

[ Back ]    [ Cancel ]    [ Save ]
(Access Key: B)   (Access Key: C)   (Access Key: S)

Coupon Payment  Page 1 of 1

| Customer | Contact | Access Users | Room | Gate Access | Payment Plan | Invoicing | Payment |

466 ⟶

Coupon Payment

| Coupon |
|---|
| Total Due: $221.49 |
| 467 — Type: [Choose...▼] |
| 468 — Coupon Number: [            ] |
| 469 — Amount Collected: [            ] |

Required Fields

| Back | Cancel | Save |
| (Access Key: B) | (Access Key: C) | (Access Key: S) |

Credit Card Payment             Page 1 of 1

Customer    Contact    Access Users    Room    Gate Access    Payment Plan    Invoicing    Payment

470 →

Credit Card Payment

| Credit Card | |
|---|---|
| 471 — Card Type: [Choose... ▼] | Total Due: $221.49 |
| 472 — Account Number: [ ] | |
| 473 — Name On Credit Card: [ ] | |
| 474 — Expiration Date: [ ] / [ ] | |
| 475 — Amount Collected: [ ] | |

Required Fields

| Back | Cancel | Save |
|---|---|---|
| (Access Key: B) | (Access Key: C) | (Access Key: S) |

Money Order Payment          Page 1 of 1

Customer   Contact   Access Users   Room   Gate Access   Payment Plan   Invoicing   Payment

476 →

Money Order Payment

Money Order

477 — Order Number: [ ]
478 — Amount Collected: [ ]
Total Due: [$221.49]
479 — Change: [0.00]
458 — [ ] Apply Change As Credit To Account Required Fields

| Back | Cancel | Save |
| (Access Key: B) | (Access Key: C) | (Access Key: S) |

JOE SMITH - Fee's Due                                                                 Page 1 of 1

Customer   Contact   Access Users   Room   Gate Access   Payment Plan   Invoicing   Payment
_____

480 →

Fees Due

| DUE | ROOM | DESCRIPTION | FEE | QTY | TAX | TOTAL |
|---|---|---|---|---|---|---|
| 2/19/2002 | 9898 | RENT | $44.95 | 1 | $1.57 | $46.52 |

Balance Due: $46.52

● = Waives Fee

| Add future | Take payment | Sales Items | Write-off |
|---|---|---|---|
| (Access Key: A) | (Access Key: T) | (Access Key: S) | (Access Key: W) |

482 →

Payments Collected

| TYPE | NUMBER | EXP. DATE | AMOUNT |
|---|---|---|---|
| MO | 1234 | / | $221.49 |

Total Paid: $221.49

490 → | Ledger | Main |
(Access Key: L) (Access Key: M)

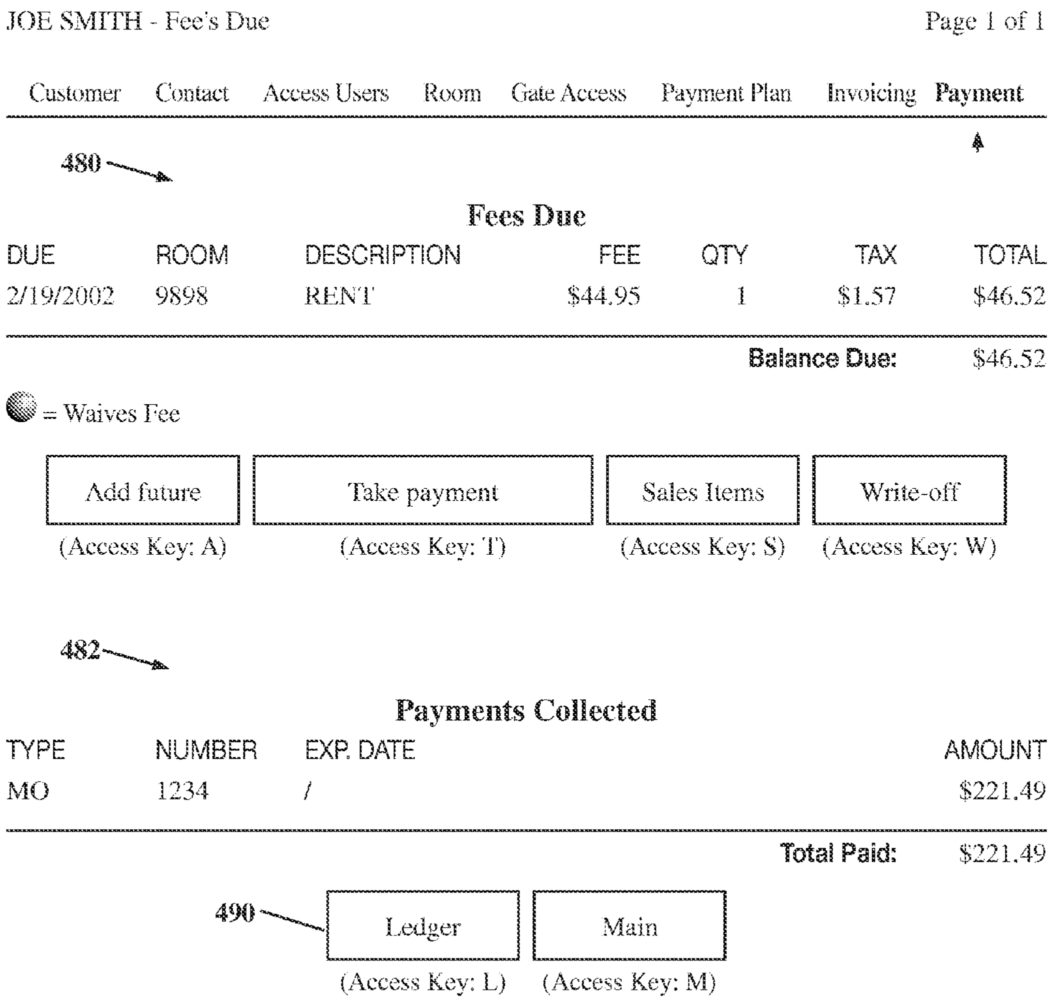

Fig. 29

JOE SMITH - Room/Payment History                                   Page 1 of 1

Room/Payment History

Contract No: 990019-00000000      Customer: JOE SMITH

Show Me          Order            Show Rooms            Balance Due
[60 Days ▼]      [Ascending ▼]    [ALL ▼]               $46.52

| PAID | DUE | THRU | ROOM | DESCRIPTION | RATE | QTY | TAX | TOTAL | BALANCE |
|------|-----|------|------|-------------|------|-----|-----|-------|---------|
| ✔ | 2/19/2002 | 3/18/2002 | 1670 | RENT | $16.00 | 1 | $0.56 | $16.56 | $16.56 |
|   | 2/19/2002 | 3/18/2002 | 9898 | RENT | $44.95 | 1 | $1.57 | $46.52 | $63.08 |
| ✔ | 2/19/2002 | 3/18/2002 | 1525 | RENT | $180.00 | 1 | $6.30 | $186.30 | $249.38 |
| ✔ | 2/19/2002 | 3/18/2002 | 1685 | RENT | $18.00 | 1 | $0.63 | $18.63 | $268.01 |
|   | 2/19/2002 |   |   | MONEY OR- |   |   |   | ($221.49) | $46.52 |

= View Payment Detail   ✔ = Paid in Full   ⊖ = Reversed Charge   ◐ = Waives Selected Fee

[Take payment]        [Main]
(Access Key: T)       (Access Key: M)

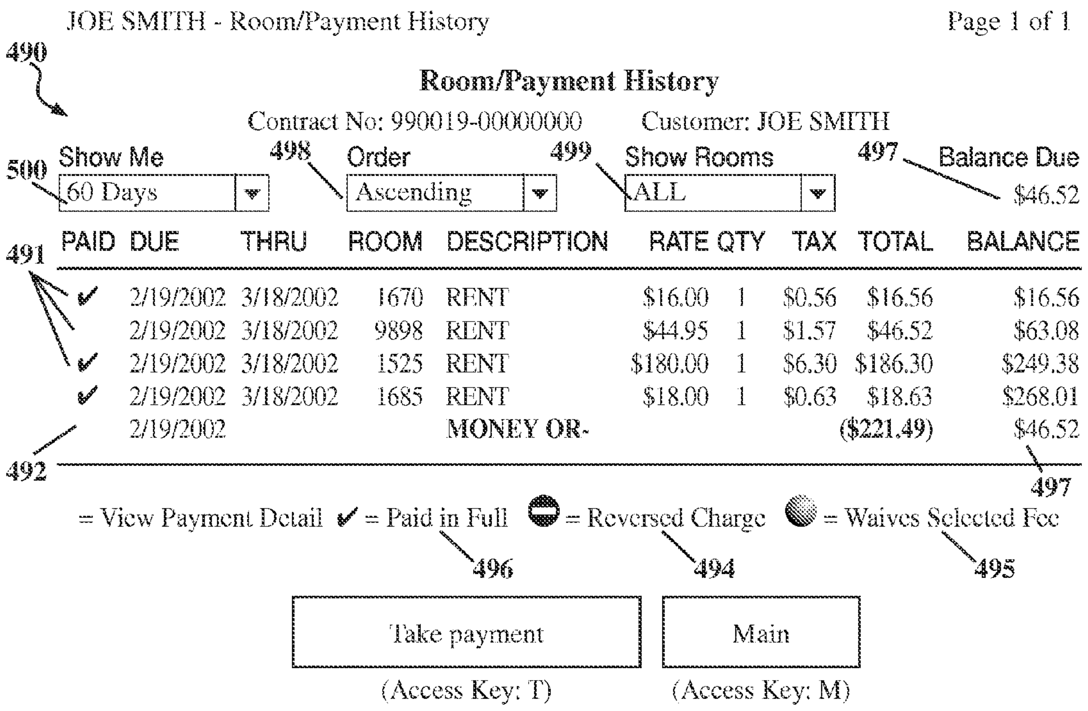

Fig. 30

JOE SMITH - Storage Contract                       Page 1 of 1
*WebSelfStorage*     RENTAL AGREEMENT
CONTRACT BALANCE DUE: $46.52  ACCOUNT TYPE: INDIVIDUAL  CONTRACT NO:990019-00000000

600

♠ Customer Information

| First Name | Last Name | Driver's License Number | State | Expiration Date | |
|---|---|---|---|---|---|
| JOE | SMITH | | | / | |
| Street Address | City | | State | Zip | Social Security Number |
| 123 PENNY LANE | LOS ANGELES | | CA | 90066 | |
| Home Phone | Work Phone | Employer's Name | | Employer's Phone | |
| (310)555-1212 | | | | | |

♠ Alternate Contact

| Last Name | First Name | Home Phone | |
|---|---|---|---|
| SMITH | JOE | | |
| Street Address | City | State | Zip |
| | | | |

♠ Authorized Access Person(s)

| Last Name | First Name | Last Name | First Name | Last Name | First Name |
|---|---|---|---|---|---|
| SMITH | JOE | SMITH | JANE | | |

♠ Authorized Access Person(s)

| Room | Size | Status | Autopay | Bal Due | Moved In | Next Due | Access Code | Invoice Billing | Rate |
|---|---|---|---|---|---|---|---|---|---|
| 1525 | 5X5X6 | CURRENT | YES | $0.00 | 2/19/2002 | 3/19/2002 | 32 | NO | $180.00 |
| 1670 | 5X5X5 | CURRENT | NO | $0.00 | 2/19/2002 | 3/19/2002 | 43 | MONTHLY | $16.00 |
| 1685 | 20X20X8 | CURRENT | YES | $0.00 | 2/19/2002 | 3/19/2002 | 54 | NO | $18.00 |
| 9898 | 25X25X10 | **DELINQUENT** | NO | $46.52 | 2/19/2002 | 2/19/2002 | 65 | QUARTERLY | $44.95 |

♠ Services

| Description | Start Date | Room | Next Due | Amount |
|---|---|---|---|---|
| | | | | |

♠ Credit Card Payment Plan - Optional

| Room | Size | Type | Card Number | Expiration Date |
|---|---|---|---|---|
| 1525 | 5X4X6 | VISA | 4321321321321 | 05/02 |
| 1685 | 20X20X8 | VISA | 4321321321321 | 05/02 |

♠ Room/Payment History

| Pay Date | Receipt Number | Type | Number | Auth Code | Amount |
|---|---|---|---|---|---|
| 2/19/2002 7:07:02 PM | | MO | 1234 | | $221.49 |

♠ Notes

| |
|---|
| | 

Cancel contract (Access Key: C)

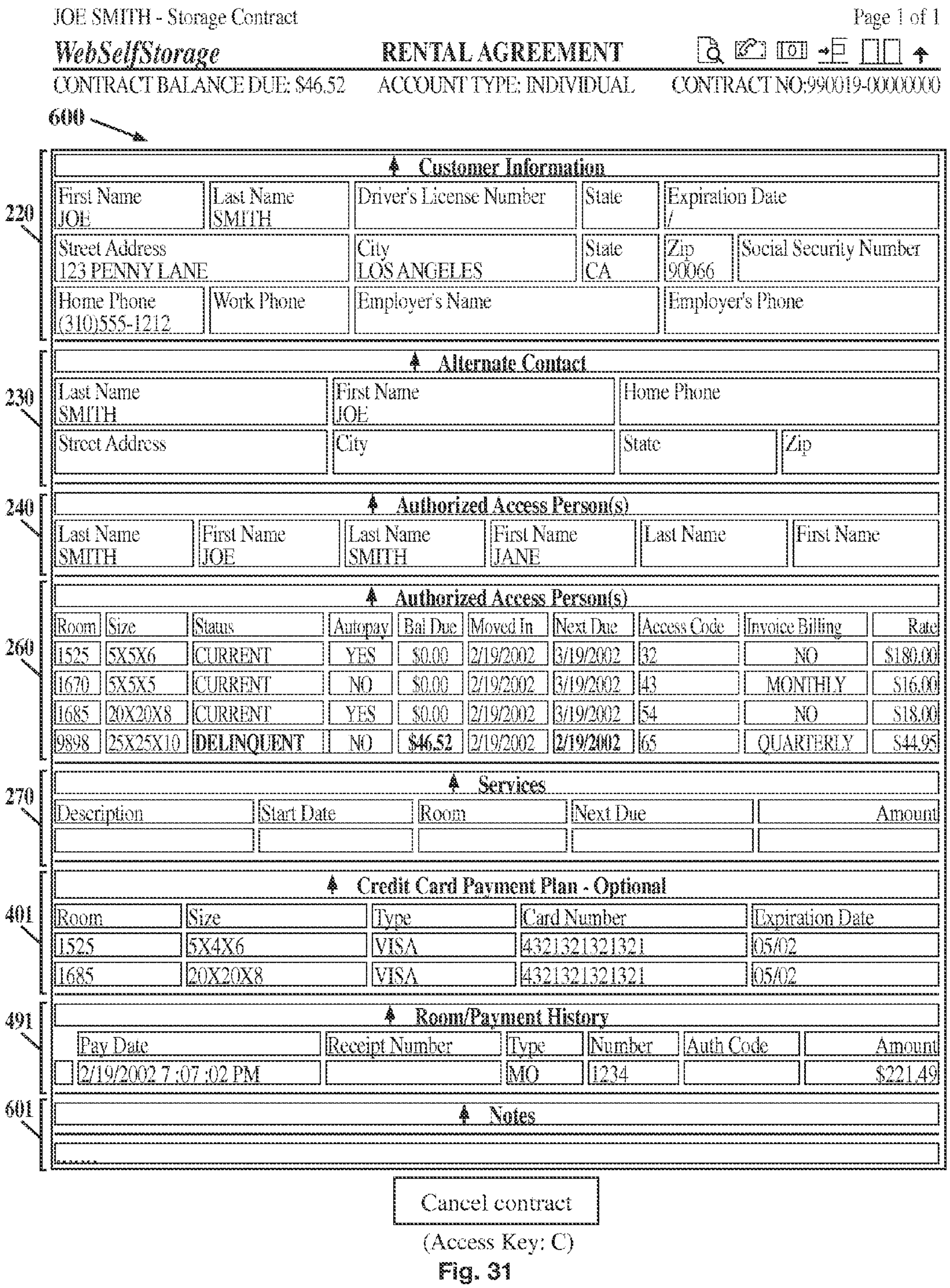

Fig. 31

Customer Search Engine                                                            Page 1 of 1

| Customer | Location | Room | Move-In Date | Payment |

210 ⇘

Search Customer Information

First Name: [          ]   Last Name: [          ]

[Enter At Least One Field Before Beginning Search]

| Clear Reservation | Find | sKip |
| (Access Key: C) | (Access Key: F) | (Access Key: K) |

Advanced search
(Access Key: A)

Main
(Access Key: M)

Storage Locations Page 1 of 1

Customer Location Room Move-In Date Payment

301

Key In The Entity/State or Select The State To Choose A Location Below

Entity: [ ] -or- State: [ ]

302

Clear Reservation (Access Key: C)

Back (Access Key: B)

neXt (Access Key: X)

Main (Access Key: M)

Storage Locations                                                   Page 1 of 1

| Customer | Location | Room | Move-In Date | Payment |
|---|---|---|---|---|

303

CA - Choose A City From The List Below

| | | |
|---|---|---|
| ALTADENA | ANAHEIM | BAKERSFIELD |
| BARSTOW | BELMONT | BURBANK |
| CANYON COUNTRY | CARLSBAD | CATHEDRAL CITY |
| CHATSWORTH | CHICO | CHULA VISTA |
| CITY OF INDUSTRY | CORONA | COVINA |
| DUBLIN | EL CAJON | EL CENTRO |
| ESCONDIDO | FONTANA | FREMONT |
| FULLERTON | GARDEN GROVE | GARDENA |
| GLENDALE | GLENDORA | INGLEWOOD |
| LA HABRA | LANCASTER | LEMON GROVE |
| LIVERMORE | LODI | LONG BEACH |
| LOS ANGELES | LOS ANGELES NORTH | LYNWOOD |
| NORTHRIDGE | OCEANSIDE | ONTARIO |
| PASADENA | POMONA | POWAY |
| REDWOOD CITY | RIALTO | ROSEMEAD |
| SACRAMENTO EAST | SACRAMENTO WEST | SAN BERNADINO |
| SAN CLEMENTE | SAN DIEGO | SAN FRANCISCO |
| SAN JOSE | SANTA ANA | SANTA BARBARA |
| SANTA ROSA | SEPULVEDA | SPRING VALLEY |
| STOCKTON | TUSTIN | UKIAH |
| VACAVILLE | WESTMINSTER | WHITTIER |

---

| Clear Reservation | Back |
|---|---|
| (Access Key: C) | (Access Key: B) |

Main
(Access Key: M)

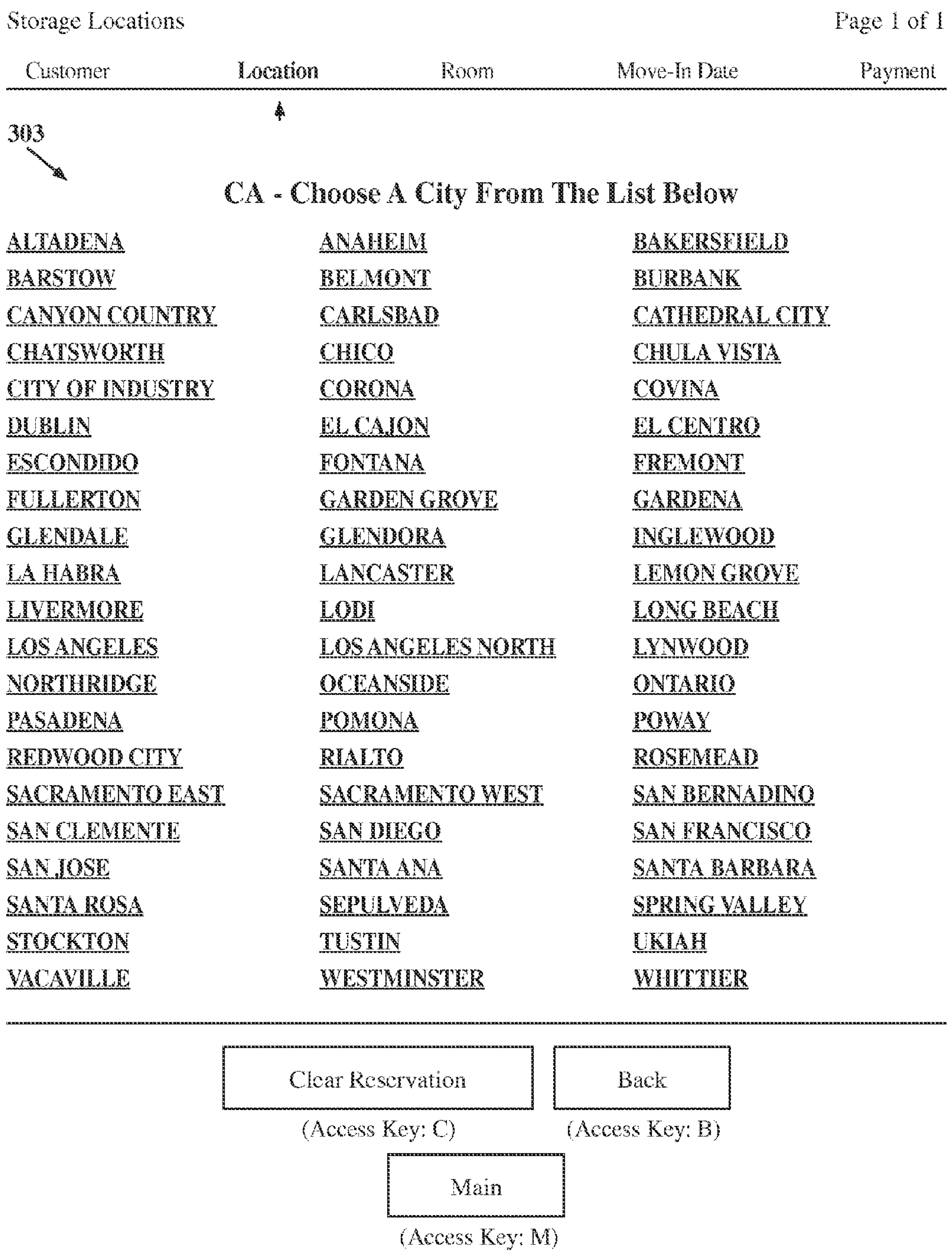

Fig. 34

Storage Locations                                                               Page 1 of 1

| Customer | Location | Room | Move-In Date | Payment |
|---|---|---|---|---|

304

NORTHRIDGE, CA - Choose A Location From The List Below

| % OCC | ENTITY | NAME | ADDRESS | PHONE |
|---|---|---|---|---|
| ▶ 96.88% | 711085 | U-HAUL NORTHRIDGE | 18160 PARTHENIA ST | (818)993-7470 |

▶ = Entity Does Accept Remote Reservations    ⊘ = Entity Does Not Accept Remote Reservations

[ Clear Reservation ]      [ Back ]
                       (Access Key: C)       (Access Key: B)

[ neXt ]
                              (Access Key: X)

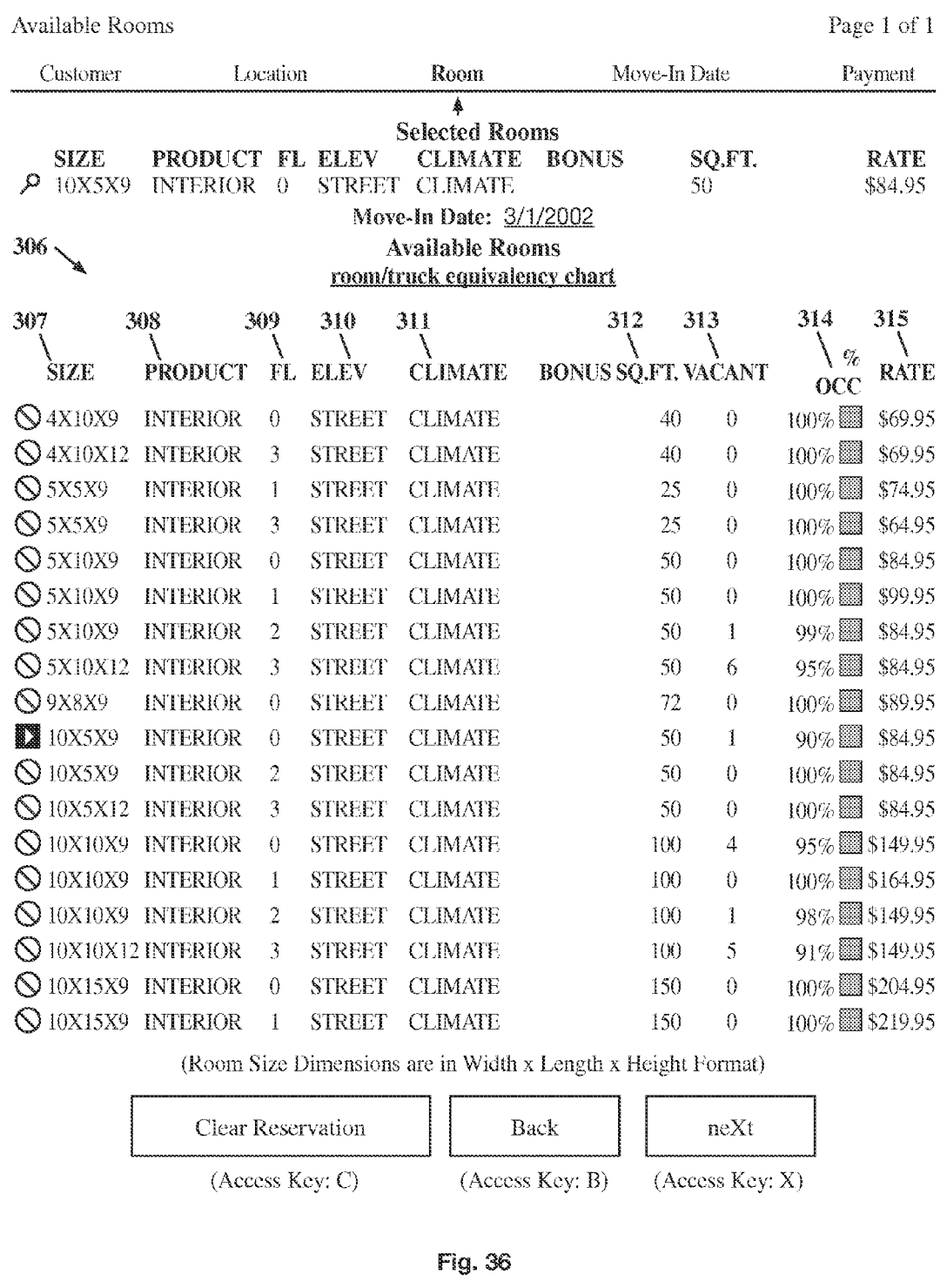

Available Rooms Page 1 of 1

Customer Location Room Move-In Date Payment

Selected Rooms

| SIZE | PRODUCT | FL | ELEV | CLIMATE | BONUS | SQ.FT. | RATE |
|---|---|---|---|---|---|---|---|
| 10X5X9 | INTERIOR | 0 | STREET | CLIMATE | | 50 | $84.95 |

Move-In Date: 3/1/2002

306

Available Rooms room/truck equivalency chart

| SIZE (307) | PRODUCT (308) | FL (309) | ELEV (310) | CLIMATE (311) | BONUS | SQ.FT. (312) | VACANT (313) | % OCC (314) | RATE (315) |
|---|---|---|---|---|---|---|---|---|---|
| 4X10X9 | INTERIOR | 0 | STREET | CLIMATE | | 40 | 0 | 100% | $69.95 |
| 4X10X12 | INTERIOR | 3 | STREET | CLIMATE | | 40 | 0 | 100% | $69.95 |
| 5X5X9 | INTERIOR | 1 | STREET | CLIMATE | | 25 | 0 | 100% | $74.95 |
| 5X5X9 | INTERIOR | 3 | STREET | CLIMATE | | 25 | 0 | 100% | $64.95 |
| 5X10X9 | INTERIOR | 0 | STREET | CLIMATE | | 50 | 0 | 100% | $84.95 |
| 5X10X9 | INTERIOR | 1 | STREET | CLIMATE | | 50 | 0 | 100% | $99.95 |
| 5X10X9 | INTERIOR | 2 | STREET | CLIMATE | | 50 | 1 | 99% | $84.95 |
| 5X10X12 | INTERIOR | 3 | STREET | CLIMATE | | 50 | 6 | 95% | $84.95 |
| 9X8X9 | INTERIOR | 0 | STREET | CLIMATE | | 72 | 0 | 100% | $89.95 |
| 10X5X9 | INTERIOR | 0 | STREET | CLIMATE | | 50 | 1 | 90% | $84.95 |
| 10X5X9 | INTERIOR | 2 | STREET | CLIMATE | | 50 | 0 | 100% | $84.95 |
| 10X5X12 | INTERIOR | 3 | STREET | CLIMATE | | 50 | 0 | 100% | $84.95 |
| 10X10X9 | INTERIOR | 0 | STREET | CLIMATE | | 100 | 4 | 95% | $149.95 |
| 10X10X9 | INTERIOR | 1 | STREET | CLIMATE | | 100 | 0 | 100% | $164.95 |
| 10X10X9 | INTERIOR | 2 | STREET | CLIMATE | | 100 | 1 | 98% | $149.95 |
| 10X10X12 | INTERIOR | 3 | STREET | CLIMATE | | 100 | 5 | 91% | $149.95 |
| 10X15X9 | INTERIOR | 0 | STREET | CLIMATE | | 150 | 0 | 100% | $204.95 |
| 10X15X9 | INTERIOR | 1 | STREET | CLIMATE | | 150 | 0 | 100% | $219.95 |

(Room Size Dimensions are in Width x Length x Height Format)

Clear Reservation (Access Key: C) | Back (Access Key: B) | neXt (Access Key: X)

Fig. 36

Reservation Date                                                    Page 1 of 1

| Customer | Location | Room | Move-In Date | Payment |
|----------|----------|------|--------------|---------|

Selected Size

| SIZE | PRODUCT | FLOOR | ELEV | CLIMATE | BONUS | SQ. FT. | RATE |
|------|---------|-------|------|---------|-------|---------|------|
| 10X5X9 | INTERIOR | 0 | STREET | CLIMATE | | 50 | $84.95 |

Input The Move-In Date

Date: ☐ / ☐ / ☐  —320

Required Fields

Cancel        Save
(Access Key: C)  (Access Key: S)

Lookup A Contact                                                      Page 1 of 1

41

Contract/Reservation Search Engine

Type: [All ▼]   View Cancelled Contracts: ☐

Contract Number: [990019] - [         ]  ←42

Storage Unit: [          ] —43

First Name: [        ]   Last Name: [            ]

Phone Number: ( [   ] ) [   ] - [    ]

Credit Card Number: [              ]        —44

Business Name: [              ]

Corporate Account #: [     ]

System Use Entity Number: [     ]

Receipt Number: [          ] —46

Reservation Cancellation #: [          ]

Required Fields

[Enter At Least One Field Before Beginning Search]

[ Back ]          [ Find ]
(Access Key: B)   (Access Key: F)

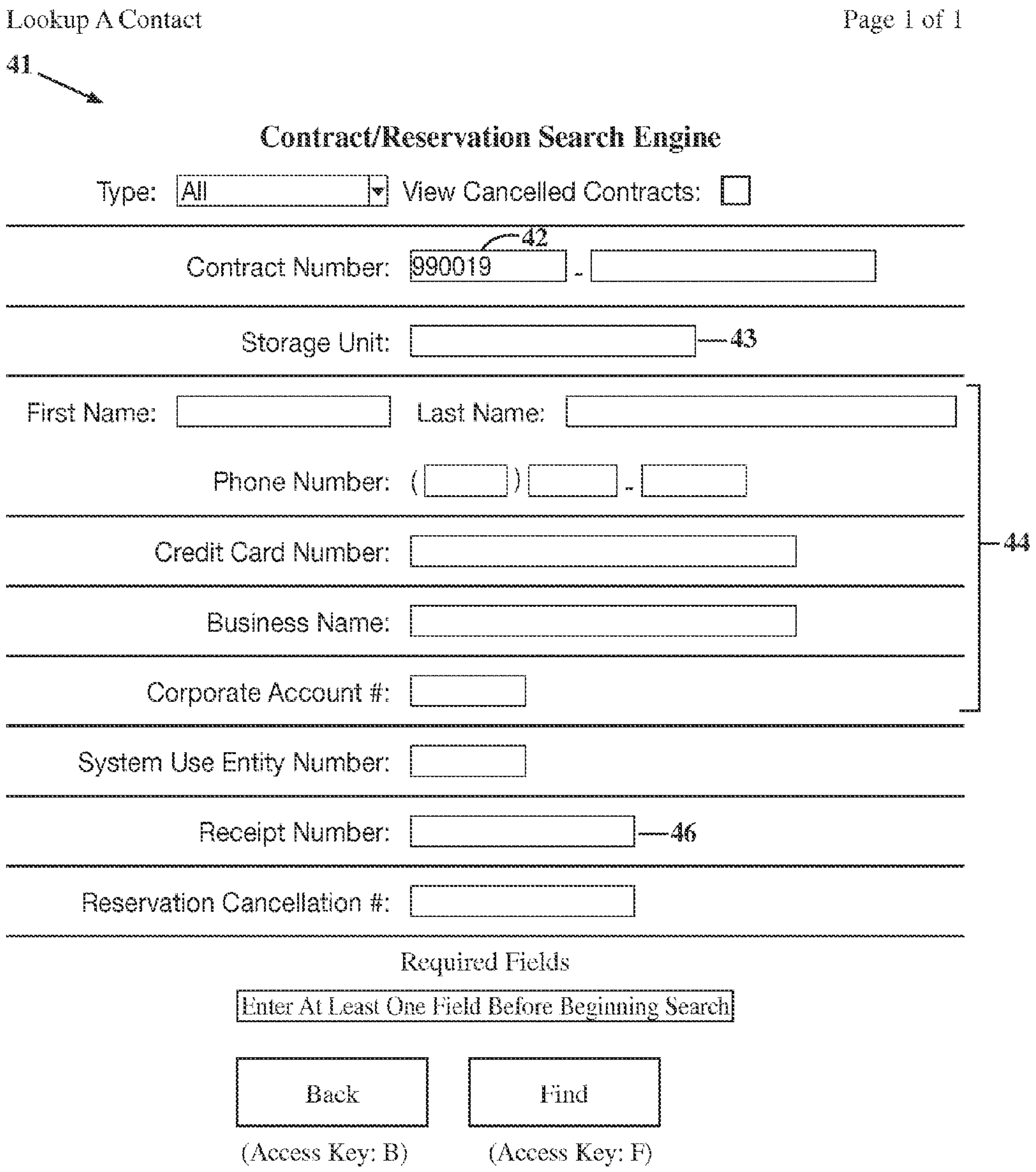

Fig. 38

Selected Rooms                                                                    Page 1 of 1

Customer   Contact   Access Users   Room   Gate Access   Payment Plan   Invoicing   Payment
─────────────────────────────────────────────────────────────────────────────────────────────
                                      ↑
                              Available Rooms Input The Desired Room #  [        ]          [   Add   ]

(Access Key: A)

-or-

Select A Product Type                Select A Room Size

┌─────────────┐                      ┌─────────┐▲
│ All         │                      │ All     │
│ CRATE       │  [ Display List ]    │ 5X4X6   │   [ View List ]
│ RV          │        -or-          │ 5X5X5   │
│ SPLIT LEVEL │                      │ 5X5X8   │▼
└─────────────┘                      └─────────┘
              (Access Key: D)                    (Access Key: V)

501
   ↘
         Selected Room And Services Information

▫  ROOM   SIZE    PRODUCT       DESCRIPTION           SQ. FT.  BILL        RENT
  ▫ 🔍 179  5X5X8   SPLIT LEVEL   2 STREET NOCLIMATE       25    1/27/2002   $91.00
       ↖502                   ▫ RECURRING SERVICES                           AMOUNT
─────────────────────────────────────────────────────────────────────────────────────

▫ = Add Move Out Services To Room   🔍 = Move Out Of Room / Delete A Service

[   Back   ]

(Access Key: B)

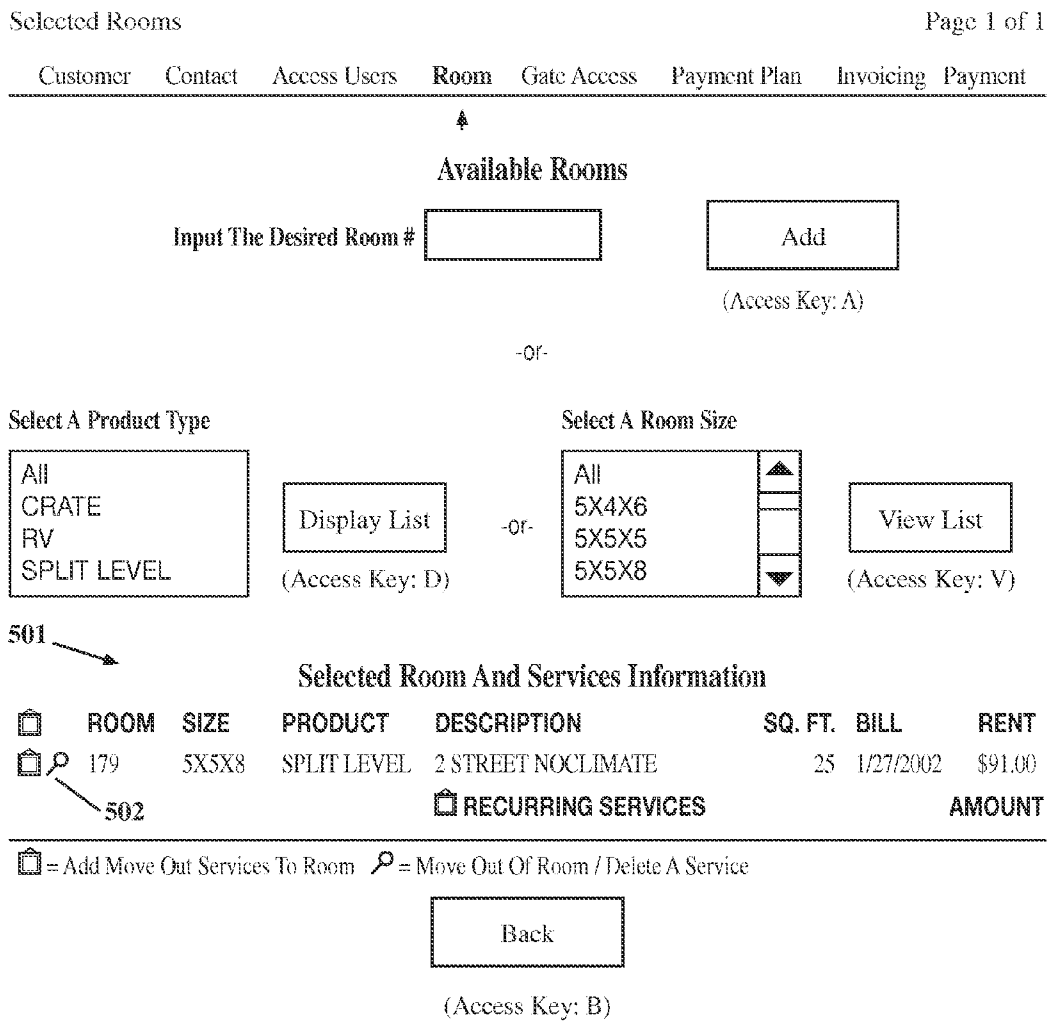

Fig. 39

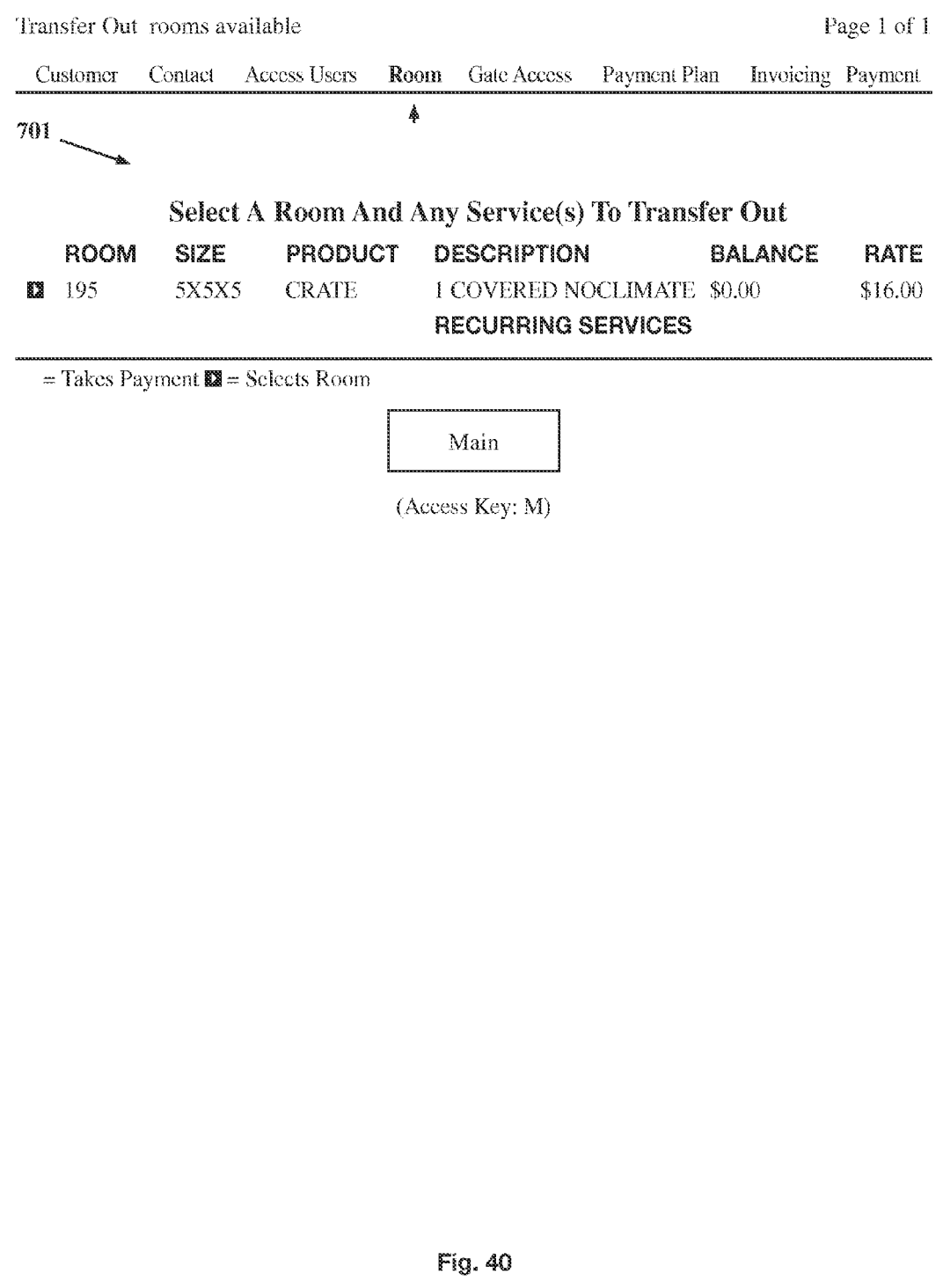

Transfer Out rooms available Page 1 of 1

Customer Contact Access Users Room Gate Access Payment Plan Invoicing Payment

701

Select A Room And Any Service(s) To Transfer Out

| | ROOM | SIZE | PRODUCT | DESCRIPTION | BALANCE | RATE |
|---|---|---|---|---|---|---|
| ◘ | 195 | 5X5X5 | CRATE | 1 COVERED NOCLIMATE | $0.00 | $16.00 |
| | | | | RECURRING SERVICES | | |

= Takes Payment ◘ = Selects Room

Main (Access Key: M)

Fig. 40

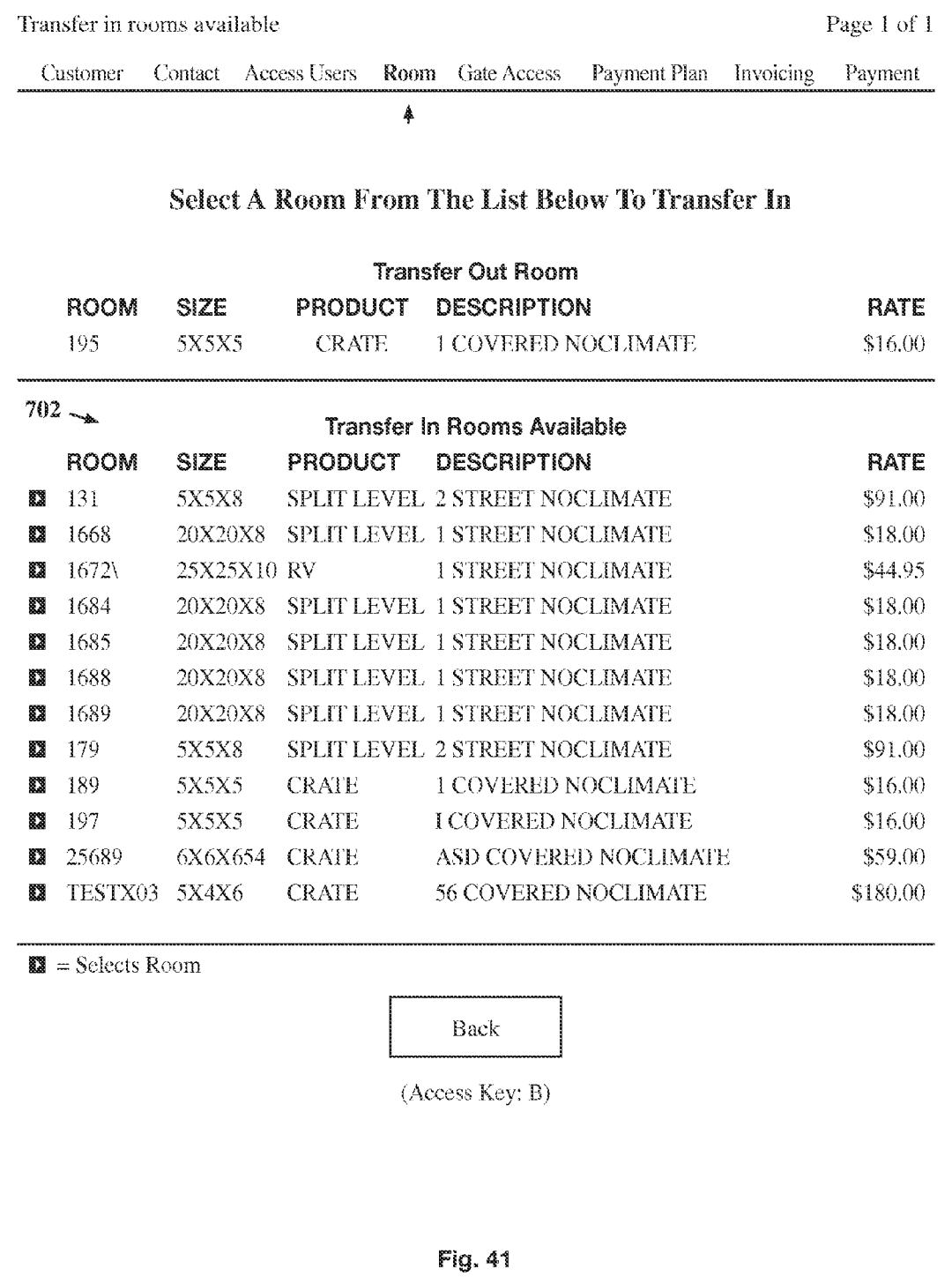

Transfer in rooms available Page 1 of 1

Customer Contact Access Users Room Gate Access Payment Plan Invoicing Payment

Select A Room From The List Below To Transfer In

Transfer Out Room

| ROOM | SIZE | PRODUCT | DESCRIPTION | RATE |
|---|---|---|---|---|
| 195 | 5X5X5 | CRATE | 1 COVERED NOCLIMATE | $16.00 |

702

Transfer In Rooms Available

| | ROOM | SIZE | PRODUCT | DESCRIPTION | RATE |
|---|---|---|---|---|---|
| ☒ | 131 | 5X5X8 | SPLIT LEVEL | 2 STREET NOCLIMATE | $91.00 |
| ☒ | 1668 | 20X20X8 | SPLIT LEVEL | 1 STREET NOCLIMATE | $18.00 |
| ☒ | 1672\ | 25X25X10 | RV | 1 STREET NOCLIMATE | $44.95 |
| ☒ | 1684 | 20X20X8 | SPLIT LEVEL | 1 STREET NOCLIMATE | $18.00 |
| ☒ | 1685 | 20X20X8 | SPLIT LEVEL | 1 STREET NOCLIMATE | $18.00 |
| ☒ | 1688 | 20X20X8 | SPLIT LEVEL | 1 STREET NOCLIMATE | $18.00 |
| ☒ | 1689 | 20X20X8 | SPLIT LEVEL | 1 STREET NOCLIMATE | $18.00 |
| ☒ | 179 | 5X5X8 | SPLIT LEVEL | 2 STREET NOCLIMATE | $91.00 |
| ☒ | 189 | 5X5X5 | CRATE | 1 COVERED NOCLIMATE | $16.00 |
| ☒ | 197 | 5X5X5 | CRATE | I COVERED NOCLIMATE | $16.00 |
| ☒ | 25689 | 6X6X654 | CRATE | ASD COVERED NOCLIMATE | $59.00 |
| ☒ | TESTX03 | 5X4X6 | CRATE | 56 COVERED NOCLIMATE | $180.00 |

☒ = Selects Room

Back (Access Key: B)

Fig. 41

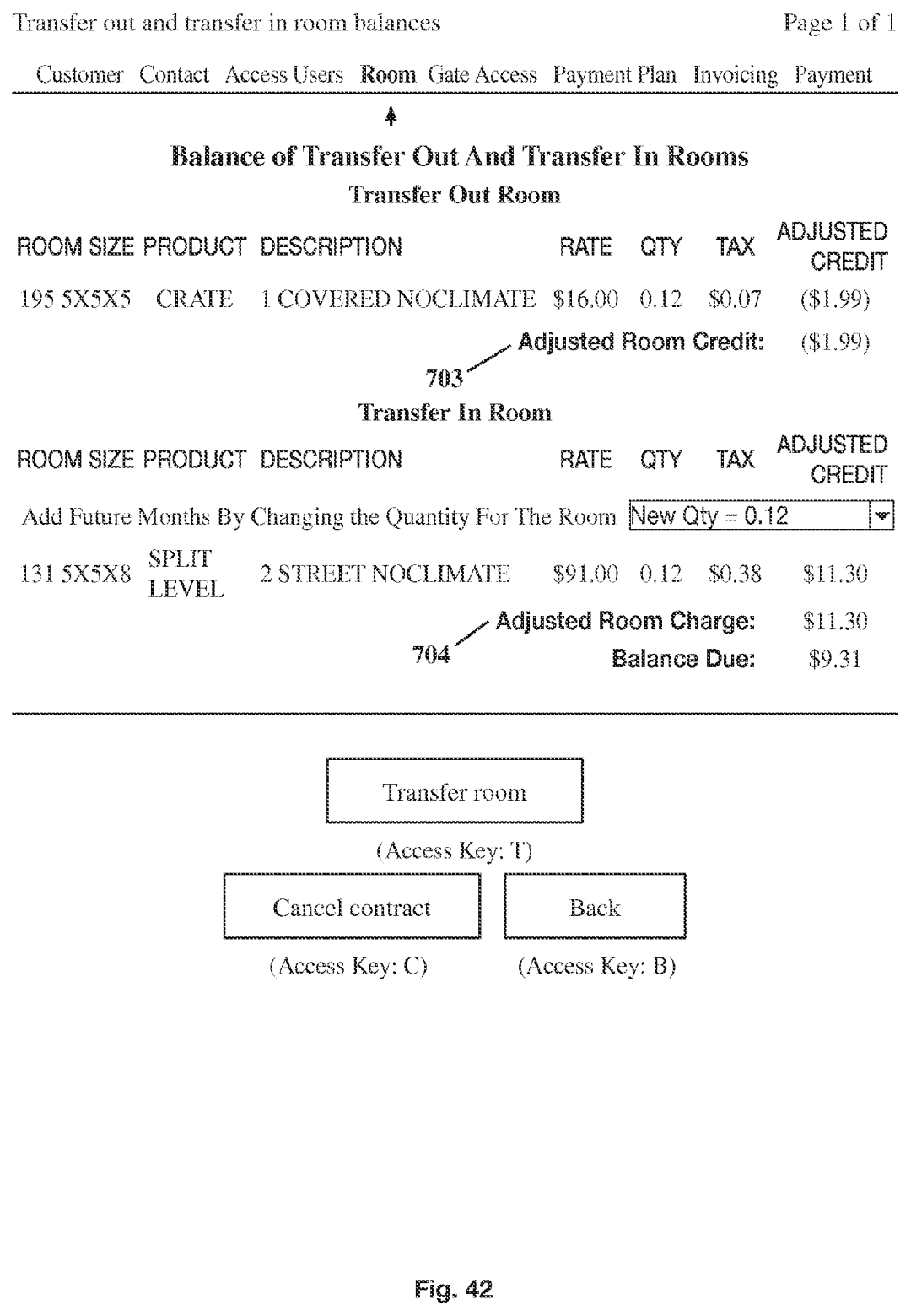

Transfer out and transfer in room balances Page 1 of 1

Customer Contact Access Users Room Gate Access Payment Plan Invoicing Payment

Balance of Transfer Out And Transfer In Rooms

Transfer Out Room

| ROOM SIZE | PRODUCT | DESCRIPTION | RATE | QTY | TAX | ADJUSTED CREDIT |
|---|---|---|---|---|---|---|
| 195 5X5X5 | CRATE | 1 COVERED NOCLIMATE | $16.00 | 0.12 | $0.07 | ($1.99) |
| | | | | | **Adjusted Room Credit:** | ($1.99) |

703

Transfer In Room

| ROOM SIZE | PRODUCT | DESCRIPTION | RATE | QTY | TAX | ADJUSTED CREDIT |
|---|---|---|---|---|---|---|
| Add Future Months By Changing the Quantity For The Room | | | | | | New Qty = 0.12 |
| 131 5X5X8 | SPLIT LEVEL | 2 STREET NOCLIMATE | $91.00 | 0.12 | $0.38 | $11.30 |
| | | | | | **Adjusted Room Charge:** | $11.30 |
| | | | | | **Balance Due:** | $9.31 |

704

Transfer room (Access Key: T)

Cancel contract (Access Key: C)

Back (Access Key: B)

Fig. 42

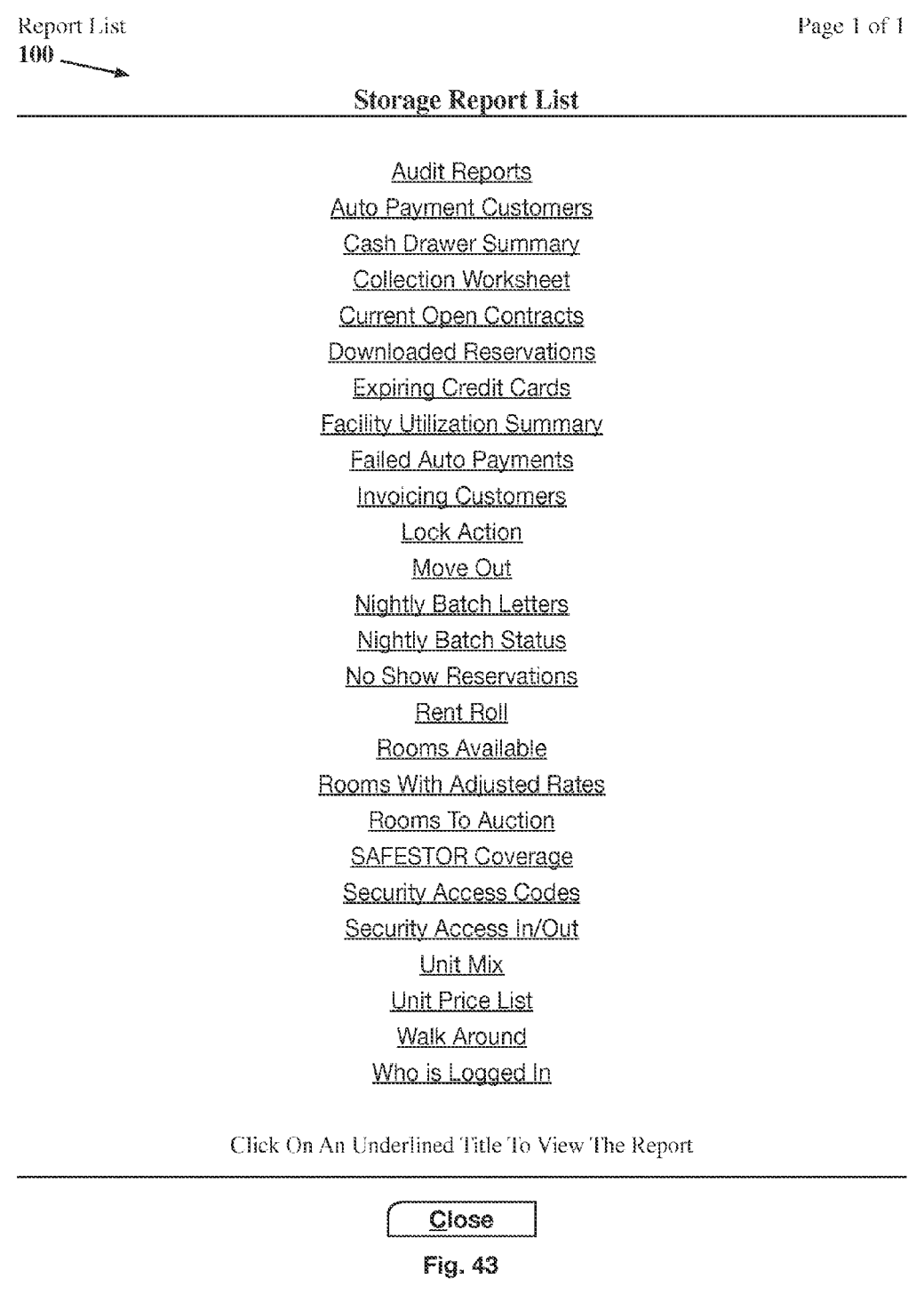

Report List

100

Page 1 of 1

Storage Report List

Audit Reports
Auto Payment Customers
Cash Drawer Summary
Collection Worksheet
Current Open Contracts
Downloaded Reservations
Expiring Credit Cards
Facility Utilization Summary
Failed Auto Payments
Invoicing Customers
Lock Action
Move Out
Nightly Batch Letters
Nightly Batch Status
No Show Reservations
Rent Roll
Rooms Available
Rooms With Adjusted Rates
Rooms To Auction
SAFESTOR Coverage
Security Access Codes
Security Access In/Out
Unit Mix
Unit Price List
Walk Around
Who is Logged In Click On An Underlined Title To View The Report Close

Fig. 43

Room Inventory -- 990019 Page 1 of 3

801

Room Inventory 1-100 | 101-200 | 201-300 | 301-400 | 400-432 | All

Entity: 990019 Date: 2/26/2002

| ROOM (802) | SIZE (803) | DESCRIPTION (804) | STATUS (805) | COM RMS | RATE (806) |
|---|---|---|---|---|---|
| 0001 | 2X2X2 | 3 STREET HEATED | OCCUPIED | | $33.00 |
| 001 | 1X1X2 | 1 COVERED NOCLIMATE | OCCUPIED | | $4.00 |
| 002B | 1X1X2 | 1 COVERED NOCLIMATE | OCCUPIED | | $4.00 |
| 0922 | 5X5X8 | 2 STREET NOCLIMATE | OCCUPIED | | $91.00 |
| 1 | 9X9X9 | 6 STREET NOCLIMATE | DELINQUENT | | $120.00 |
| 1001 | 5X5X8 | 2 STREET NOCLIMATE **BONUS** | LIEN | | $91.00 |
| 1003 | 5X5X8 | 2 STREET NOCLIMATE **BONUS** | DELINQUENT | | $91.00 |
| 1004 | 5X5X8 | 2 STREET NOCLIMATE **BONUS** | DELINQUENT | | $91.00 |
| 1005 | 5X5X8 | 2 STREET NOCLIMATE **BONUS** | DELINQUENT | 318 , 327 | $91.00 |
| 1006 | 5X5X8 | 2 STREET NOCLIMATE **BONUS** | DELINQUENT | | $91.00 |
| 1007 | 5X5X8 | 2 STREET NOCLIMATE **BONUS** | DELINQUENT | | $91.00 |
| 1008 | 5X5X8 | 2 STREET NOCLIMATE **BONUS** | OCCUPIED | | $91.00 |
| 1009 | 5X5X8 | 2 STREET NOCLIMATE **BONUS** | DELINQUENT | | $91.00 |
| 100A | 2X2X2 | 3 STREET HEATED | OCCUPIED | | $33.00 |
| | 100CM | 56 COVERED NOCLIMATE | DELINQUENT | 101PR , 102PR | $180.00 |
| 101X | 5X5X8 | 2 STREET NOCLIMATE **BONUS** | DELINQUENT | | $91.00 |
| 101 | 5X5X8 | 2 STREET NOCLIMATE **BONUS** | OCCUPIED | | $91.00 |
| 1010 | 5X5X8 | 2 STREET NOCLIMATE **BONUS** | DELINQUENT | | $91.00 |
| 1011 | 5X5X8 | 2 STREET NOCLIMATE **BONUS** | DELINQUENT | | $91.00 |
| 101X | 5X5X8 | 2 STREET NOCLIMATE **BONUS** | LEIN | | $91.00 |
| | 102365 | 1 STREET NOCLIMATE | DELINQUENT | | $61.00 |
| 102X | 5X5X8 | 2 STREET NOCLIMATE **BONUS** | DELINQUENT | | $91.00 |
| 103X | 5X5X8 | 2 STREET NOCLIMATE **BONUS** | DELINQUENT | | $91.00 |
| 105X | 5X5X8 | 2 STREET NOCLIMATE **BONUS** | OCCUPIED | | $91.00 |
| 106X | 5X5X8 | 2 STREET NOCLIMATE **BONUS** | OCCUPIED | | $91.00 |
| 107 | 5X5X8 | 2 STREET NOCLIMATE **BONUS** | DELINQUENT | | $91.00 |
| 108X | 5X5X8 | 2 STREET NOCLIMATE **BONUS** | DAMAGED | | $91.00 |
| 109X | 5X5X8 | 2 STREET NOCLIMATE **BONUS** | DAMAGED | | $91.00 |
| 11 | 7X27X7 | 1 STREET CLIMATE **BONUS** | OCCUPIED | | $120.00 |
| 111 | 10X10X11 | 11 STREET NOCLIMATE | DELINQUENT | | $16.00 |
| 11111 | 2X2X2 | 3 STREET HEATED | DELINQUENT | | $33.00 |
| 1112 | 4X3X4 | 1 STREET NOCLIMATE | DELINQUENT | | $61.00 |
| 1113 | 5X5X5 | 2 COVERED NOCLIMATE | DELINQUENT | | $61.00 |
| 1114 | X20X10 | 1 STREET NOCLIMATE | DELINQUENT | 157 , 2112 | $90.00 |
| 113 | 5X20X10 | 1 STREET NOCLIMATE | DELINQUENT | | $90.00 |
| 114 | 0X20X8 | 1 STREET NOCLIMATE | OCCUPIED | | $16.50 |
| 115 | 10X10X8 | 1 STREET NOCLIMATE | DELINQUENT | | $20.00 |

Fig. 44

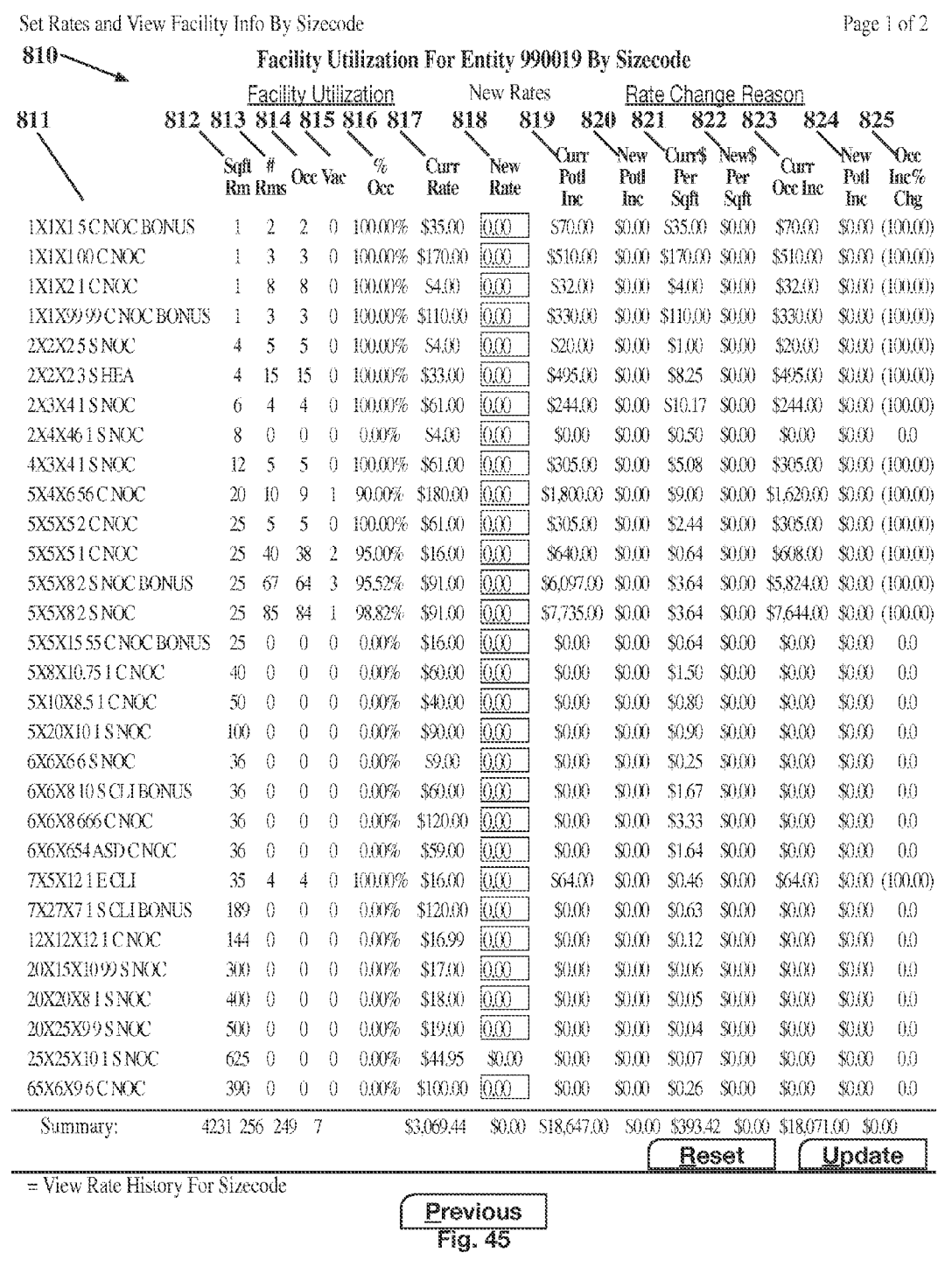

Set Rates and View Facility Info By Sizecode

810

Facility Utilization For Entity 990019 By Sizecode

Facility Utilization    New Rates    Rate Change Reason

| 811 | 812 Sqft Rm | 813 # Rms | 814 Occ | 815 Vac | 816 % Occ | 817 Curr Rate | 818 New Rate | 819 Curr Potl Inc | 820 New Potl Inc | 821 Curr$ Per Sqft | 822 New$ Per Sqft | 823 Curr Occ Inc | 824 New Potl Inc | 825 Occ Inc% Chg |
|---|---|---|---|---|---|---|---|---|---|---|---|---|---|---|
| 1X1X1 5 C NOC BONUS | 1 | 2 | 2 | 0 | 100.00% | $35.00 | 0.00 | $70.00 | $0.00 | $35.00 | $0.00 | $70.00 | $0.00 | (100.00) |
| 1X1X1 00 C NOC | 1 | 3 | 3 | 0 | 100.00% | $170.00 | 0.00 | $510.00 | $0.00 | $170.00 | $0.00 | $510.00 | $0.00 | (100.00) |
| 1X1X2 1 C NOC | 1 | 8 | 8 | 0 | 100.00% | $4.00 | 0.00 | $32.00 | $0.00 | $4.00 | $0.00 | $32.00 | $0.00 | (100.00) |
| 1X1X99 99 C NOC BONUS | 1 | 3 | 3 | 0 | 100.00% | $110.00 | 0.00 | $330.00 | $0.00 | $110.00 | $0.00 | $330.00 | $0.00 | (100.00) |
| 2X2X2 5 S NOC | 4 | 5 | 5 | 0 | 100.00% | $4.00 | 0.00 | $20.00 | $0.00 | $1.00 | $0.00 | $20.00 | $0.00 | (100.00) |
| 2X2X2 3 S HEA | 4 | 15 | 15 | 0 | 100.00% | $33.00 | 0.00 | $495.00 | $0.00 | $8.25 | $0.00 | $495.00 | $0.00 | (100.00) |
| 2X3X4 1 S NOC | 6 | 4 | 4 | 0 | 100.00% | $61.00 | 0.00 | $244.00 | $0.00 | $10.17 | $0.00 | $244.00 | $0.00 | (100.00) |
| 2X4X46 1 S NOC | 8 | 0 | 0 | 0 | 0.00% | $4.00 | 0.00 | $0.00 | $0.00 | $0.50 | $0.00 | $0.00 | $0.00 | 0.0 |
| 4X3X4 1 S NOC | 12 | 5 | 5 | 0 | 100.00% | $61.00 | 0.00 | $305.00 | $0.00 | $5.08 | $0.00 | $305.00 | $0.00 | (100.00) |
| 5X4X6 56 C NOC | 20 | 10 | 9 | 1 | 90.00% | $180.00 | 0.00 | $1,800.00 | $0.00 | $9.00 | $0.00 | $1,620.00 | $0.00 | (100.00) |
| 5X5X5 2 C NOC | 25 | 5 | 5 | 0 | 100.00% | $61.00 | 0.00 | $305.00 | $0.00 | $2.44 | $0.00 | $305.00 | $0.00 | (100.00) |
| 5X5X5 1 C NOC | 25 | 40 | 38 | 2 | 95.00% | $16.00 | 0.00 | $640.00 | $0.00 | $0.64 | $0.00 | $608.00 | $0.00 | (100.00) |
| 5X5X8 2 S NOC BONUS | 25 | 67 | 64 | 3 | 95.52% | $91.00 | 0.00 | $6,097.00 | $0.00 | $3.64 | $0.00 | $5,824.00 | $0.00 | (100.00) |
| 5X5X8 2 S NOC | 25 | 85 | 84 | 1 | 98.82% | $91.00 | 0.00 | $7,735.00 | $0.00 | $3.64 | $0.00 | $7,644.00 | $0.00 | (100.00) |
| 5X5X15 55 C NOC BONUS | 25 | 0 | 0 | 0 | 0.00% | $16.00 | 0.00 | $0.00 | $0.00 | $0.64 | $0.00 | $0.00 | $0.00 | 0.0 |
| 5X8X10.75 1 C NOC | 40 | 0 | 0 | 0 | 0.00% | $60.00 | 0.00 | $0.00 | $0.00 | $1.50 | $0.00 | $0.00 | $0.00 | 0.0 |
| 5X10X8.5 1 C NOC | 50 | 0 | 0 | 0 | 0.00% | $40.00 | 0.00 | $0.00 | $0.00 | $0.80 | $0.00 | $0.00 | $0.00 | 0.0 |
| 5X20X10 1 S NOC | 100 | 0 | 0 | 0 | 0.00% | $90.00 | 0.00 | $0.00 | $0.00 | $0.90 | $0.00 | $0.00 | $0.00 | 0.0 |
| 6X6X6 6 S NOC | 36 | 0 | 0 | 0 | 0.00% | $9.00 | 0.00 | $0.00 | $0.00 | $0.25 | $0.00 | $0.00 | $0.00 | 0.0 |
| 6X6X8 10 S CLI BONUS | 36 | 0 | 0 | 0 | 0.00% | $60.00 | 0.00 | $0.00 | $0.00 | $1.67 | $0.00 | $0.00 | $0.00 | 0.0 |
| 6X6X8 666 C NOC | 36 | 0 | 0 | 0 | 0.00% | $120.00 | 0.00 | $0.00 | $0.00 | $3.33 | $0.00 | $0.00 | $0.00 | 0.0 |
| 6X6X654 ASD C NOC | 36 | 0 | 0 | 0 | 0.00% | $59.00 | 0.00 | $0.00 | $0.00 | $1.64 | $0.00 | $0.00 | $0.00 | 0.0 |
| 7X5X12 1 E CLI | 35 | 4 | 4 | 0 | 100.00% | $16.00 | 0.00 | $64.00 | $0.00 | $0.46 | $0.00 | $64.00 | $0.00 | (100.00) |
| 7X27X7 1 S CLI BONUS | 189 | 0 | 0 | 0 | 0.00% | $120.00 | 0.00 | $0.00 | $0.00 | $0.63 | $0.00 | $0.00 | $0.00 | 0.0 |
| 12X12X12 1 C NOC | 144 | 0 | 0 | 0 | 0.00% | $16.99 | 0.00 | $0.00 | $0.00 | $0.12 | $0.00 | $0.00 | $0.00 | 0.0 |
| 20X15X10 99 S NOC | 300 | 0 | 0 | 0 | 0.00% | $17.00 | 0.00 | $0.00 | $0.00 | $0.06 | $0.00 | $0.00 | $0.00 | 0.0 |
| 20X20X8 1 S NOC | 400 | 0 | 0 | 0 | 0.00% | $18.00 | 0.00 | $0.00 | $0.00 | $0.05 | $0.00 | $0.00 | $0.00 | 0.0 |
| 20X25X9 9 S NOC | 500 | 0 | 0 | 0 | 0.00% | $19.00 | 0.00 | $0.00 | $0.00 | $0.04 | $0.00 | $0.00 | $0.00 | 0.0 |
| 25X25X10 1 S NOC | 625 | 0 | 0 | 0 | 0.00% | $44.95 | $0.00 | $0.00 | $0.00 | $0.07 | $0.00 | $0.00 | $0.00 | 0.0 |
| 65X6X9 6 C NOC | 390 | 0 | 0 | 0 | 0.00% | $100.00 | 0.00 | $0.00 | $0.00 | $0.26 | $0.00 | $0.00 | $0.00 | 0.0 |
| Summary: | 4231 | 256 | 249 | 7 | | $3,069.44 | $0.00 | $18,647.00 | $0.00 | $393.42 | $0.00 | $18,071.00 | $0.00 | |

Reset    Update

= View Rate History For Sizecode

Previous

Fig. 45

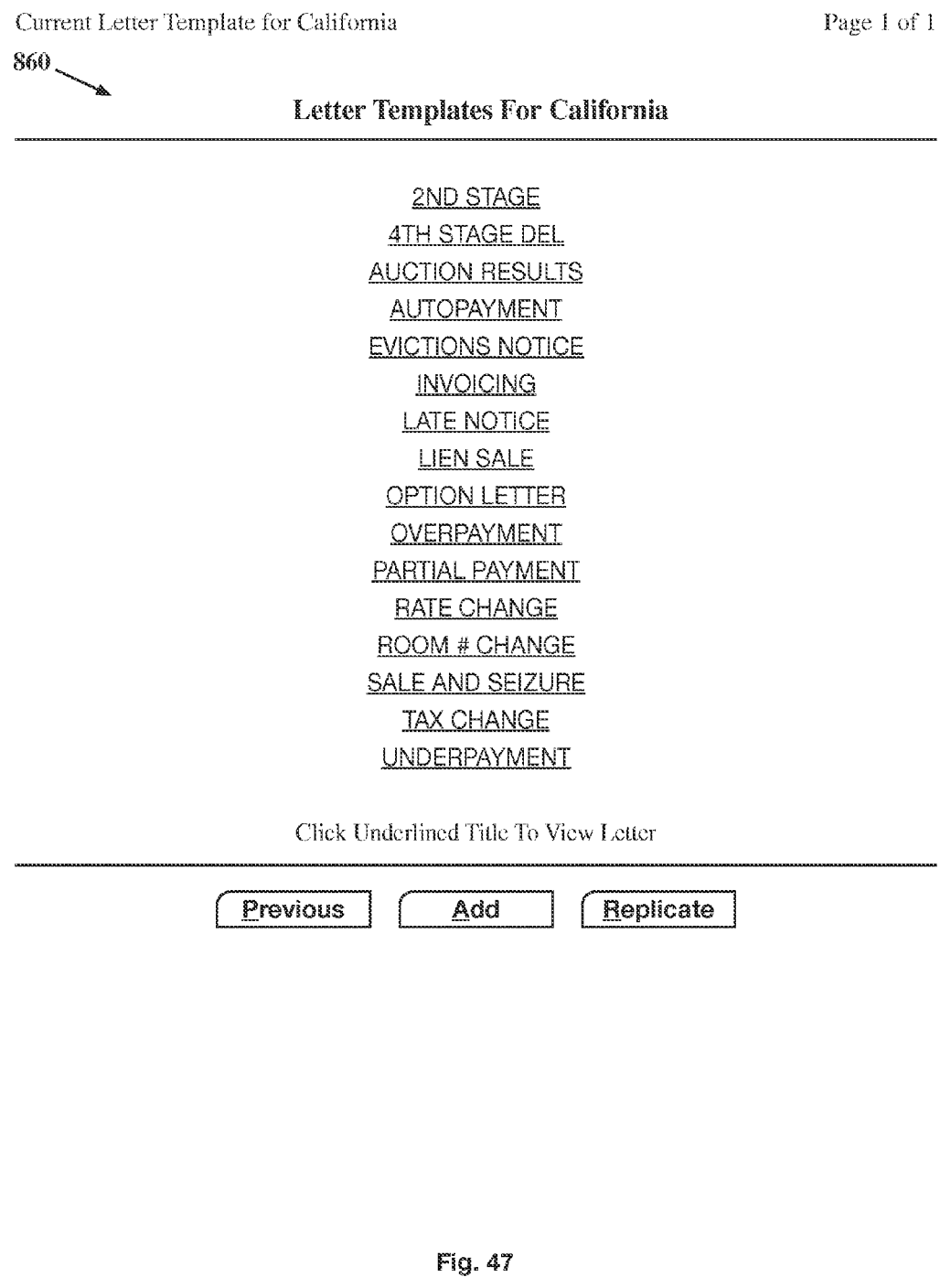

Current Letter Template for California

Page 1 of 1

860

Letter Templates For California

---

2ND STAGE
4TH STAGE DEL
AUCTION RESULTS
AUTOPAYMENT
EVICTIONS NOTICE
INVOICING
LATE NOTICE
LIEN SALE
OPTION LETTER
OVERPAYMENT
PARTIAL PAYMENT
RATE CHANGE
ROOM # CHANGE
SALE AND SEIZURE
TAX CHANGE
UNDERPAYMENT

Click Underlined Title To View Letter

---

Previous | Add | Replicate

Fig. 47

Selected Letter Template                                    Page 1 of 1

870

Letter Template

Fields  Letter Name: [LIEN SALE]  Entity Printable ☐

```
AUCTION                    <<EntityLabel>>
---------------
AuctionDate
AcutionProcTot             Date:    <<TodayDate>><div align=center><b>LIEN
AuctionResScrp             SALE</b></div>

CUSTOMER
---------------
CustAddress                <<CustomerLabel>>
CustomerLabel
CustomerName               Dear <<CustomerName>>,

DATE
---------------            Your right, as occupant, to use and access storage
InvoiceDate                room #<<RmNumber>> has been terminated, and the
LastPayDate                contractual landlord's lien contained in the Self-
NewRateEffDate             Storage Rental Agreement has been imposed.
```

Input a Valid WebSelfStorage Entity.

Entity: [        ]  [ View ]

Type Letter In Text Area Above.

Double-Click The FIELD NAME In The List On The Left To Add It To The Letter.

---

Required Information

[ Previous ]   [ Delete ]   [ Save ]

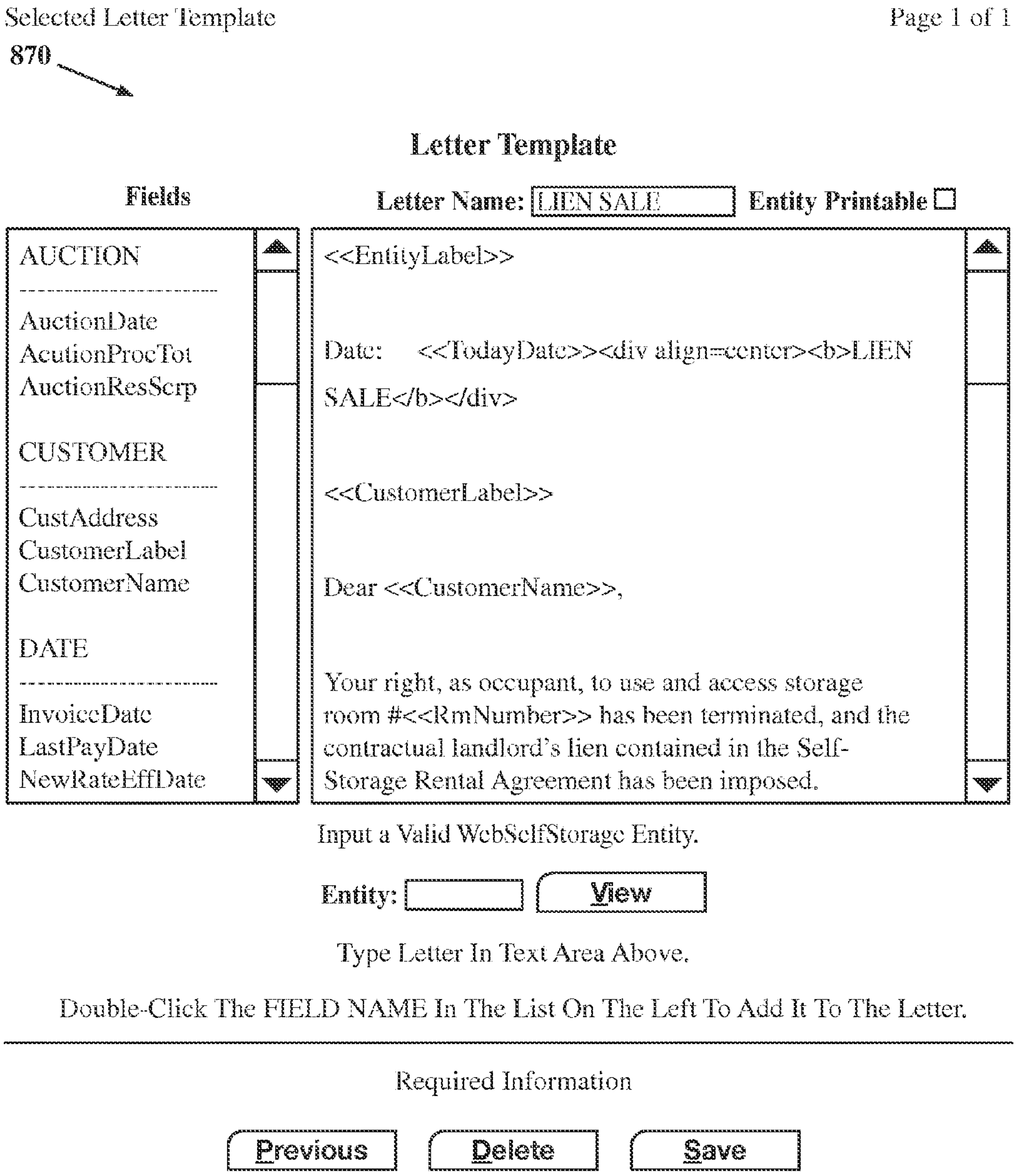

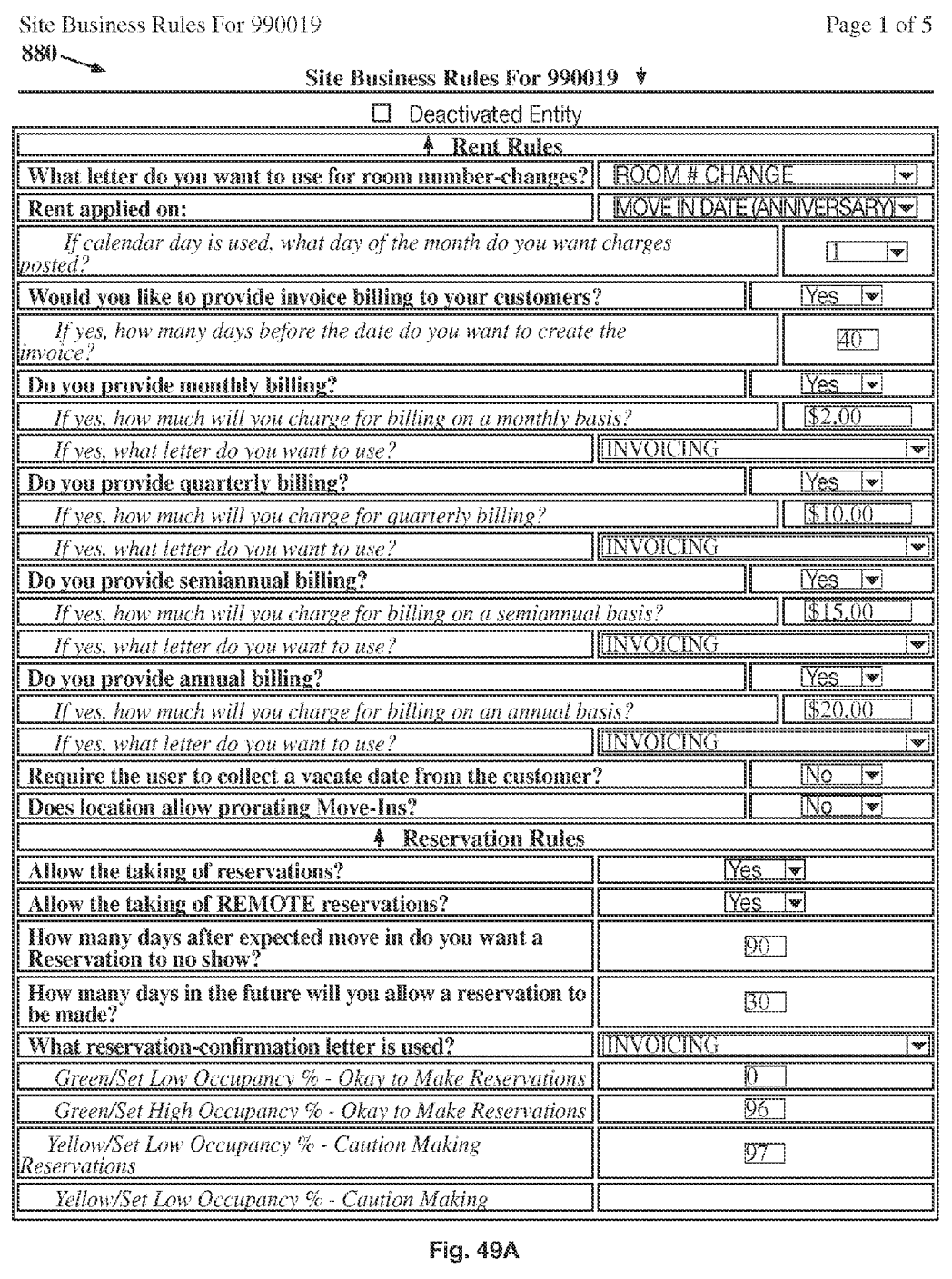

Site Business Rules For 990019

☐ Deactivated Entity

| | |
|---|---|
| **Rent Rules** | |
| **What letter do you want to use for room number-changes?** | ROOM # CHANGE |
| **Rent applied on:** | MOVE IN DATE (ANNIVERSARY) |
| *If calendar day is used, what day of the month do you want charges posted?* | 1 |
| **Would you like to provide invoice billing to your customers?** | Yes |
| *If yes, how many days before the date do you want to create the invoice?* | 40 |
| **Do you provide monthly billing?** | Yes |
| *If yes, how much will you charge for billing on a monthly basis?* | $2.00 |
| *If yes, what letter do you want to use?* | INVOICING |
| **Do you provide quarterly billing?** | Yes |
| *If yes, how much will you charge for quarterly billing?* | $10.00 |
| *If yes, what letter do you want to use?* | INVOICING |
| **Do you provide semiannual billing?** | Yes |
| *If yes, how much will you charge for billing on a semiannual basis?* | $15.00 |
| *If yes, what letter do you want to use?* | INVOICING |
| **Do you provide annual billing?** | Yes |
| *If yes, how much will you charge for billing on an annual basis?* | $20.00 |
| *If yes, what letter do you want to use?* | INVOICING |
| **Require the user to collect a vacate date from the customer?** | No |
| **Does location allow prorating Move-Ins?** | No |
| **Reservation Rules** | |
| **Allow the taking of reservations?** | Yes |
| **Allow the taking of REMOTE reservations?** | Yes |
| **How many days after expected move in do you want a Reservation to no show?** | 90 |
| **How many days in the future will you allow a reservation to be made?** | 30 |
| **What reservation-confirmation letter is used?** | INVOICING |
| *Green/Set Low Occupancy % - Okay to Make Reservations* | 0 |
| *Green/Set High Occupancy % - Okay to Make Reservations* | 96 |
| *Yellow/Set Low Occupancy % - Caution Making Reservations* | 97 |
| *Yellow/Set Low Occupancy % - Caution Making* | |

Fig. 49A

Site Business Rules For 990019 Page 2 of 5

| | |
|---|---|
| *Reservations* | 98 |
| *Red/Set Low Occupancy % - Do Not Make Reservations* | 99 |
| *Red/Set High Occupancy % - Do Not Make Reservations* | 100 |
| **Do not allow reservations for a sizecode when available rooms are below this number.** | 1 |
| **How many days should quote be held before purging?** | 1 |
| **Customer Rules** | |
| **Is tax-exempt status available for tenants at this facility?** | No |
| **Do you charge an administration fee?** | No |
| *If yes, is it required?* | Yes |
| *If yes, is it reversible?* | Yes |
| *If yes, what is the administrative fee amount?* | $50.00 |
| **Move In Rules** | |
| **Do you require that new tenants provide an alternate contact?** | Yes |
| **Do you require addresses to be collected on alternate contacts?** | No |
| **Disable password prompt when saving a contract?** | Yes |
| **Do you allow business-customer types?** | Yes |
| **Do you allow corporate-customer types?** | Yes |
| **Do you allow individual-customer types?** | Yes |
| **Do you allow system use-customer types?** | Yes |
| **Payment Rules** | |
| **Do you allow customers to autopay their rooms?** | Yes |
| *If yes, what letter do you want to use for autopayments?* | AUTOPAYMENT |
| Auto Authorization | |
| **Are you running a credit card authorization system?** | Yes |
| *If yes, what type of credit card system are you running?* | VERISIGN |
| **What type of check system are you running?** | NONE |
| Payment Types | |
| **Do you accept cash?** | Yes |
| **Do you accept business checks?** | Yes |
| **Do you accept cashier's checks?** | Yes |
| **Do you accept personal checks?** | Yes |
| **Do you accept traveler's checks?** | Yes |
| **Do you accept coupons?** | Yes |
| **Do you accept American Express credit cards?** | Yes |
| **Do you accept Discover credit cards?** | Yes |

Fig. 49B

Site Business Rules For 990019      Page 3 of 5

| | |
|---|---|
| Do you accept MasterCard credit cards? | Yes |
| Do you accept Visa credit cards? | Yes |
| Do you accept money orders? | Yes |
| Do you allow system use accounts? | Yes |
| Do you accept U-Haul Corporate Accounts? | Yes |
| ♠ Over/Partial Payment Rules | |
| Do you want to create an overpayment letter when customer overpays? | Yes |
| *If yes, what day do you want to create this letter?* | DAY OF PAYMENT |
| *If yes, what letter do you want to use for this overpayment?* | OVERPAYMENT |
| Do you want to create a partial pay letter when customer under pays? | Yes |
| *If yes, what day do you want to create this letter?* | Ten Days before next Payment |
| *If you use one partial payment letter, which should it be?* | PARTIAL PAYMENT |
| ♠ Rate Change Rules | |
| Do you want to apply rate changes to rented rooms? | Yes |
| *If yes, how many day's notice must you give the customer before changing their rates?* | 1 |
| *If yes, at the time of move in, for how many days do you guarantee the current rate?* | 20 |
| *If yes, what letter do you want to use for rate change letters?* | RATE CHANGE |
| ♠ Delinquency Rules | |
| How many delinquency steps do you use, not including Lien? | 5 |
| Miscellaneous Delinquency Rules | |
| Should services be dropped when a customer is delinquent? | Yes |
| Which delinquency schedule do you want to use? | DELINQUENCY FEES |
| Rate Percentage Rules | |
| If delinquent and room rent is less than $ 40 charge this amount $ 7.5 . | |
| If delinquent and room rent is between $ 41 and $ 100 charge this amount $ 45 or 20 % of the rent, whichever is greater. | |
| If delinquent and room rent is greater than $ 100 charge this amount $ 60 or 50 % of the rent, whichever is greater. | |
| First Delinquency | |
| Number of days later before creating first delinquency letter and applying late fee? | 2 |
| *What is the first late fee charge?* | $10.00 |
| *What letter is sent for the first delinquency?* | 1ST LATE NOTICE |

882 — Number of days later before creating first delinquency letter and applying late fee?
881 — What is the first late fee charge?

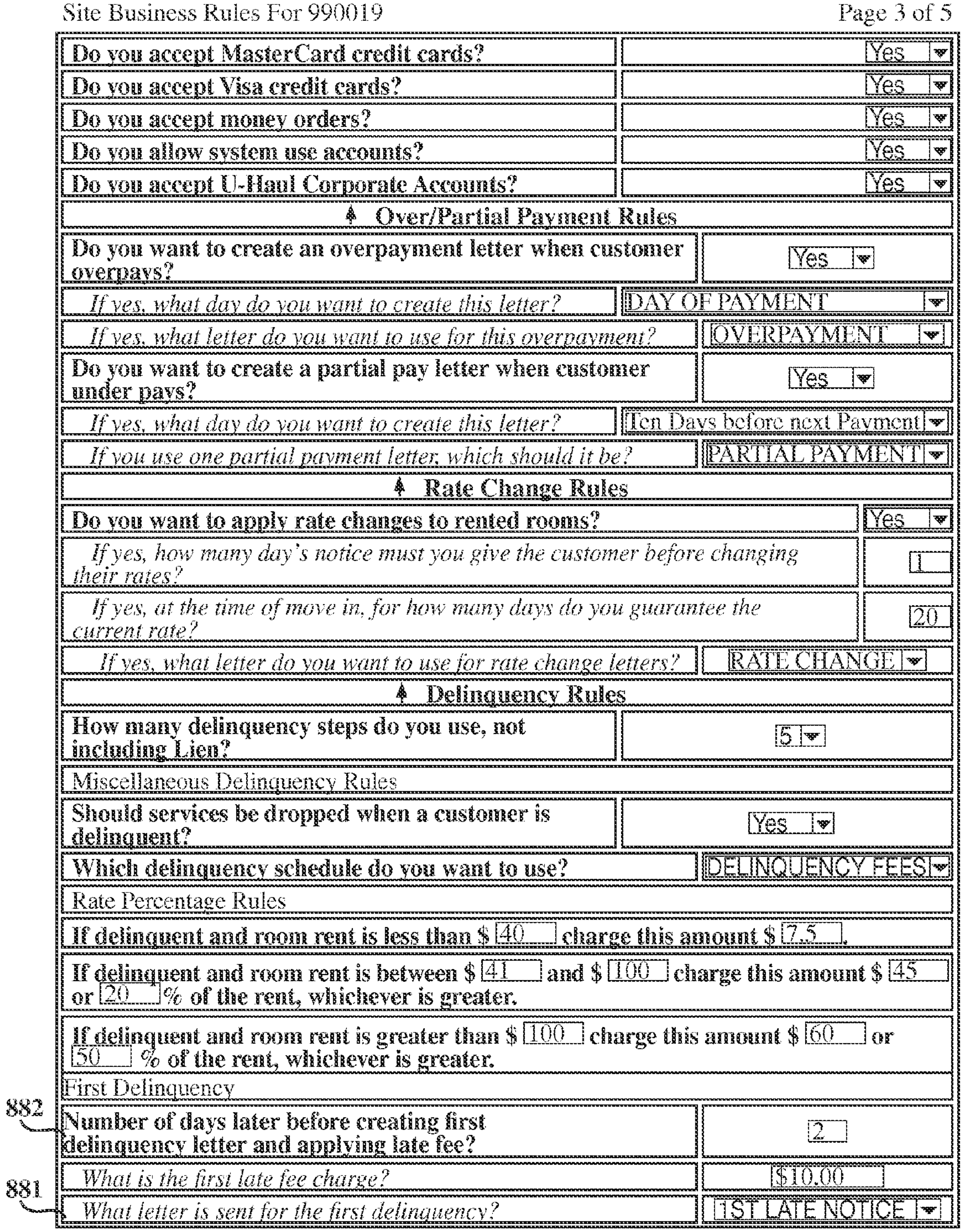

Fig. 49C

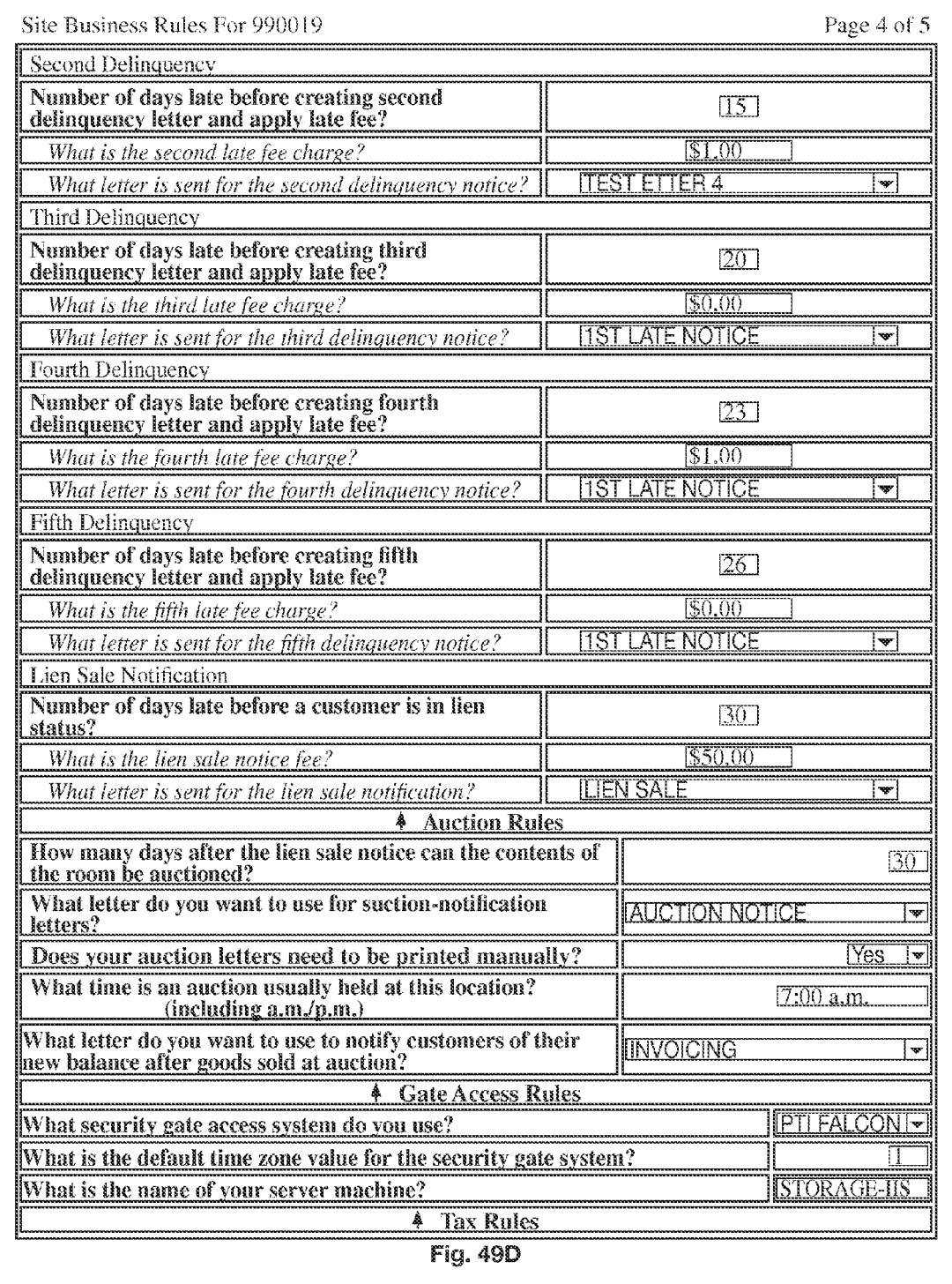

Site Business Rules For 990019 Page 4 of 5

| | |
|---|---|
| Second Delinquency | |
| **Number of days late before creating second delinquency letter and apply late fee?** | 15 |
| *What is the second late fee charge?* | $1.00 |
| *What letter is sent for the second delinquency notice?* | TEST ETTER 4 |
| Third Delinquency | |
| **Number of days late before creating third delinquency letter and apply late fee?** | 20 |
| *What is the third late fee charge?* | $0.00 |
| *What letter is sent for the third delinquency notice?* | 1ST LATE NOTICE |
| Fourth Delinquency | |
| **Number of days late before creating fourth delinquency letter and apply late fee?** | 23 |
| *What is the fourth late fee charge?* | $1.00 |
| *What letter is sent for the fourth delinquency notice?* | 1ST LATE NOTICE |
| Fifth Delinquency | |
| **Number of days late before creating fifth delinquency letter and apply late fee?** | 26 |
| *What is the fifth late fee charge?* | $0.00 |
| *What letter is sent for the fifth delinquency notice?* | 1ST LATE NOTICE |
| Lien Sale Notification | |
| **Number of days late before a customer is in lien status?** | 30 |
| *What is the lien sale notice fee?* | $50.00 |
| *What letter is sent for the lien sale notification?* | LIEN SALE |
| **Auction Rules** | |
| **How many days after the lien sale notice can the contents of the room be auctioned?** | 30 |
| **What letter do you want to use for suction-notification letters?** | AUCTION NOTICE |
| **Does your auction letters need to be printed manually?** | Yes |
| **What time is an auction usually held at this location? (including a.m./p.m.)** | 7:00 a.m. |
| **What letter do you want to use to notify customers of their new balance after goods sold at auction?** | INVOICING |
| **Gate Access Rules** | |
| **What security gate access system do you use?** | PTI FALCON |
| **What is the default time zone value for the security gate system?** | 1 |
| **What is the name of your server machine?** | STORAGE-IIS |
| **Tax Rules** | |

Fig. 49D

Site Business Rules For 990019 Page 5 of 5

| | |
|---|---|
| What is your STORAGE tax rate percentage? | .035 |
| What letter do you want to use for STORAGE tax rate changes? | TAX CHANGE TEST ONLY |
| What is your RETAIL tax rate percentage? | .10 |
| **Reporting** | |
| For Facility Utilization Report how many delinquency steps do you use, not including Lien? | 3 |
| *Number of days late before entering first step?* | 3 |
| *Number of days late before entering second step?* | 15 |
| *Number of days late before entering third step?* | 0 |
| *Number of days late before entering fourth step?* | 0 |
| *Number of days late before entering fifth step?* | 0 |
| *Number of days late before entering Lein?* | 30 |
| **Miscellaneous** | |
| Does this location Print Letters to Alternate Contact? | Yes |
| What is the Manager Name you want printed on Letters? | chris bierman |
| Use Site Maps? | Yes |

Previous Save Replicate

Fig. 49E

AUTOMATED SELF-STORAGE RESERVATION AND MANAGEMENT SYSTEM

FIELD OF THE INVENTION

The present invention relates generally to an automated reservation and management system, and more particularly, to a system that manages reservations, inventory, rentals, payments, vacancies and other aspects of a self-storage facility.

BACKGROUND OF THE INVENTION

In operating a self-storage facility, facility personnel are required to track inventory, reservations, customer contracts, payments, delinquencies and various other aspects of the business. In typical storage facilities, much of the rental transaction is conducted through use of pre-printed forms that are manually filled out and stored in file drawers. To facilitate the operation of a self-storage facility, it is desirable to provide a comprehensive self-storage reservation and management system that enables the user to access information regarding storage units and customers, process rental transactions, generate management analysis information and reports, and to automate the self-storage rental transactions to the extent possible.

SUMMARY OF THE PREFERRED EMBODIMENTS

The automated self-storage system of the present invention includes features for use by self-storage customers and features for use by self-storage personnel. The features available for use by each type of user can vary depending on the access that the system administrator grants to each type of user. In a preferred embodiment of the invention, the customer can use the system to make a reservation for a room, view a site map, update contract information, provide alternate contact information and authorized access information, view room or payment history, purchase insurance, authorize automatic credit card payments, make a non-recurring payment, and print historical and current receipts. The storage personnel can preferably utilize the automated system to perform all of the above functions plus other point of sale transactions and management functions. For example, the automated self-storage system enables the user to view an inventory menu for a specified facility, and to manage room inventory by adding or removing rooms, changing the room size or description, or indicating whether a room is damaged. The system also enables the user to manage room rates by increasing or decreasing the rates for all rooms of a particular size or description. To track the effects of the rate change, the system provides facility utilization information that calculates the percentage change in revenues as a result of the change in rates.

The automated self-storage system provides point of sale support by enabling the user to rent rooms, transfer customers from one room to another, move a customer in or out, view key information about customers prior to allowing access to facility or room, and track sales of retail items. In a preferred embodiment of the invention, the automated system enables a customer to manage multiple rental transactions on the same contract, and arrange different payment options in connection with each rental transaction. For example, a customer may have four rental units, one that is paid for using automatic credit card payments, another that is invoiced monthly, a third that is paid using a check and a fourth that is invoiced quarterly. The due dates for the payments can be controlled by the user to fall on the same date or any other specified date. When automatic payments are designated, the system interfaces with a credit card authorization system to collect scheduled payments.

Because the information pertaining to inventory, rental, sales, and payments are provided in a centralized system, the user is able to run various management reports to assess the status of the business of the self-storage facility. For example, audit reports are provided to detect or prevent intentional theft and to identify unintentional errors in entering payments, fee waivers, and write-offs. The facility personnel can also view all open contracts, reservations, expiring credit card reports, cash summaries, and customer rent roll reports.

In a preferred embodiment of the invention, the system enables the storage facility personnel to communicate with a customer by sending a message or a note to the customer's account. In the event that a customer is delinquent, the system automatically sends the customer a letter requiring action. The system also generates customer letters when the rental rate on the customer's rental unit is scheduled to change or if the customer is subject to an eviction notice.

The operation of the automated self-storage system is preferably controlled, at least in part, by a set of business rules created for the application. The business rules are completely customizable and are based on the needs, requirement and preferences of the user or facility, and on various local, state and federal regulations. Through customization of the business rules, a user can instruct the system to provide certain services, to send particular form letters to clients, to apply payments on a specified date and to customize the operation of other features of the system.

It is envisioned that the automated storage system of the present invention can be used in connection with a network of storage facilities, wherein the user can access information regarding remote facilities and can perform management or rental functions without being physical present at the facilities. Accordingly, depending on a user's level of authorization, the user can perform all of the functions described herein for any number of facilities, either remotely or while present at the site.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which:

FIG. 1 depicts a preferred embodiment of the login capture of the present invention;

FIG. 2 depicts a preferred embodiment of the system menu of the present invention;

FIG. 5 depicts a preferred embodiment of the customer search results of the present invention;

FIG. 6 depicts a preferred embodiment of the customer information feature of the present invention;

FIG. 10 depicts a preferred embodiment of the authorized access list of the present invention;

FIG. 12 depicts an exemplary list of available rooms provided by the automated system of the present invention;

FIG. 13 depicts a preferred embodiment of detailed rental information generated by the automated system of the present invention;

FIG. 14 depicts a preferred embodiment of the room selection feature of the present invention;

FIG. 15 depicts a preferred embodiment of the security code capture of the present invention;

FIG. 16 depicts a preferred embodiment of the automatic payment plan list of the present invention;

FIG. 19 depicts a preferred embodiment of the invoice cycle option of the present invention;

FIG. 20 depicts a preferred embodiment of the fees summary feature of the present invention;

FIG. 22 depicts a preferred embodiment of the room selection feature of the payment capture function of the present invention;

FIG. 23 depicts a preferred embodiment of the summary of fees due generated by the automated system of the present invention;

FIG. 29 depicts a preferred embodiment of the updated fees due summary of the present invention;

FIG. 30 depicts a preferred embodiment of the ledger feature of the present invention;

FIG. 31 depicts a preferred embodiment of a rental agreement of the present invention;

FIG. 34 depicts a preferred embodiment of a list of cities of a selected region generated by the automated system of the present invention;

FIG. 36 depicts a preferred list of available rooms at a specified storage facility, generated by the automated system of the present invention;

FIG. 38 depicts a preferred embodiment of the contract/reservation search engine of the present invention;

FIG. 39 depicts a preferred embodiment of a list of rooms associated with a specified customer, generated by the automated system of the present invention;

FIG. 40 depicts a preferred embodiment of a room selection list generated by the transfer capture feature of the present invention;

FIG. 41 depicts a preferred embodiment of a room selection list generated by the transfer capture feature of the present invention;

FIG. 42 depicts a preferred embodiment of the balance due calculation generated by the transfer capture feature of the present invention;

FIG. 43 depicts a preferred embodiment of a list of reports generated by the automated system of the present invention;

FIG. 44 depicts a preferred embodiment of a room inventory database of the present invention;

FIG. 45 depicts a preferred embodiment of a facility utilization report generated by the automated system of the present invention;

FIG. 47 depicts an exemplary list of letter templates available through the letter generation feature of the present invention;

FIG. 48 depicts a sample letter template in the letter generation feature of the present invention;

FIG. 49 depicts a sample set of business rules to govern the automated features of the self-storage management system of the present invention.

Like numerals refer to like parts throughout the several views of the drawings.

DETAILED DESCRIPTION OF THE INVENTION

Figure 3:
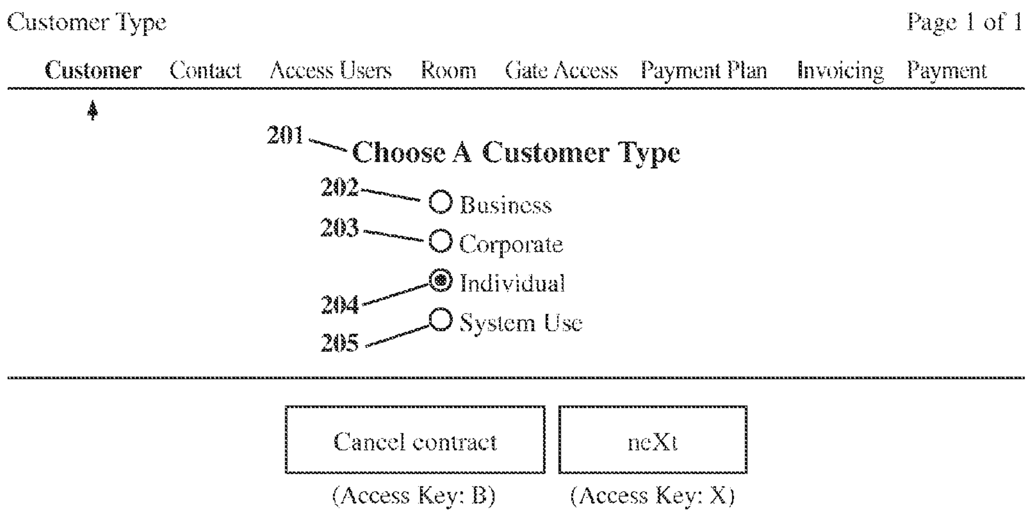
FIG. 3 depicts a preferred embodiment of the customer type feature of the present invention.

The automated self-storage reservation and management system 10 of the present invention provides customers and personnel of self-storage facilities access to information and tools that facilitate the making of reservations, payments, creation and management of accounts, generation of various reports and other tasks that were previously either not available to users or were far more difficult to accomplish.

In a preferred embodiment of the invention, as shown in FIG. 1, a user can login to the system using a secure login capture 12. The system 10 may provide different levels of access to system users depending on the user's authorized security level. For example, owners, managers, and employees (hereinafter "self-storage personnel") may have broader access to the management features of the system, such as report generation. In contrast, self-storage customers may have limited access to the reservation and account management features of the invention. The level of access provided to the customers and self-storage personnel can vary and is controlled by a system administrator.

The self-storage system of the present invention may have more than one login capture to accommodate self-storage customers and self-storage personnel. In the embodiment shown in FIG. 1, the login capture 12 is a business sign on provided for self-storage personnel. In a preferred embodiment of the invention, customers can be provided with a separate customer sign on page. In another embodiment of the invention, the system 10 provides a general login capture for all users.

The login capture 12 prompts the user for a login identification 14 and a password 16. Upon entry of the requested information, the login capture 12 verifies the login identification 14 and password 16 and if authorized, provides the user access to the system.

In a preferred embodiment of the invention, as shown in FIG. 2, the automated self-storage system includes a move in capture 20, a reservation capture 30, a payment capture 40, a move out feature 50, a contract review feature 60, a transfer capture 70, an open contracts report feature 80, an authorized access report feature 90, and a report list 100.

The move in capture 20 enables the user to set up new move in contracts for customers. Upon activating the move in capture 20, the system prompts the user to choose a customer type 201, as best shown in FIG. 3. In a preferred embodiment of the invention, the customer type is selected from one of the following: business 202, corporate 203, individual 204 or system use 205. In a more preferred embodiment of the invention, the individual 204 selection is provided as the default selection.

Figure 4:
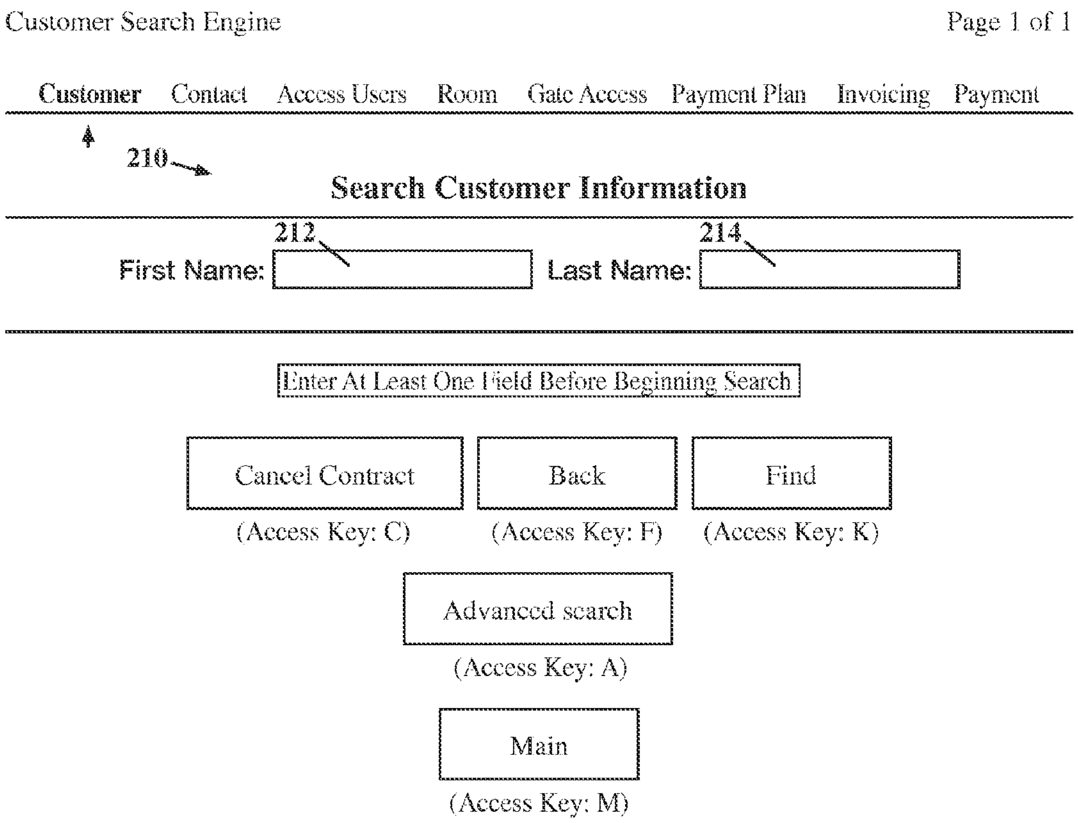
FIG. 4 depicts a preferred embodiment of the customer information search feature of the present invention.

FIG. 4 depicts the customer information search feature 210 that is activated upon selection of a customer type. The search feature 210 enables the user to search for a particular customer by entering identifying information pertaining to the customer. For example, in the embodiment shown in FIG. 4, the user is prompted for the first name 212 and last name 214 of the customer. If the customer type 201 had been a business, the customer's identifying information could be the business name or account number. Upon entering the customer's information, the system provides the customer search results 216, as shown in FIG. 5, which is a list of customers matching the customer identification information entered in the search feature 210. The customer search results 216 preferably includes the name, address, and telephone number of the customers to assist the user in identifying each customer. If the customer for which the user is searching is found in the system, the user can select the customer by simply activating a customer selection key 217. If the customer is new and has not yet been entered into the system, the customer may be added by selecting the customer add key 218.

If the customer add key 218 is activated, the system prompts the user for customer information 220, as shown in FIG. 6. In a preferred embodiment of the invention, the system prompts the user for the customer's name 221, address 222, phone number 223, social security number 224, driver's license number 225, employer information 226, email address 227 and tax exempt information 228.

Figure 7:
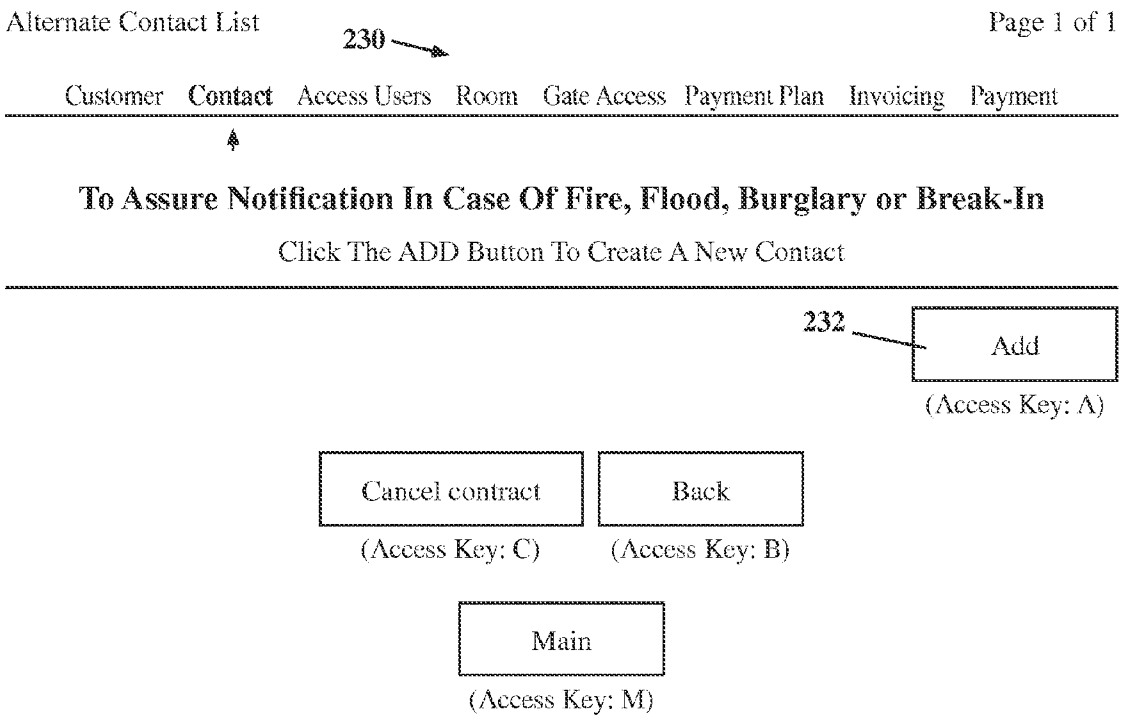
FIG. 7 depicts a preferred embodiment of the contact feature of the present invention.
Figure 8:
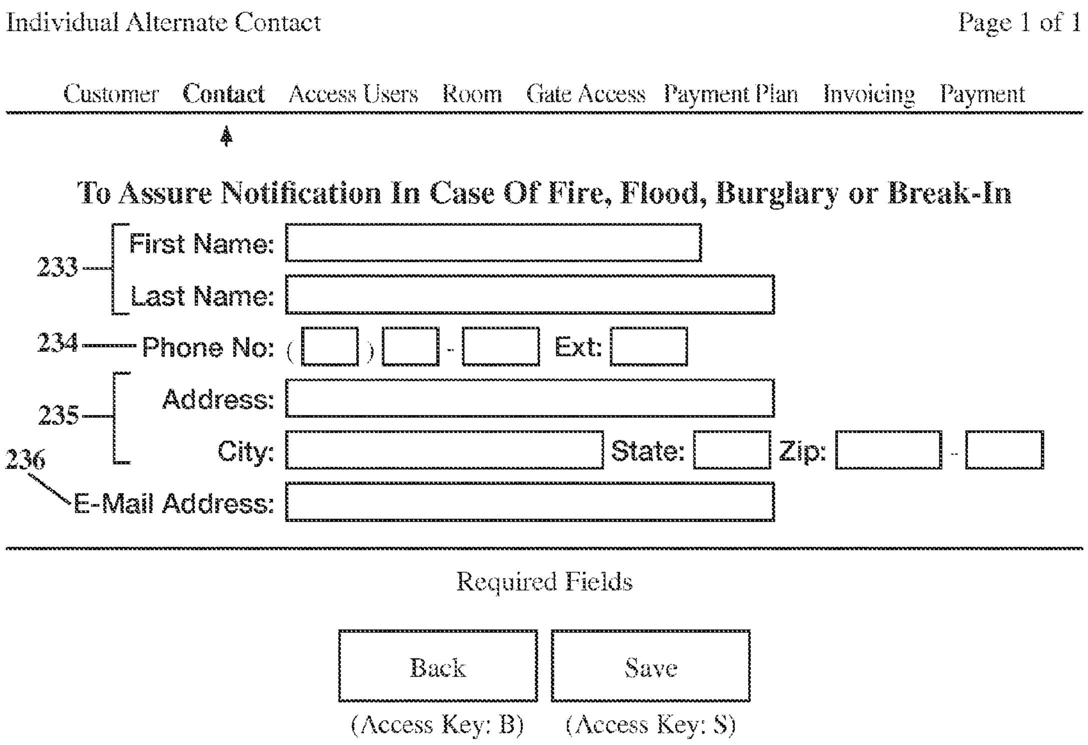
FIG. 8 depicts a preferred embodiment of the emergency contact information capture feature of the present invention.

As best shown in FIG. 7, the system preferably includes a contact feature 230 that prompts the user to identify the person(s) who should be notified in case of fire, flood, burglary or break-in. To create a new contact, the add contact key 232 is activated. Upon activation of the add contact key 232, the system preferably prompts the user for emergency contact information, as shown in FIG. 8. Emergency contact information preferably includes the name 233, telephone number 234, address 235 and email address 236 of the contact. In the event of an emergency, the system provides convenient access to the emergency contact information.

Figure 9:
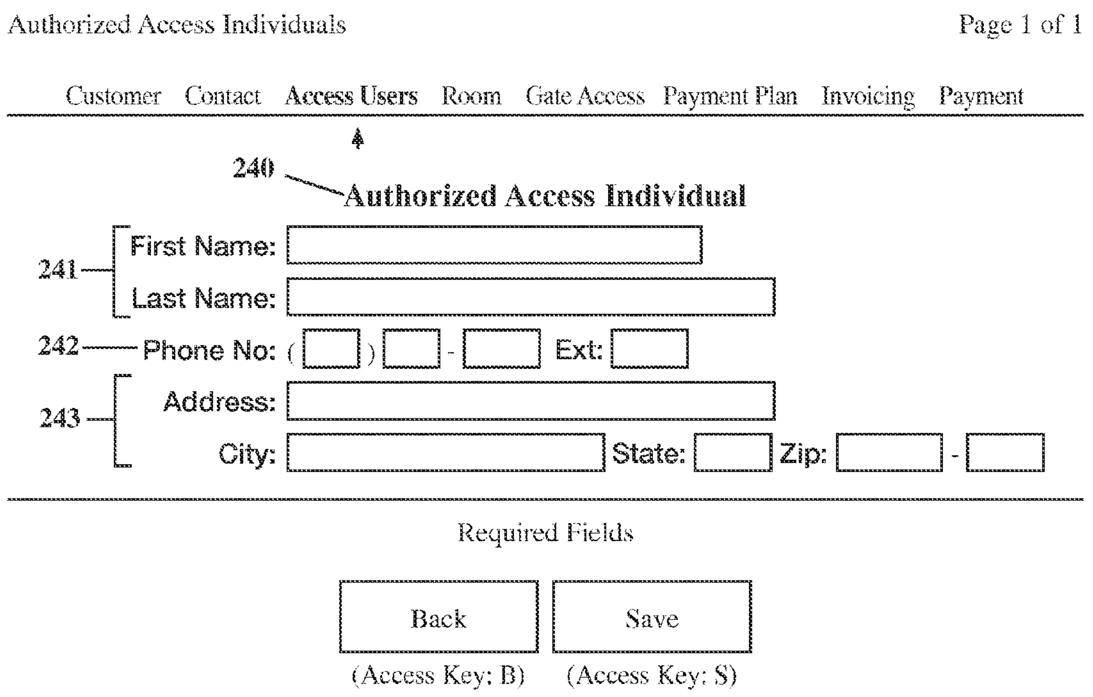
FIG. 9 depicts a preferred embodiment of the authorized access capture feature of the present invention.

In addition to emergency contact information, the contact feature 230 prompts the user for the identity of person(s) having authorized access, as shown in FIG. 9. The authorized access information 240 preferably includes the name 241, telephone number 242 and address 243 of each authorized user. As shown in FIG. 10, the system tracks individuals with authorized access to the facility. The authorized access list 244 may be amended by deleting existing authorized contacts, adding new contacts or modifying the authorized access information 240 for an authorized contact. The system preferably includes a delete feature 245, add feature 246 and edit feature 247 for facilitating the modification of the authorized access information.

Figure 11:
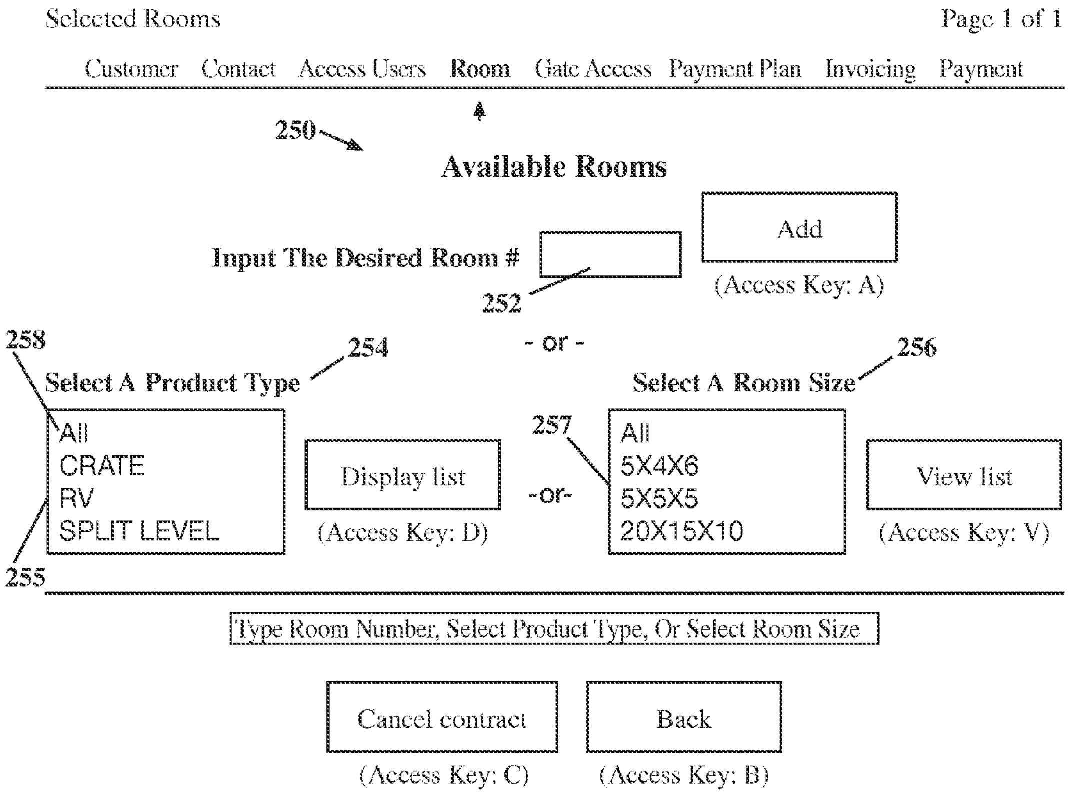
FIG. 11 depicts a preferred embodiment of the room search feature of the present invention.

In a preferred embodiment of the invention, as shown in FIG. 11, the automated self-storage system has a room search feature 250 that enables the user to search available rooms. In the embodiment shown in FIG. 11, the room search feature 250 includes a room number search 252, product type search 254 and a room size search 256. If the room number of the desired storage facility is known, the user can enter it in the room number search 252. Alternatively, the user can search storage facilities by product type 254, such as crates, rvs, split levels, or by room size 256. To view a list of all available rooms, the "all" feature 258 may be selected from either the product type menu 255 or the room size menu 257.

FIG. 12 depicts an exemplary list of available rooms 260 generated by the automated system. The list 260 preferably includes the room number 261, size 262, product type 263, description 264 and rate 265. To rent a room, the desired room is selected from the list of available rooms 260. Upon selection of the room, the system prompts the user for detailed rental information, as shown in FIG. 13. A "Next Bill Date" feature 266 enables the user to select the date on which the next rental bill is issued. This feature is particularly useful if a customer has several rentals and seeks to consolidate the billing date for all rentals. As a default, the "Next Bill Date" will be one month from the date of rental. If the vacate date is known, it can be entered in the vacate date capture 267. If the rental is for an unspecified length of time, the vacate date capture 267 can be left blank. The system preferably provides the user with a list of services 270 that are available in connection with the rental. For example, in the embodiment shown in FIG. 13, the list of services 270 includes insurance coverage 271, access card replacement 272, promotional discounts 273, and dumpster services 274. If a customer wishes to purchase insurance, the insurance coverage 271 is simply selected from the list of services 270. The system preferably also includes a user alert 275 that notifies the user of various policies and regulations in connection with the rental.

In a preferred embodiment of the invention, as shown in FIG. 14, the room selection process can be repeated to rent multiple rooms in the same transaction. In the embodiment shown in FIG. 14, four rooms of varying types, sizes, and prices have been selected. The list of selected rooms 280 can be modified by using the delete 282 and add 283 features. It is not necessary to begin a new transaction for each rental. All rental transactions can be entered on a single contract. The customer information is entered once and can be used repeatedly without requiring the user to re-enter the information.

The automated self-storage system preferably includes a security code capture 285, as shown in FIG. 15. The security code capture 285 enables the user to enter a password 286 in connection with each rental unit. The password 286 is then used as the security code to open the access gate to the rental unit. The customer may have the same password in connection with each of the customer's rental units. Alternatively, different passwords can be used for each unit. The passwords are preferably numeric. The automated self-storage system of the present invention preferably interfaces with the facility security gate system. Upon selection of the password, the automated self-storage system communicates with security gate system to enable customers to proceed through the gates upon providing the correct password at the gate. In a preferred embodiment of the invention, if a customer's account is delinquent, the system interfaces with the security gate to deactivate the client's access.

Upon selection of the rental units and associated services, the automated self-storage system provides the user with the opportunity to make payment arrangements. In a preferred embodiment of the invention, as shown in FIG. 16, the system includes an automatic payment capture 400. The automatic payment capture 400 enables the user to automatically pay the fees associated with a rental unit by charging the monthly rate to a credit card. The automatic payment capture 400 can be applied to any combination of rental units. For example, in the embodiment shown in FIG. 16, rooms 1525 and 1685 have been designated for the automatic payment plan. One advantage of the automated system of the present invention is the ability to rent multiple rooms on the same contract and apply different payment types and different due dates to each rental. Accordingly, if desired, the automatic payment capture 400 can be applied to all rental units or none of the rental units.

Figure 17:
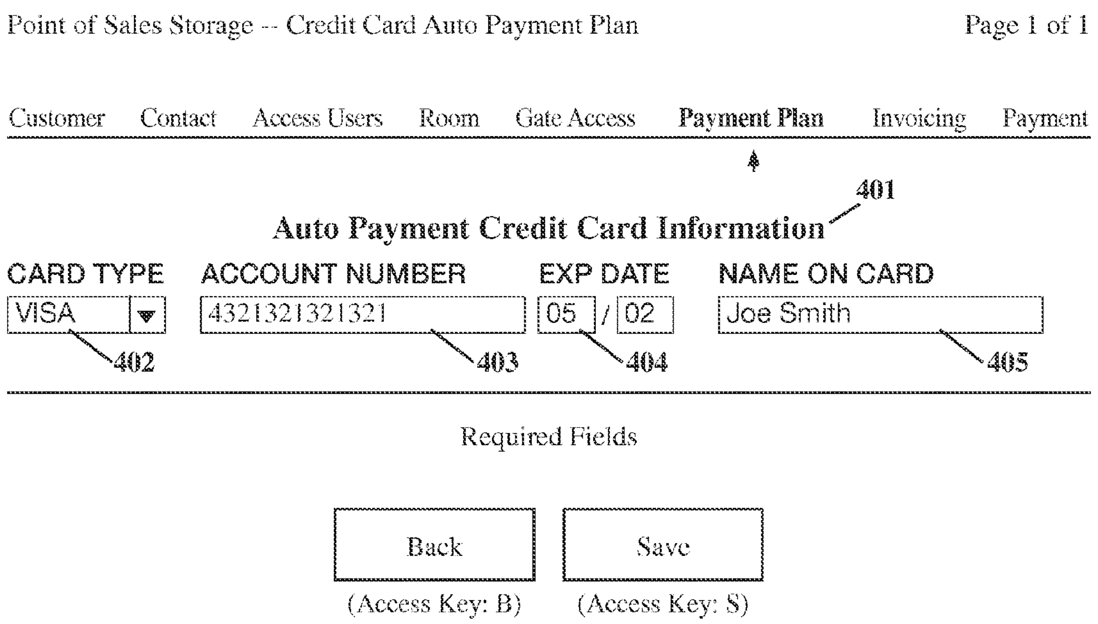
FIG. 17 depicts a preferred embodiment of the credit card information feature of the present invention.
Figure 18:
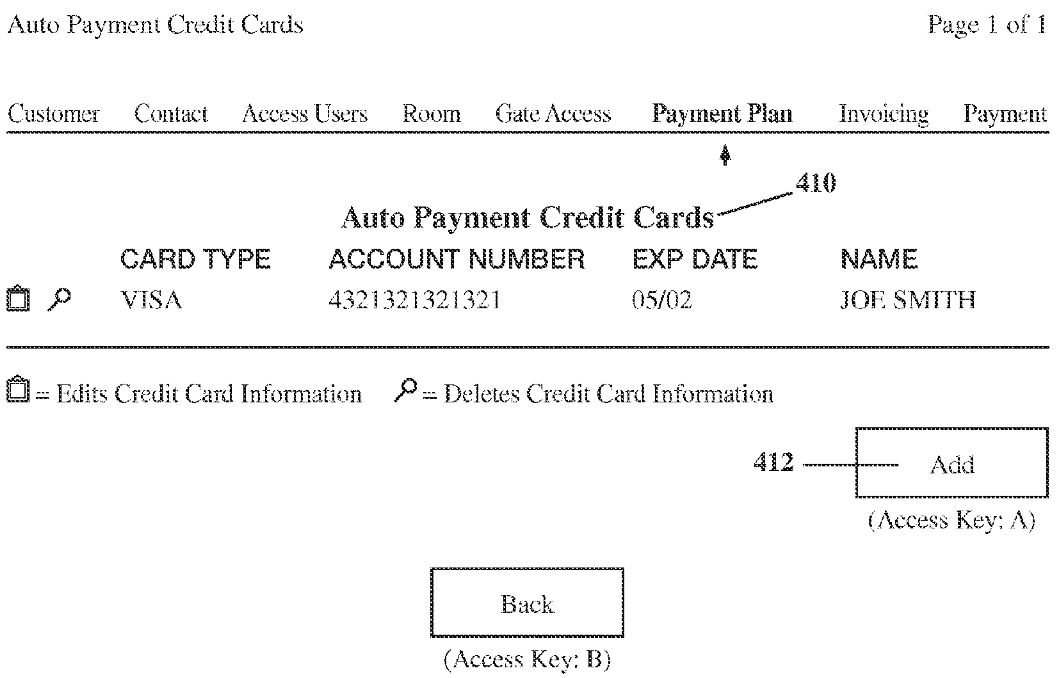
FIG. 18 depicts a preferred embodiment of the automatic payment credit cards list of the present invention.

The automatic payment capture 400 prompts the user for credit card information 401, as shown in FIG. 17. The credit card information 401 preferably includes the card type 402, account number 403, expiration date 404 and name on card 405. In a preferred embodiment of the invention, as shown in FIG. 18, additional credit cards may be added to the list of auto payment credit cards 410 by using the add key feature 412. As best shown in FIG. 16, a credit card identifier 414 is provided in association with each rental unit that is selected for the automatic payment plan. The credit card identifier 414 provides the account number of the credit card that is authorized to be charged in connection with the rental unit. The same credit card can be used for all rental units or different credit cards may be used for each unit.

For rental units that have not been linked to the automatic payment feature, the system provides the user with an invoice cycle option 415 as shown in FIG. 19. The invoice cycle option 415 enables the user to select a billing cycle for each of the rental units that are not linked with the automatic payment feature. For example, in FIG. 19, a monthly billing cycle 216 is selected for room 1670 and a quarterly billing cycle 217 is selected for room 9898. In a preferred embodiment of the invention, the user can select a monthly, quarterly, semiannual or annual billing cycle.

In addition to automatic payment and invoice billing options, the automated self-storage system of the present invention preferably enables the user to make non-recurring payments. As shown in FIG. 20, the system preferably includes a fees summary feature 420 that lists the outstanding charges in connection with an account. The fees summary feature 420 includes the due date 421 for each charge, the rental unit 422 with which the charge is associated, the amount of the fee 423, any associated tax 424, a description of the fee 425, and the total 426. Upon viewing the fees summary feature 420, the user can select the payment feature key 430 to apply a payment toward the outstanding bill. The system preferably includes an add future feature 432 that enables the user to add future charges to the fees summary feature 420.

Figure 21:
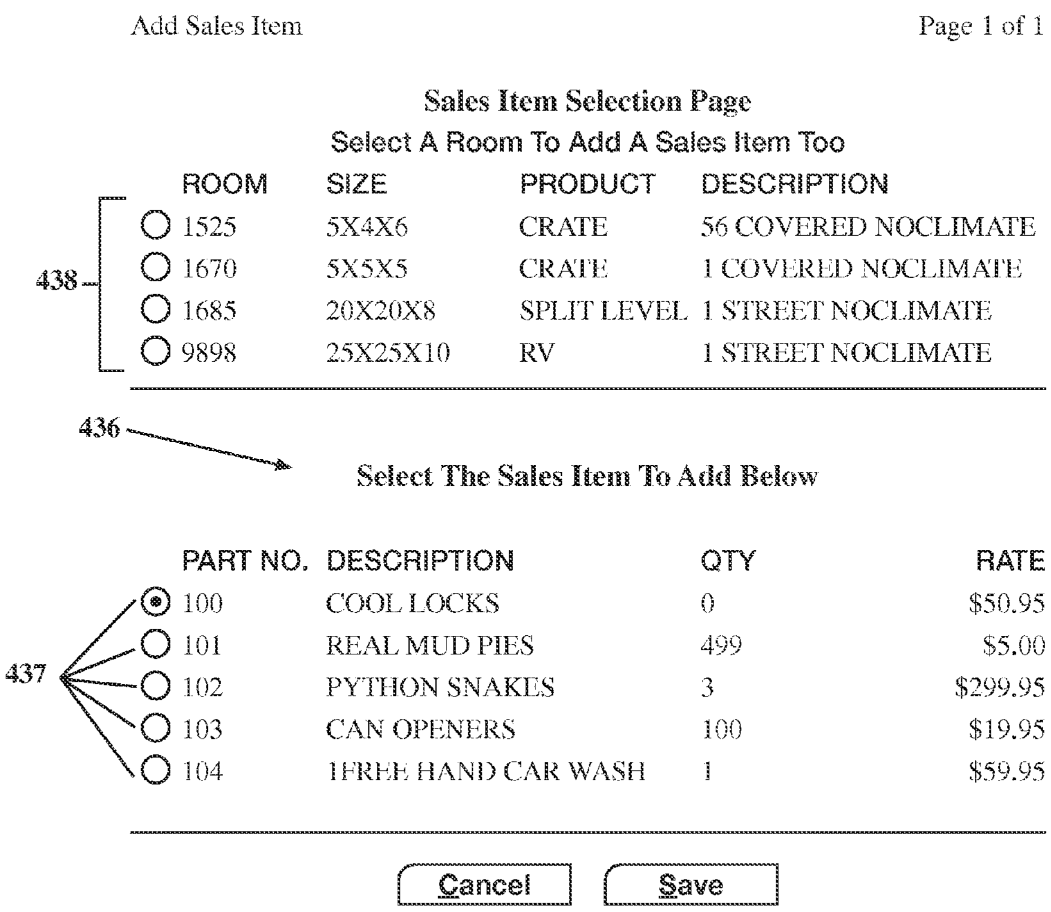
FIG. 21 depicts a preferred embodiment of the sales item selection feature of the present invention.

It is envisioned that the system of the present invention will manage all features of the customer's account and enable the customer to make payment arrangements for all goods and services purchased. In this regard, if a customer purchases goods that are on sale at the storage facility, the cost of the goods may also be added to the fees summary feature using the sales items function 434. By activating the sales items function 434, the system provides the user with a list 436 of sales items available at the storage facility, shown in FIG. 21. The item 437 being purchase is selected list 436. If desired, the sales item can be associated with a particular rental unit 438. Upon selection of the desired sales items 437, the price is added to the fees summary feature 420.

In a preferred embodiment of the invention, a payment can be made by activating the payment feature key 430, shown in FIG. 20. Upon activation of the payment feature key 430, the system provides the user with a list of the customer's rooms 440 for which payment can be made, as shown in FIG. 22. The user can select the specific room 442 toward which payment is to be made. If desired, all rooms can be selected. In the embodiment shown in FIG. 22, three of the four available rooms are designated for payment. Upon selection of the rooms to which payment should be applied, the system provides the user with a summary of the fees due 444 for the particular rooms selected, as shown in FIG. 23. A balance due 446 is provided indicating the total payment that is due for the selected rooms. The user can select the payment type 450 that is to be used to settle the account. In a preferred embodiment of the invention, the payment type 450 can be credit card, cash, money order, coupon or check. The system of the present invention can preferably apply payment of any type specified above, or a combination of payment types specified above, to the outstanding balance.

Figure 24:
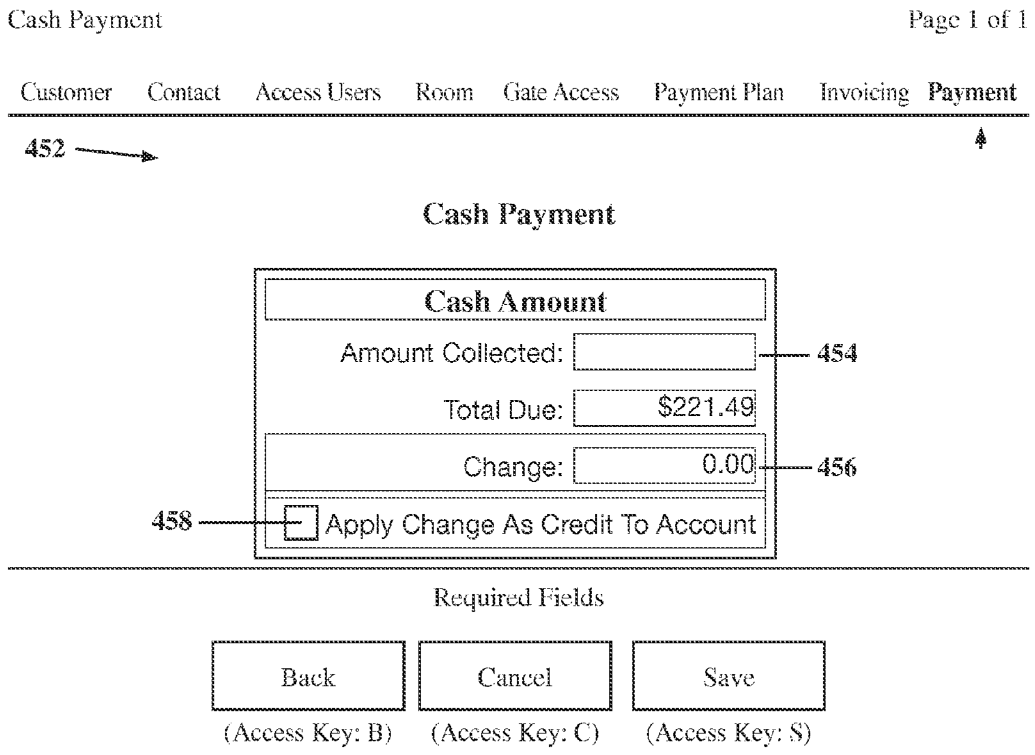
FIG. 24 depicts a preferred embodiment of the cash payment capture of the present invention.

As shown in FIG. 24, if a cash payment 452 is selected, the user enters the cash amount that is collected in the amount collected capture 454. The system automatically calculates the change due 456 and preferably provides the user with the option of applying the change as a credit to the account by activating the credit feature 458.

Figure 25:
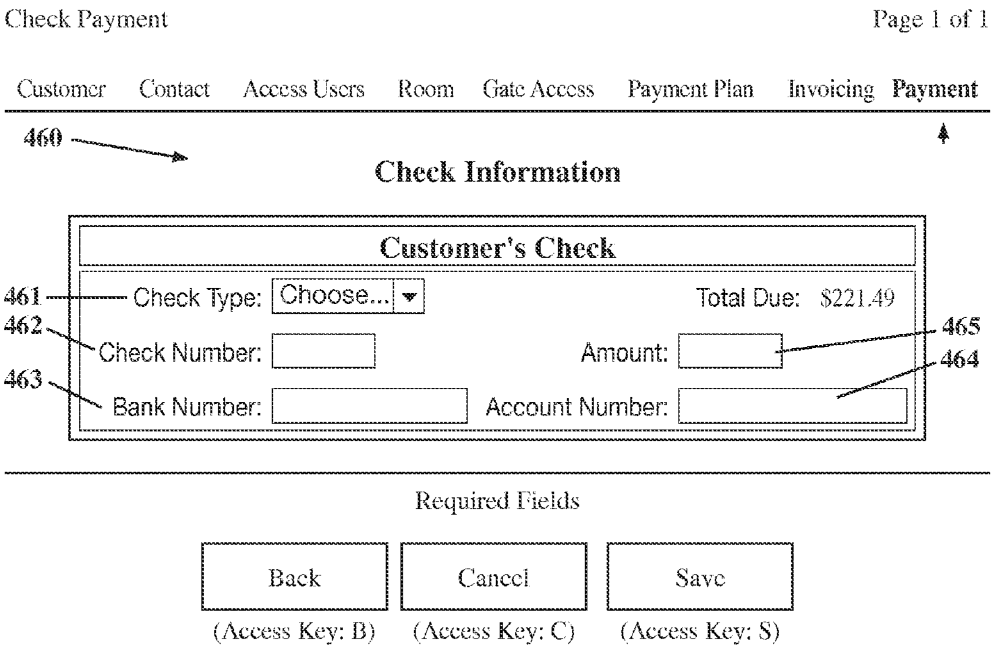
FIG. 25 depicts a preferred embodiment of the check information capture of the present invention.
Figure 26:
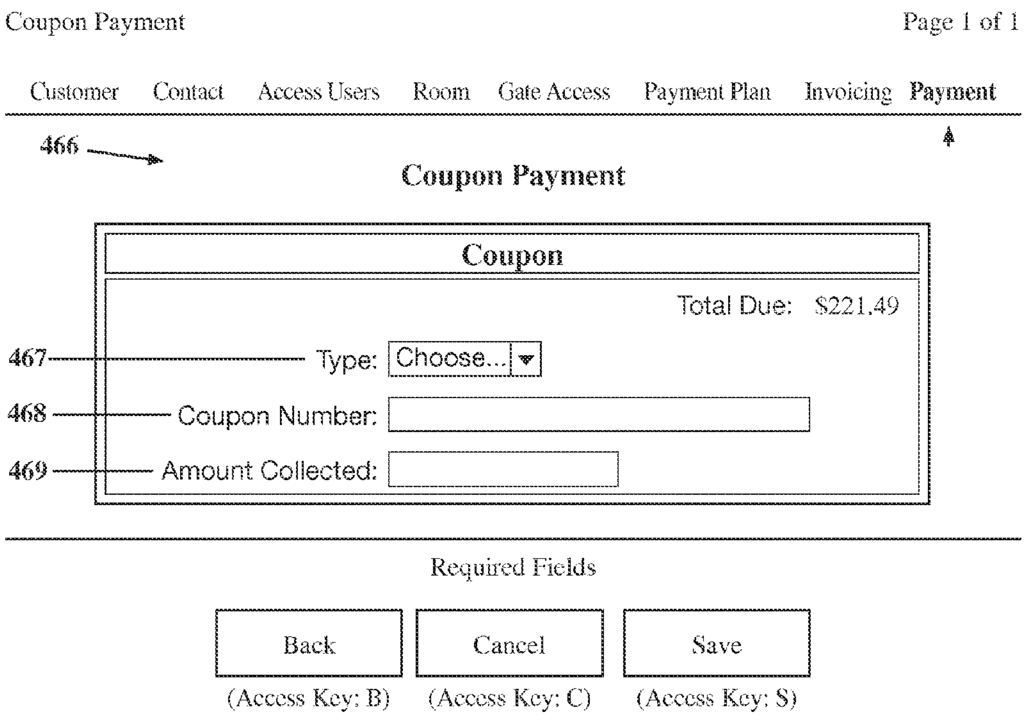
FIG. 26 depicts a preferred embodiment of the coupon payment capture of the present invention.
Figure 27:
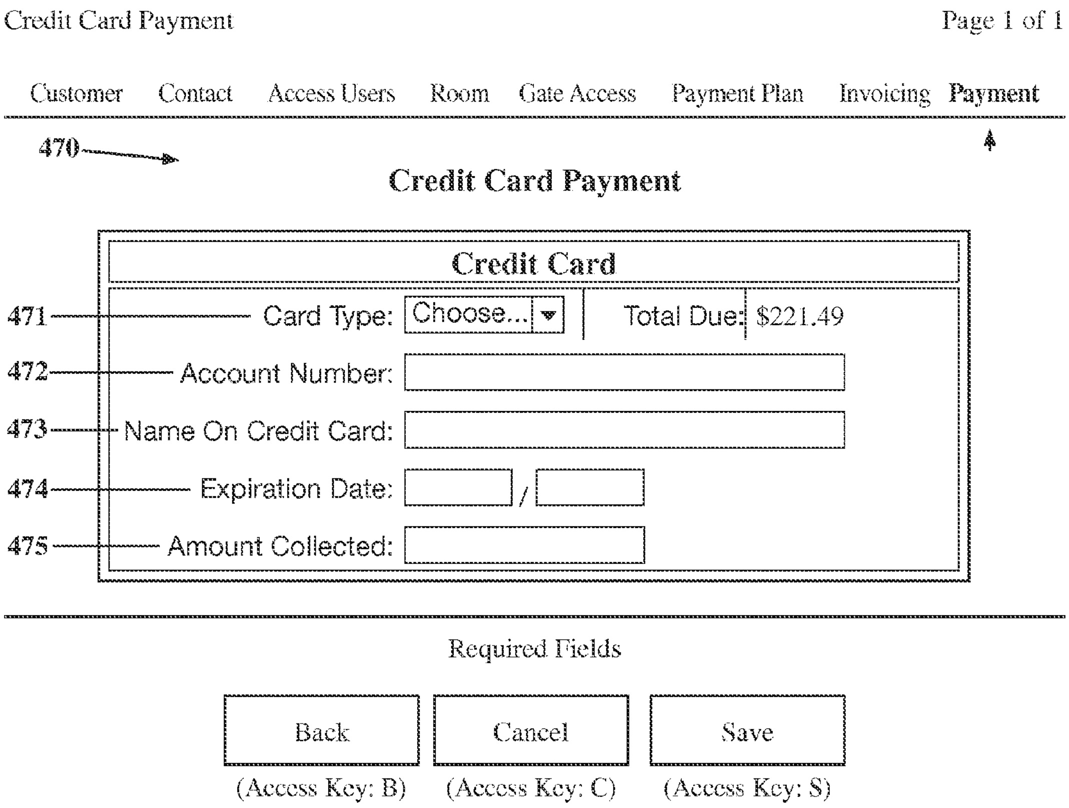
FIG. 27 depicts a preferred embodiment of the credit card payment capture of the present invention.
Figure 28:
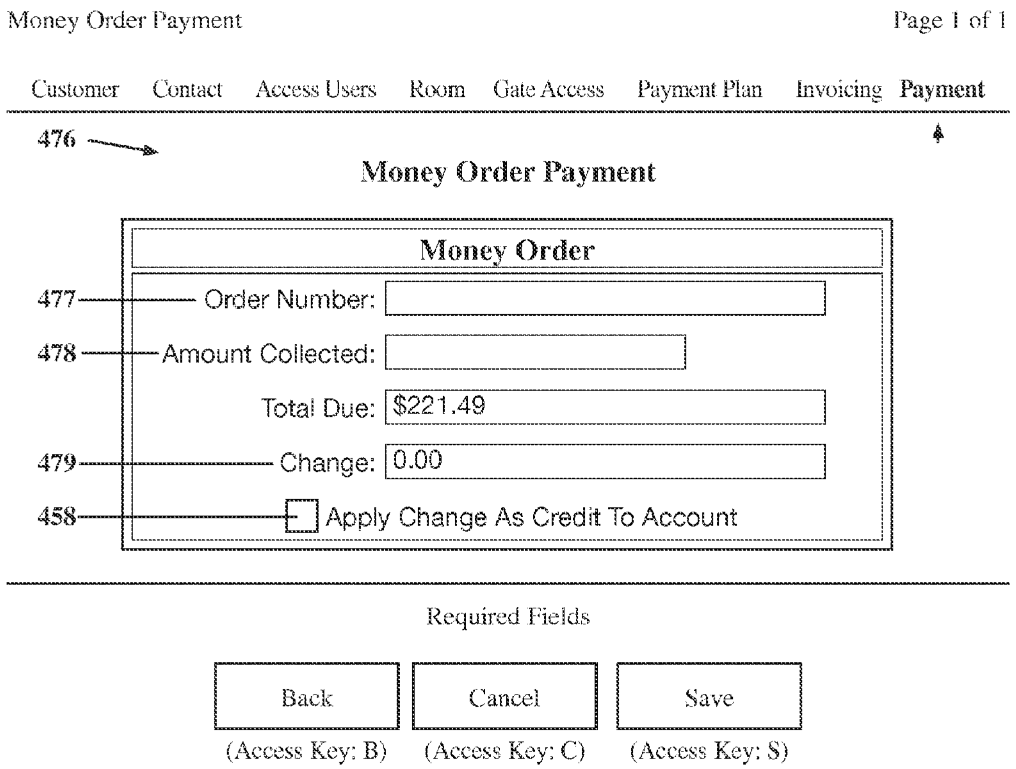
FIG. 28 depicts a preferred embodiment of the money order payment capture of the present invention.

As shown in FIG. 25, if payment is made by check, the check information capture 460 prompts the user for the check type 461, check number 462, bank number 463, account number 464 and amount of the check 465. If payment is made with a coupon, the coupon information capture 466, shown in FIG. 26, prompts the user for the coupon type 467, coupon number 468 and the amount collected 469. For credit card payments, a credit card payment capture 470, shown in FIG. 27, prompts the user for the card type 471, account number 472, account holder's name 473, expiration date 474 and amount to be charged 475. For money order payments, a money order information capture 476, shown in FIG. 28, prompts the user for the order number 477 and the money order amount 478. The system automatically calculates any change 479 that is due and gives the user the option to apply any change as credit to the account by activating the credit feature 458. The customer selects the manner in which the payment is made. The system captures information pertaining to the type and amount of payment and updates the database to reflect the payment.

In a preferred embodiment of the invention, as shown in FIG. 29, after applying the payment, the system provides the user with an updated fees due summary 480 that lists the charges that remain outstanding. The system also provides the user with a summary of payments collected 482. In the embodiment shown in FIG. 29, the payments collected feature 482 indicates that a payment of $221.49 was made by money order number 1234. A summary of the customer's account may also be obtained by activating the ledger feature 490 of the system. The ledger feature 490, as best shown in FIG. 30, provides an account history for a specified contract. In a preferred embodiment of the invention, the ledger feature 490 includes a listing of all charges 491, payments 492, reversed charges 494 and fee waivers 495. The ledger feature 490 also indicates the charges which have been paid in full 496 and provides the balance due 497 on the account. The ledger feature 490 can be organized as desired by the user. For example, in a preferred embodiment, the ledger feature includes a sort feature 498 that enables the user to sort the entries in ascending or descending order. The ledger feature 490 can be further modified to show charges pertaining to a particular room 499 or to show charges for a particular time period 500.

In a preferred embodiment of the invention, the automated self-storage system generates a rental agreement 600, shown in FIG. 31. The rental agreement 600 preferably lists the customer information 220, alternate contact information 230, authorized contact information 240, list of selected rooms 280, list of selected services 270, credit card payment information 401, payment history 491 and any notes 601 pertaining to the account. The rental agreement 600 can be customized to add information or delete information as desired by the user. Furthermore, the headings of the rental agreement 600 are preferably hyperlinked such that activation of the heading provides additional information regarding the subject matter of the heading. By way of example, by activating the customer information heading, more detailed customer information is provided. The hyperlinked headings are preferably highlighted in some manner. In the embodiment shown in FIG. 31, the hyperlinked headings are shown with an upward arrow, indicating that additional information is available by activating the heading. The rental agreement can be modified by the user to update customer, payment, or rental information. Upon updating the agreement 601, the information is updated in the system's database to ensure that all related records are updated.

The foregoing description pertains to the tasks associated with moving a customer into a rental unit. These tasks include selecting an appropriate room, providing customer information, including emergency contact and authorized access contact information, making payment arrangements, and creating a rental contract. The automated self-storage system 10 of the present invention can perform these functions individually or in any combination. It is not necessary that the steps described herein be performed in the order described.

Figure 32:
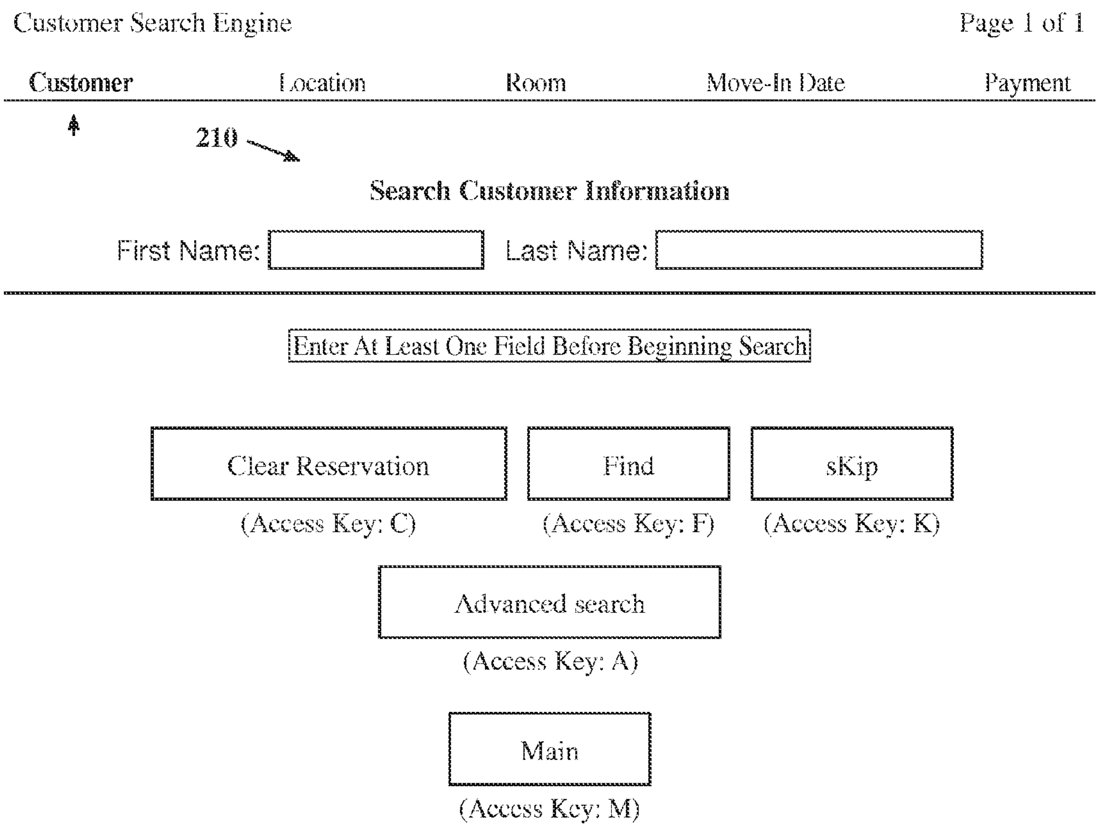
FIG. 32 depicts a preferred embodiment of the customer information search feature of the present invention.
Figure 33:
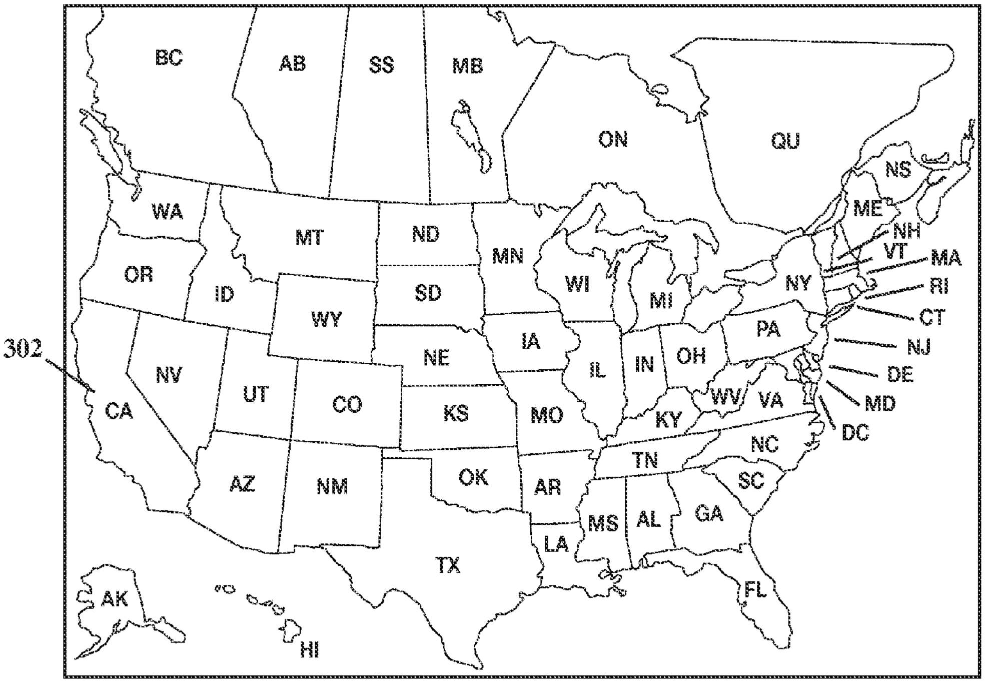
FIG. 33 depicts a preferred embodiment of the location finder feature of the present invention.
Figure 35:
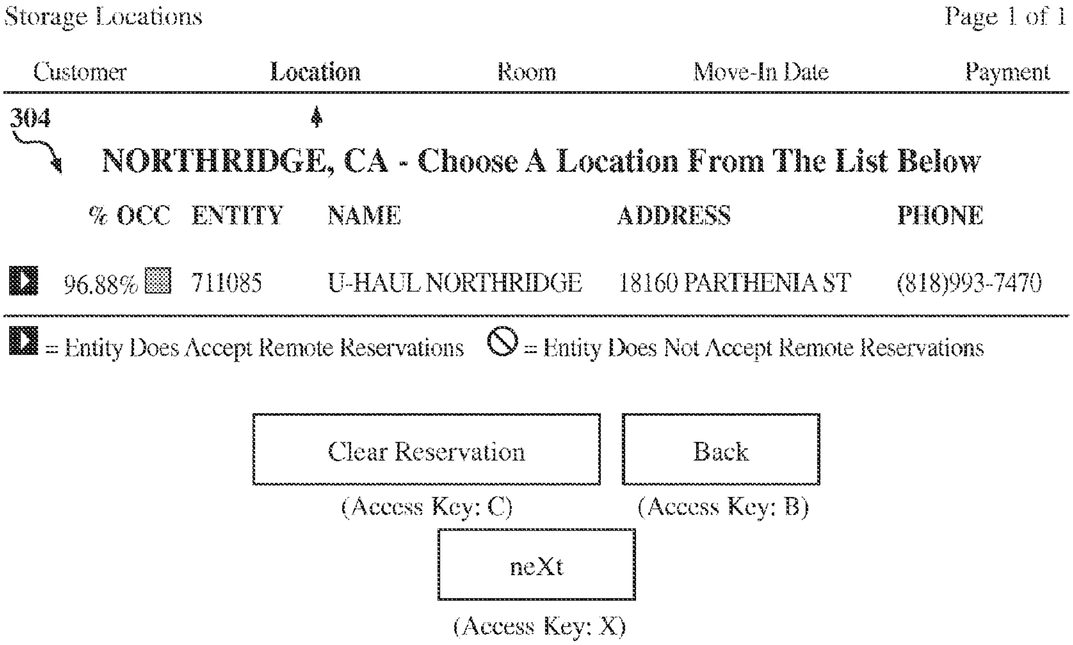
FIG. 35 depicts a preferred embodiment of a list of storage facilities located within a selected city, generated by the automated system of the present invention.

In a preferred embodiment of the invention, the automated self-storage system 10 includes a reservation capture 30, shown in FIG. 2, for making a new reservation for a customer or modifying an existing reservation. Upon activation of the reservation capture 30, the customer information search feature 210 (shown in FIG. 32) is called. If the user seeks to modify an existing reservation, the identity of the customer is entered. Upon entering the customer's information, the system provides customer search results 216, as shown in FIG. 5. If a new reservation is being made, a location finder feature 301 is provided, as shown in FIG. 33. In a preferred embodiment, the location finder feature 301 is in the form of an interactive map. The user is prompted to select the region 302 in which a storage facility is sought. Alternatively, a region or specific entity can be entered manually. Upon selection of a region 302, the system provides a list of cities 303 (shown in FIG. 34) within the selected region that provide storage facilities. The user is prompted to choose a city from the list provided. Upon selection of a city, the system provides a list of storage facilities 304 (shown in FIG. 35) within the selected city. The user can then choose a storage facility from the list provided. As shown in FIG. 36, the system preferably provides the user with a list of rooms 306 located at the selected storage facility. The list 306 preferably indicates the size 307 of each room, the type of room 308, the floor on which the room is located 309, the elevator level 310, the climate control feature 311, the square footage 312, the number of vacant rooms 313, the occupancy rate 314, and the monthly rental rate 315. In a preferred embodiment of the invention, the system provides the user with a map of the storage facility indicating the location of each rental unit on the map.

Figure 37:
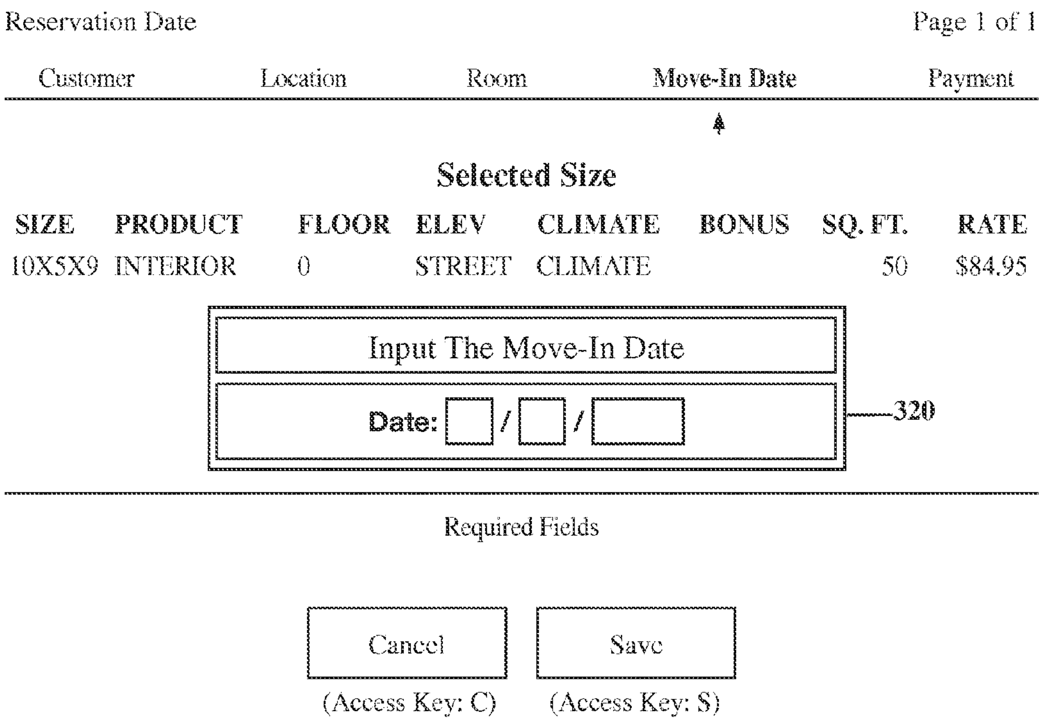
FIG. 37 depicts a preferred embodiment of the move-in capture feature of the present invention.

Upon selecting the desired unit, the system prompts the user for the move-in date 320, as shown in FIG. 37. If the rental unit is available for the move-in date specified, the system preferably prompts the user for customer information, as previously described. For confirmed reservations, payment can be made using the various payment features described above.

Referring to FIG. 2, the payment capture feature 40 of the automated self-storage system enables the user to apply a customer's payment toward an existing balance or a future payment. As shown in FIG. 38, upon activation of the payment capture feature 40, a contract/reservation search engine 41 is invoked. The user can search existing contracts by any variable including contract number 42, storage unit number 43, customer identification 44, receipt number 46 or other identifying information. Once the desired contract is found, the system invokes the fee summary feature 420 (shown in FIG. 20) for the selected customer, which indicates the outstanding charges in connection with the account. After reviewing the charges, a payment can be applied against the charges by activating the payment feature key 430. Payment can be made by cash, check, money order, coupon, or credit card as described in greater detail above.

Referring to FIG. 2, the move out feature 50 of the present invention enables the user to review contracts and move out existing customers. Upon activating the move out feature 50, the system invokes the contract/reservation search engine 41 to assist the user in finding the customer or contract that is to be moved out. Once the desired customer or contract is found, the system provides a list of rooms 501 associated with the selected customer or contract, as shown in FIG. 39. A move out function key 502 is provided to activate the move out feature. Upon selection of the move out function key 502, the system is updated to indicate that the customer has moved out of the room selected. The system will update the inventory database to reflect the room is now vacant. The customer's contract will reflect that the transaction has been closed. In a preferred embodiment of the invention, the system confirms that outstanding charges on the room have been paid prior to completing the move out function.

Referring to FIG. 2, the contract review feature 60 enables the user to review and modify information on an existing contract, record a payment or move in a customer with a confirmed reservation. Upon activating the contract review feature 60 and selecting a customer, the system displays the rental agreement 600 of the selected customer, as shown in FIG. 31. As discussed above, the user is able to review and modify the customer information 220, alternate contact information 230, authorized contact information 240, list of selected rooms 280, list of selected services 270, credit card payment information 401, payment history 491 and any notes 601 pertaining to the account.

The transfer capture 70, shown in FIG. 2, allows the user to transfer a customer from one room to another. As shown in FIG. 40, upon identifying a customer, the transfer capture 70 provides the user with a list of rooms 701 currently occupied by the specified customer from which the customer can transfer. The user can select one or more rooms from the list 701 provided. Upon selection of the room(s) to be transferred from, the system provides the user with a list of vacant rooms 702, shown in FIG. 41, into which the customer can transfer. As best shown in FIG. 42, upon selection of the room(s) to be transferred into, the system calculates the prorated rent (or credit) due 703 for the room(s) that are vacated and the prorated rent due 704 for the room(s) that are to be occupied. When the transfer is completed, the system automatically updates the contract to reflect the room transfer, and updates the room inventory database.

Referring to FIG. 2, the open contracts report feature 80 enables the user to view a list of all active, open contracts. Each item on the open contract list can be hyperlinked to the corresponding rental agreement 600 to provide more detailed contract information, if needed. The authorized access report feature 90 enables the user to confirm the identity of the person(s) that the customer has authorized to access the rental unit. The report list 100, provides the user with a list of reports 100, shown in FIG. 43, that are available to the user.

The automated self-storage system of the present invention provides storage facility personnel with information and tools necessary to manage a self-storage business. In a preferred embodiment of the invention, the system includes a room inventory database 801, as shown in FIG. 44, that lists all available rooms for the facility, and the room number 802, room size 803, room description 804, occupancy status of the room 805, and the rental rate 806 for each room. In a more preferred embodiment, the system displays a map (not shown) depicting the layout of the facility and the location of each room. If new rooms are created, eliminated or changed, the user can update the inventory database 801 to reflect the modification.

As shown in FIG. 45, the automated system preferably includes a facility utilization chart 810 that provides revenue and occupancy information for a particular facility. In a preferred embodiment of the invention, the facility utilization chart 810 identifies the rooms by size 811, the square footage 812 for each room, the number of rooms 813 within the facility that are of the specified size, the number of occupied rooms 814, vacant rooms 815, the percentage of the specified rooms that are occupied 816, the current rate 817, the new rate 818, current potential income 819, new potential income 820, current revenue per square foot 821, new revenue per square foot 822, current occupancy income 823, new occupancy income 824, and the occupancy income percentage change 825. To change the rate for a room, the user can enter a new rental rate 818. The system automatically calculates the values of the other variables in the facility utilization chart 810, enabling the user to evaluate the effect of a new rate on revenue.

Figure 46:
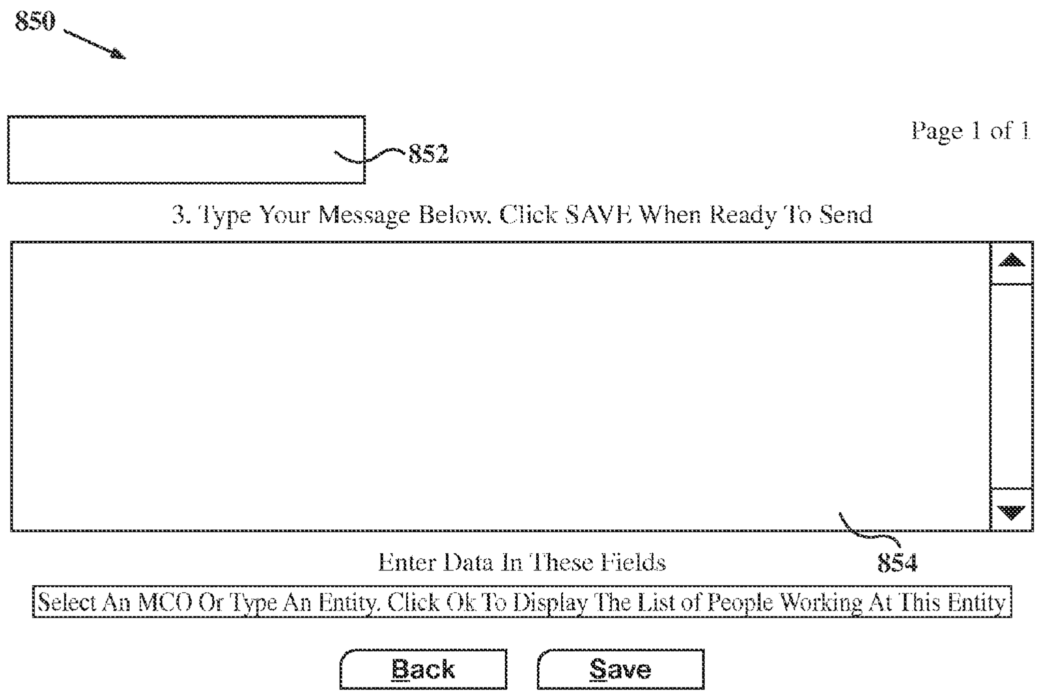
FIG. 46 depicts a preferred embodiment of a messenger feature of the present invention.

In a preferred embodiment of the invention, the system includes a messenger 850, as shown in FIG. 46, to facilitate communication between system users. To send a message to another user, the a recipient 852 is identified and a message is typed into the text box 854. The message can be transmitted to other facility personnel or to a customer. The system will deliver the message to the intended recipient and the recipient will be informed of the message upon logging into the system.

The system preferably includes a letter generation feature 860, shown in FIG. 47, to further facilitate communication with customers by generating letters. The letter generation feature 860 includes templates for various types of letters to customers. For example, in the embodiment of the invention shown in FIG. 47, the system includes letter templates for various stages of delinquency, autopayment notice, eviction notice, lien sale notice, auction sale results, invoicing, overpayment, underpayment, partial payment, rate change notice, room number change, sale and seizure notice, and tax change notice. In a more preferred embodiment of the invention, a customer letter is generated upon the occurrence of a predetermined event. For example, the system can be adapted to generate a delinquency letter when the customer is five days late on payment of the rental fee due. A sample template letter 870 is shown in FIG. 48. The sample template letter is an auction notice for notifying a customer that the items in the self-storage unit will be auctioned.

In a preferred embodiment of the invention, business rules are provided to the system to govern the automated features. A sample list of business rules 880 is shown in FIG. 49*a-e*. The business rules 880 govern the type of letter that is generated for each type of event and the date on which the letter should be generated. For example, as shown in FIG. 49*c*, the business rules require that a first late notice letter 881 be sent for the first stage delinquency. Furthermore, the business rules state that the letter is to be sent two days after the account is late 882. Similar rules are provided for other types of letters.

Business rules may be set to control various automated features of the invention. For example, business rules can be set for governing the services that will be offered through the system (e.g., invoicing, credit card payments, etc.), the charges for various services, reporting options and any other automated feature of the invention. The business rules can be modified in accordance with business policies, user preferences and local, state and federal regulations.

In a preferred embodiment of the invention, the system has an auction organizer feature. Under certain conditions, storage facilities may be entitled to conduct a lien sale of the contents of a storage unit and use the proceeds of the sale to settle the balance of a past due accounts. Prior to conducting such a sale, appropriate notice must be provided to the customer. The contents and timing of the notice are typically governed by state laws. In a preferred embodiment of the present invention, the auction organizer feature of the automated system stores the notice requirements for each jurisdiction and generates a letter providing the appropriate notice to the customer. The auction organizer feature sets the date for the lien sale in accordance with the laws of the jurisdiction. Upon setting the date, the auction organizer feature searches the system for other delinquent accounts that are eligible for lien sales, to evaluate the possibility of consolidating lien sales for multiple accounts. The auction organizer feature preferably notifies the local facility personnel of the upcoming lien sale and alerts them to the last date by which other accounts can be consolidated in the lien sale.

After the lien sale, the proceeds from the sale are credited to the balance on the outstanding account. The system preferably generates a letter to the customer reporting the results of the lien sale, the amount raised by the sale, and any balance remaining on the account.

In summary, the automated self-storage system 10 of the present invention enables customers to make a reservation for a room, view a site map, update contract information, alternate contact information and authorized access information, view room or payment history, purchase insurance, authorize automatic credit card payments, make a non-recurring payment, and print historical and current receipts. Storage facility personnel can preferably utilize the automated system to perform all of the above functions plus other point of sale transactions and management functions. For example, the automated self-storage system enables the user to view an inventory menu for a specified facility, and to manage room inventory by adding or removing rooms, changing the room size or description, or indicating whether a room is damaged. The system also enables the user to manage room rates by increasing or decreasing the rates for all rooms of a particular size or description. To track the effects of the rate change, the system provides facility utilization information that calculates the percentage change in revenues as a result of the change in rates.

The automated self-storage system provides point of sale support by enabling the user to rent rooms, transfer customers from one room to another, move a customer in or out, view key information about customers prior to allowing access to facility or room, and track sales of retail items. When the customer selects a gate access code, the system preferably interfaces with the gate security system to provide access to the customer upon entering the correct gate access code. In a preferred embodiment of the invention, the automated system enables a customer to manage multiple rental transactions on the same contract, and arrange different payment options in connection with each rental transaction. The due dates for the rental payments can be controlled by the user to fall on the same date for all units or on different dates specified by the user. When automatic payments are designated, the system interfaces with a credit card authorization system to collect scheduled payments.

Because the information pertaining to inventory, rental, sales, and payments are provided in a centralized system, the user is able to run various management reports to assess the status of the business of the self-storage facility. For example, audit reports are provided to detect or prevent intentional theft and to identify unintentional errors in entering payments, fee waivers, and write-offs. The facility personnel can also view all open contracts, reservations, expiring credit card reports, cash summaries, and customer rent roll reports.

In a preferred embodiment of the invention, the system enables the storage facility personnel to communicate with a customer by sending a message or a note to the customer's account. In the event that a customer is delinquent, the system automatically sends the customer a letter requiring action. The system also generates customer letters when the rental rate on the customer's rental unit is scheduled to change or if the customer is subject to an eviction notice.

The operation of the automated self-storage system is preferably controlled, at least in part, by a set of business rules created for the application. The business rules are completely customizable and are based on the needs, requirement and preferences of the user or facility, and on various local, state and federal regulations. Through customization of the business rules, a user can instruct the system to provide certain services, to send particular form letters to clients, to apply payments on a specified date and to customize the operation of other features of the system.

It is envisioned that the automated self-storage system of the present invention can be used in connection with a network of storage facilities, wherein the user can access information regarding remote facilities and can perform management or rental functions without being physical present at the facilities. Accordingly, depending on a user's level of authorization, the user can perform all of the functions described herein for any number of facilities, either remotely or while present at the site.

In a preferred embodiment of the invention, the automated self-storage system is available to users on a computer network having at least one computer-server for communicating with the users. Communication with the users is preferably carried out using a browser program on a computer-terminal at a location remote from the computer-server.

The embodiments described above are exemplary embodiments of an automated self-storage reservation and management system. Those skilled in the art may now make numerous uses of, and departures from, the above-described embodiments without departing from the inventive concepts disclosed herein. Accordingly, the present invention is to be defined solely by the scope of the following claims.

What is claimed is:

1. An automated self-storage management system for enabling a user to conduct self-storage transactions, the system comprising:

a business network of a plurality of self-storage facilities, wherein the user is personnel of each self-storage facility and uses the business network to access inventory information and customer information of the plurality of self-storage facilities to generate reports for managing the operation of each self-storage facility;

a server having a room inventory database and accessible to the user via a computer-terminal coupled to the server, wherein the user inputs the inventory information into the room inventory database via the computer-terminal and an inventory information capture and the user accesses the inventory information pertaining to self-storage units located in the plurality of self-storage facilities of the business network;

the server accessible to the user via the computer-terminal coupled to the server, wherein the user inputs the customer information into the server via the computer-terminal and a customer information capture and the user accesses the customer information pertaining to customers of the plurality of self-storage facilities of the business network; and the server having a reporting feature in communication with the inventory information capture and the customer information capture and accessible to the user via the computer-terminal coupled to the server, via the reporting feature, wherein the user extracts and analyzes the inventory information from the room inventory database pertaining to self-storage units located in the plurality of self-storage facilities of the business network, via the reporting feature, wherein the user extracts and analyzes the customer information from the server, and via the reporting feature, wherein the user generates reports using the analysis of the inventory information and the customer information for managing the operation of the storage facility, including reports for revenue, unit availability, reservations, open contracts, rent rolls and credit card information.

2. An automated self-storage management system for enabling a user to conduct self-storage transactions, the system comprising:

a business network of a plurality of self-storage facilities, wherein the user is personnel of each self-storage facility and uses the business network to access inventory information and customer information of the plurality of self-storage facilities to generate reports for managing the operation of each self-storage facility;

a server having a room inventory database and accessible to the user via a computer-terminal coupled to the server, wherein the user inputs the inventory information into the room inventory database via the computer-terminal and an inventory information capture and the user accesses the inventory information pertaining to self-storage units located in the plurality of self-storage facilities of the business network;

the server accessible to the user via the computer-terminal coupled to the server, wherein the user inputs the customer information into the server via the computer-terminal and a customer information capture and the user accesses the customer information pertaining to customers of the plurality of self-storage facilities of the business network;

wherein one or both of the inventory information capture and customer information capture include information for managing the operation of the plurality of self-storage facilities, including information on revenue, cash summaries, unit availability, facility utilization, reservations, open contracts, rent rolls and credit card information; and the server having a rental transaction feature in communication with the inventory information capture and customer information capture and accessible to the user via the computer-terminal coupled to the server, via the rental transaction feature, wherein the user creates a rental agreement using the inventory information and the customer information, and wherein the rental agreement involves a plurality of self-storage units.

3. The automated self-storage management system of claim 2 wherein the customer information capture includes an authorized access identifier.

4. The automated self-storage management system of claim 2 wherein the customer information capture includes an emergency contact identifier.

5. The automated self-storage management system of claim 2 wherein the customer information capture includes a payment history.

6. The automated self-storage management system of claim 2 wherein the customer information capture includes a credit card identifier.

7. The automated self-storage management system of claim 2 wherein the plurality of storage units comprises a first storage unit and a second storage unit, an automatic payment feature applied to the first storage unit, and an invoicing feature applied to the second storage unit.

8. The automated self-storage management system of claim 2 comprising a transfer feature that transfers a customer from an occupied self-storage unit to a vacant self-storage unit.

9. The automated self-storage management system of claim 8 comprising a fee calculator that calculates a prorated rent for the occupied room and a prorated rent for the vacant room.

10. The automated self-storage management system of claim 1 wherein the user generates an audit report via the reporting feature.

11. The automated self-storage management system of claim 1 wherein the user generates a cash intake report via the reporting feature.

12. The automated self-storage management system of claim 1 wherein the user generates data configured to be exported to an external financial database via the reporting feature.

13. The automated self-storage management system of claim 2 wherein the inventory information capture comprises a map.

14. The automated self-storage management system of claim 1 wherein the user generates a receipt for self-storage transactions.

15. The automated self-storage management system of claim 1 wherein the user generates a vacancy report via the reporting feature.

16. The automated self-storage management system of claim 1 wherein via the reporting feature the user generates a facility utilization report including facility revenue and occupancy information for evaluating the effect of a rental rate change on facility revenue.

17. The automated self-storage management system of claim 2 wherein communication between users is facilitated via a communication feature.

18. The automated self-storage management system of claim 2 further comprising a letter generation feature.

19. The automated self-storage management system of claim 18 wherein upon occurrence of a predetermined criteria, the system generates a customer letter.

20. The automated self-storage management system of claim 19 wherein the letter pertains to an overdue fee.

21. The automated self-storage management system of claim 19 wherein the letter pertains to a rate increase.

22. The automated self-storage system of claim 19 wherein the letter pertains to an eviction.

23. An automated self-storage management system for enabling a user to conduct self-storage transactions, the system comprising:

a business network of a plurality of self-storage facilities, wherein the user is personnel of each self-storage facility and uses the business network to access inventory information and customer information of the plurality of self-storage facilities to generate reports for managing the operation of each self-storage facility;

a server having a room inventory database and accessible to the user via a computer-terminal coupled to the server, wherein the user inputs the inventory information into the room inventory database via the computer-terminal and an inventory information capture and the user accesses the inventory information pertaining to self-storage units located in the plurality of self-storage facilities of the business network;

the server accessible to the user via the computer-terminal coupled to the server, wherein the user inputs the customer information into the server via the computer-terminal and a customer information capture and the user accesses the customer information pertaining to customers of the plurality of self-storage facilities of the business network;

the server having a rental transaction feature in communication with the inventory information capture and customer information capture and accessible to the user via the computer-terminal coupled to the server, via the rental transaction feature, the user creates a rental agreement using the inventory information and the customer information, wherein the rental agreement involves a plurality of self-storage units, and the server having a reporting feature in communication with the inventory information capture and the customer information capture and accessible to the user via the computer-terminal coupled to the server, via the reporting feature, wherein the user extracts and analyzes the inventory information from the room inventory database pertaining to self-storage units located in the plurality of self-storage facilities of the business network and extracts and analyzes the customer information from the server and generates reports using the analysis of the inventory information and the customer information for managing the operation of the storage facility, including reports for revenue, cash summaries, unit availability, facility utilization, reservations, open contracts, rent rolls and credit card information.

* * * * *